US012497432B2

(12) United States Patent
Tang

(10) Patent No.: US 12,497,432 B2
(45) Date of Patent: Dec. 16, 2025

(54) MODIFIED FACTOR H BINDING PROTEIN

(71) Applicant: Oxford University Innovation Limited, Oxford (GB)

(72) Inventor: Christoph M. Tang, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 394 days.

(21) Appl. No.: 16/328,340

(22) PCT Filed: Aug. 31, 2017

(86) PCT No.: PCT/GB2017/052535
§ 371 (c)(1),
(2) Date: Feb. 26, 2019

(87) PCT Pub. No.: WO2018/042178
PCT Pub. Date: Mar. 8, 2018

(65) Prior Publication Data
US 2022/0112249 A1    Apr. 14, 2022

(30) Foreign Application Priority Data
Aug. 31, 2016    (GB) ..................... 1614687

(51) Int. Cl.
*C07K 14/22*    (2006.01)
*A61P 31/04*    (2006.01)
*A61K 39/00*    (2006.01)

(52) U.S. Cl.
CPC .............. *C07K 14/22* (2013.01); *A61P 31/04* (2018.01); *A61K 39/00* (2013.01)

(58) Field of Classification Search
None
See application file for complete search history.

(56) References Cited

U.S. PATENT DOCUMENTS

| | | | | |
|---|---|---|---|---|
| 7,351,413 B2* | 4/2008 | Page | ..................... | A61P 31/20 424/278.1 |
| 7,785,608 B2* | 8/2010 | Zlotnick | ................ | C07K 14/22 424/234.1 |
| 8,101,194 B2* | 1/2012 | Zlotnick | ............. | A61K 39/095 424/193.1 |
| 8,318,179 B2* | 11/2012 | Maiden | ................... | A61P 31/04 424/203.1 |
| 8,470,340 B2* | 6/2013 | Beernink | ................ | A61P 31/04 424/234.1 |
| 8,563,006 B2* | 10/2013 | Zlotnick | ................ | C07K 14/22 424/193.1 |
| 8,968,748 B2* | 3/2015 | Granoff | ................... | A61P 31/04 424/234.1 |
| 9,034,345 B2* | 5/2015 | Granoff | ................... | A61P 43/00 424/234.1 |
| 9,073,990 B2* | 7/2015 | Paas | ........................ | B82Y 5/00 |
| 9,387,239 B2* | 7/2016 | Zollinger | ............. | A61K 39/095 |
| 9,452,208 B2* | 9/2016 | Granoff | ................... | C07K 14/22 |
| 9,468,673 B2* | 10/2016 | Pizza | ....................... | C07K 14/22 |
| 9,511,131 B2* | 12/2016 | Granoff | ................... | A61P 31/04 |
| 9,579,372 B2* | 2/2017 | Pizza | ....................... | A61P 37/04 |
| 9,629,905 B2* | 4/2017 | Tang | ....................... | C07K 14/22 |
| 10,046,043 B2* | 8/2018 | Granoff | ................ | A61K 39/095 |
| 10,183,070 B2* | 1/2019 | Jansen | ................... | A61K 47/10 |
| 10,195,264 B2* | 2/2019 | Contorni | ................ | A61P 31/04 |
| 10,196,429 B2* | 2/2019 | Anderson | ............. | C07K 14/22 |
| 10,245,311 B2* | 4/2019 | Contorni | ................ | A61P 37/04 |
| 10,266,572 B2* | 4/2019 | Beernink | ................ | A61P 37/04 |
| 10,272,147 B2* | 4/2019 | Costantino | ........... | A61K 39/095 |
| 10,300,122 B2* | 5/2019 | Zlotnick | ............. | A61P 31/04 |
| 10,328,142 B2* | 6/2019 | Comanducci | ........ | A61K 39/102 |
| 10,342,860 B2* | 7/2019 | Beernink | ............. | A61K 39/095 |
| 10,376,573 B2* | 8/2019 | Pizza | ....................... | A61P 37/04 |
| 10,392,424 B2* | 8/2019 | Bottomley | ............ | C07K 14/22 |
| 10,478,483 B2* | 11/2019 | Aricò | ..................... | A61K 39/095 |
| 10,478,484 B2* | 11/2019 | Granoff | ................ | A61K 39/095 |
| 10,512,681 B2* | 12/2019 | Anderson | ............... | A61P 37/04 |
| 10,543,267 B2* | 1/2020 | Jansen | ............... | C07K 16/1217 |
| 10,550,159 B2* | 2/2020 | Anderson | ............. | C07K 14/22 |
| 10,568,953 B2* | 2/2020 | Contorni | ................ | A61P 31/04 |
| 10,596,246 B2* | 3/2020 | Arico | ..................... | A61K 39/39 |
| 10,598,666 B2* | 3/2020 | Giuliani | ........... | G01N 33/56911 |
| 10,813,989 B2* | 10/2020 | Jansen | ................. | A61K 47/646 |

(Continued)

FOREIGN PATENT DOCUMENTS

JP    2009-517377 A    4/2009
JP    2013-537884 A    10/2013
(Continued)

OTHER PUBLICATIONS

Granoff, Clinical Infectious Diseases, Mar. 1, 2010. vol. 50, Supplement 2, pp. S54-S65 (Year: 2010).*
Hollingshead et al, Nature Communications, 2018, 9:1051, 10 pages. published online: Mar. 13, 2018 (Year: 2018).*
Van der Veen et al. Infection and Immunity, Mar. 2014. 82/3:1157-1163. published ahead of print: Dec. 30, 2013 (Year: 2013).*
Lavender et al. New Biotechnology, Jul. 2014. vol. 31, Supp. Suppl. 1,pp. S66. Abstract No. 017-2 (Year: 2014).*
Malito et al, PNAS USA. Feb. 26, 2013, 110/9:3304-3309. (Year: 2013).*

(Continued)

*Primary Examiner* — Gary B Nickol
*Assistant Examiner* — Khatol S Shahnan Shah
(74) *Attorney, Agent, or Firm* — Thomas| Horstemeyer, LLP

(57) ABSTRACT

The invention relates to a modified factor H binding protein (fHbp), comprising fHbp, or a variant thereof, modified with the addition of at least one exogenous peptide loop; and associated nucleic acid, compositions, and uses. The invention further relates to treatment or prevention of a pathogenic infection or colonisation of a subject using the modified factor H binding protein (fHbp).

Figure 1:
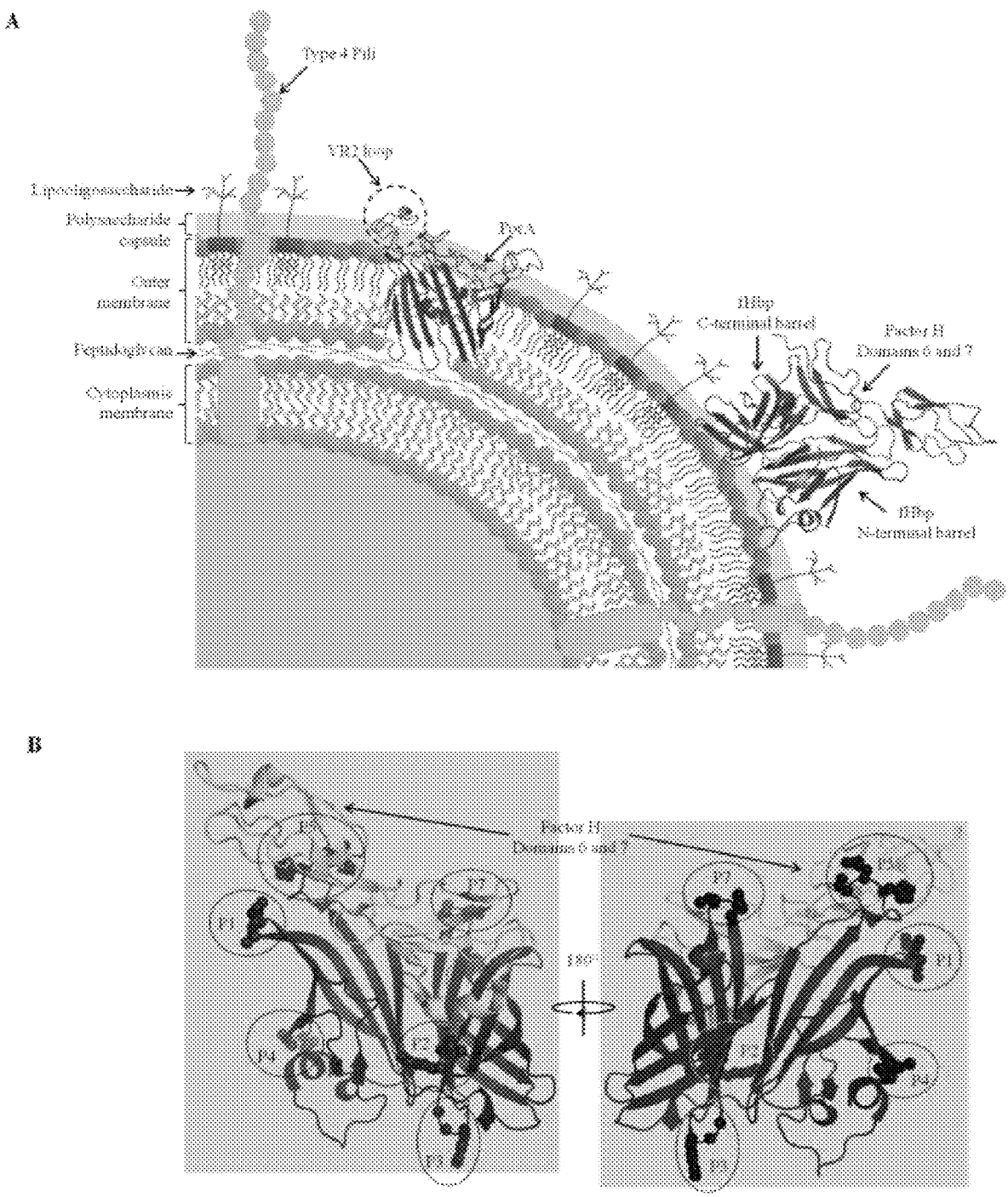

6 Claims, 9 Drawing Sheets
Specification includes a Sequence Listing.

(56) References Cited

U.S. PATENT DOCUMENTS

| | | | | |
|---|---|---|---|---|
| 10,829,521 | B2* | 11/2020 | Anderson | A61K 39/095 |
| 10,857,221 | B2* | 12/2020 | Granoff | A61K 9/127 |
| 10,888,611 | B2* | 1/2021 | Jansen | A61P 31/04 |
| 10,899,802 | B2* | 1/2021 | Anderson | A61K 39/0016 |
| 11,077,180 | B2* | 8/2021 | Anderson | C07K 14/22 |
| 11,116,829 | B2* | 9/2021 | Zlotnick | C07K 14/22 |
| 2011/0020391 | A1* | 1/2011 | Suzer | A61P 31/12 435/235.1 |
| 2012/0052092 | A1* | 3/2012 | Exley | A61P 31/12 424/250.1 |
| 2012/0107339 | A1* | 5/2012 | Granoff | A61P 37/04 435/69.3 |
| 2015/0071959 | A1* | 3/2015 | Anderson | A61K 39/13 424/190.1 |
| 2015/0190494 | A1* | 7/2015 | Tang | C07K 14/22 536/23.7 |
| 2016/0030544 | A1* | 2/2016 | Tang | C07K 14/22 424/190.1 |
| 2017/0065699 | A1* | 3/2017 | Granoff | A61K 9/127 |
| 2018/0214532 | A1* | 8/2018 | Jansen | A61K 47/10 |
| 2022/0112249 | A1* | 4/2022 | Tang | C07K 14/22 |

FOREIGN PATENT DOCUMENTS

| | | | | | |
|---|---|---|---|---|---|
| WO | WO-2004032958 | A1* | 4/2004 | | A61K 39/05 |
| WO | WO-2004048404 | A2* | 6/2004 | | A61K 39/095 |
| WO | WO-2004053091 | A2* | 6/2004 | | A61K 39/12 |
| WO | WO-2004067030 | A2* | 8/2004 | | A61K 39/095 |
| WO | WO-2005032583 | A2* | 4/2005 | | A61K 39/095 |
| WO | WO-2005102384 | A2* | 11/2005 | | A61K 39/095 |
| WO | WO-2006011060 | A2* | 2/2006 | | C12N 15/62 |
| WO | WO-2006024954 | A2* | 3/2006 | | A61K 39/095 |
| WO | WO-2007060548 | A2* | 5/2007 | | A61K 38/164 |
| WO | 2009/114485 | A2 | 9/2009 | | |
| WO | WO-2009150531 | A1* | 12/2009 | | C07K 16/1217 |
| WO | WO-2010127172 | A2* | 11/2010 | | A61K 39/095 |
| WO | WO-2011024072 | A2* | 3/2011 | | C07K 14/22 |
| WO | WO-2011051893 | A1* | 5/2011 | | A61K 39/092 |
| WO | WO-2011110635 | A1* | 9/2011 | | A61K 39/095 |
| WO | WO-2013078223 | A1* | 5/2013 | | C07K 16/1217 |
| WO | WO-2013132452 | A2* | 9/2013 | | A61K 39/00 |
| WO | WO-2014136064 | A2* | 9/2014 | | A61K 39/092 |
| WO | WO-2014140562 | A1* | 9/2014 | | A61K 39/095 |
| WO | 2016/083583 | A1 | 6/2016 | | |
| WO | WO-2018042178 | A1* | 3/2018 | | A61K 39/095 |

OTHER PUBLICATIONS

Jongerius et al. PLoS Pathogens. 2013. 9(8): e1003528. 12 pages. published: Aug. 1, 2013. (Year: 2013).*
Pajon et al, PLoS Negl. Trop. Dis. 2011. 5(9): e1302. published: Sep. 6, 2011. (Year: 2011).*
Vu et al, Vaccine, 2011. 29/10: 1968-1973. Available online: Jan. 15, 2011 (Year: 2011).*
International Search Report & Written Opinion for PCT/GB2017/052535, dated Dec. 12, 2017, pp. 1-15.
Beernink Peter T et al: "Impaired immunogenicity of a meningococcal factor H-binding protein vaccine engineered to eliminate factor h binding", Clinical and Vaccine Immuno, American Society for Microbiology, Washington, DC, US, vol. 17, No. 7, Jul. 1, 2010 (Jul. 1, 2010), pp. 1074-1078.
Scarselli Maria et al: "Rational design of a meningococcal antigen inducing broad protective immunity", Science Translational Medi, AAAS—American Association for the Advancement of Science, US, vol. 3, No. 91, Jul. 13, 2011 (Jul. 13, 2011).
International Preliminary Report on Patentability for PCT/GB2017/052535, dated Mar. 5, 2019, pp. 1-8.
European Examination Report for Application No. 17 762 178.6, dated Mar. 15, 2022, pp. 1-5.
Valentina Rippa et al: "Molecular Engineering of Ghfp, the Gonococcal Orthologue of Neisseria meningitidis Factor H Binding Protein", Clinical and Vaccine Immunology, vol. 22, No. 7, May 6, 2015 (May 6, 2015), pp. 769-777.
Japanese Office Action for Application No. 2019-511993, dated Jun. 18, 2021, pp. 1-7 (Translation Included).
Johnson et al., "Design and Evaluation of Meningococcal Vaccines through Structure-Based Modification of Host and Pathogen Molecules", Oct. 2012, PLOS Pathogens, vol. 8, Issue 10, e10002981.
Korean Office Action for Application No. 10-2019-7008694, dated Sep. 14, 2022, pp. 1-7 (Translation Only).
Israeli Office Action for Application No. IL 265078, dated Jun. 4, 2022, pp. 1-6 (Translation Included).

* cited by examiner

MODIFIED FACTOR H BINDING PROTEIN

CROSS-REFERENCE TO RELATED APPLICATIONS

This application is the National Stage of International Application No. PCT/GB2017/052535, filed Aug. 31, 2017, which claims the priority to GB 1614687.0, filed Aug. 31, 2016, which are entirely incorporated herein by reference.

SEQUENCE LISTING

This application contains a sequence listing filed in electronic form as an ASCII.txt file entitled "JA69120P.WOP sequence listing_ST25_v2.TXT", created on Dec. 7, 2021 and having a size of 118 kb. The content of the sequence listing is incorporated herein in its entirety.

This invention relates to a modified factor H binding protein (fHbp) and its use to elicit an immune response against pathogenic infection or colonisation, such as against *Neisseria meningitidis* or *Neisseria gonorrhoeae*.

*Neisseria meningitidis* (Nm) remains a leading cause of sepsis and bacterial meningitis in children and young adults. The onset of disease can be extremely rapid, with fatality rates of around 10% for septicaemic disease[1], while those that survive can suffer significant disabilities including loss of limbs and neurological deficits[1]. Therefore prophylactic immunisation is the best way to protect individuals from meningococcal infection. Vaccines are available based on the bacterial capsule[2], but there are only partially effective vaccines available for endemic serogroup B infection, which causes over 80% of cases in the UK currently[3]; the polysaccharide of serogroup B capsule Nm is poorly immunogenic as it has structural identity with a human glycoprotein in neural tissue and could induce autoimmunity if used as a vaccine[4]. Therefore there is an urgent need to generate novel vaccines, and there are intense efforts in academia and industry to achieve this important goal.

The major target of the immune response elicited against meningococcal outer membrane vesicles (OMVs) is PorA[16,17,18], an integral outer membrane protein (OMP) in the meningococcus[19]. However, the sequence of this protein is diverse and the prevalence of particular variants differs by geographic region, and OMV vaccines are largely PorA-specific. Variants of PorA are identified by sequences in the variable-regions (VR) of the protein, which are located in the surface-exposed loops of the protein and are the target of immune responses[17]. PorA has seven extracellular loops; the fourth loop is variable region 2 (VR2) and is the target of most serum bactericidal activity (SBA) generated by PorA following natural infection and after immunisation with OMVs[16,18]. SBA is a known correlate of protection against meningococcal disease. Despite sequence diversity, around 70% of UK isolates would be covered by vaccines containing six PorA proteins.

A major obstacle for bacterial vaccine development is the difficulty in producing quantities of integral OMPs, such as PorA, in their native conformation. This is because OMPs contain hydrophobic domains which span the membrane and do not fold correctly when expressed as soluble recombinant proteins. Correct folding is critical for PorA as SBA is elicited by conformational, and not linear, epitopes of the protein[20]. Previous attempts to use PorA peptides as vaccines have not been successful because they have not been sufficiently immunogenic and do not present the immunogenic portion of PorA in its correct conformation. Consequently, the only PorA-based vaccines under development are OMVs, which have limited efficacy in infants[2], are reactogenic[21], and poorly defined providing regulatory issues. OMVs as immunogens are not favoured because consistency and toxicity can be problematic during manufacture. For example, OMVs may contain toxic lipopolysaccharide (LPS).

Meningococcal factor H binding protein (fHbp) is a surface-exposed lipoprotein that consists of two β-barrels[5] (FIG. 1A). The N-terminal β-barrel of fHbp has a relatively open structure, while the C-terminal β-barrel is stabilised by extensive hydrogen bonding between the seven β-strands, which form this barrel[5].

Importantly, fHbp is a key antigen in vaccines against serogroup B Nm under development by pharmaceutical companies such as Pfizer, GSK, and others, and is included in next generation OMV vaccines[6,7,8]. The Pfizer vaccine consists of two fHbps, while the GSK vaccine has a single fHbp in a cocktail of other antigens which includes an OMV. fHbp binds human, but not murine, factor H (fH)[9,10], an abundant plasma protein that down regulates the complement system[11], a critical aspect of immunity against Nm[12]. Immunisation of adolescents and adults with fHbp elicits SBA[13].

fHbp has been categorised into different schemes based on its predicted amino acid sequence. In the present application, three variant groups (v1, v2 and v3[7]) and peptide numbers are recognised. Importantly, serum raised against v1 fHbp does not mediate SBA against Nm expressing v2 and v3 proteins, and vice versa. The GSK vaccine contains a single v1 protein (v1.1), while the Pfizer formulation includes a v1 and v3 fHbp[13,14]. Therefore no current vaccine includes a v2 fHbp even though between a significant proportion of disease in the UK is currently caused by strains expressing fHbp from this variant group[3,15].

WO2011024072 is a patent application that describes the use of fHbp which is selected or engineered to have a sequence which can elicit broad-spectrum bactericidal anti-meningococcal antibodies after administration to a host animal. This document teaches that additional meningococcal antigens may be provided with the engineered fHbp in the form of a N- or C-terminal fusion protein. However, such a proposal is unlikely to produce a protein that would present the immunogenic portion of many meningococcal antigens, such as PorA, in correct conformation and they would not be sufficiently immunogenic.

An aim of the present invention is to provide an alternative and improved immunogenic molecules for vaccination against pathogenic organisms, particularly to prevent or reduce meningococcal or gonococcal infection or colonisation.

According to a first aspect of the invention, there is provided a modified factor H binding protein (fHbp), comprising fHbp, or a variant thereof, to act as a molecular scaffold by modification with the addition of at least one exogenous peptide loop from a different antigen.

It has been shown herein that immunogenic peptides, such as those from PorA, can be introduced into factor H binding protein (fHbp), which acts as a molecular scaffold. The peptides that are introduced into fHbp are presented to the immune system and are able to elicit protective responses such as SBA. Advantageously, the fHbp molecule provides an ideal molecular scaffold for stable inclusion of peptide loops for the display of epitopes, particularly for epitopes that are difficult to stabilise and display in their native conformation, for example loops from integral OMPs such as PorA. This is in contrast to teachings such as in WO2011024072, where simple N- or C-terminal fusions of fHbp and additional antigen would not solve inherent stability and solubility difficulties with some antigens. In particular, many OMPs, such as PorA, are difficult to express because of the insolubility of their membrane spanning domains. PorA has a 16-beta stranded barrel structure with the surface-exposed loops between strands 1 and 2 (loop 1), strands 7 and 8 (loop 4), strands 9 and 10 (loop 5) and strands 11 and 12 (loop 7) demonstrated to be the most effective antigens. fHbp contains two beta barrels, therefore the peptide loop sequences from OMPs can be inserted into the tips of the loops between beta-strands of fHbp to present the extra-cellular loop fragments from integral OMPs, in their native conformations for immunisation. Therefore, the modified fHbp scaffold molecule of the invention may be used as a prophylactic or a therapeutic vaccine directed to Nm or the gonococcus in which a single protein presents key epitopes from two different antigens.

In one embodiment, the fHbp is meningococcal fHbp. In another embodiment, the fHbp is gonococcal fHbp. The fHbp may comprise any one of variants v1, v2 and v3. In one embodiment, the fHbp may comprise fHbp v1. In another embodiment, the fHbp may comprise fHbp v2. In another embodiment, the fHbp may comprise fHbp v3.

In one embodiment, the fHbp variant v1 may be variant v1.1, v1.13, v1.14, v1.15, v1.4, or v1.55. In one embodiment, the fHbp variant v1 may not be v1.1. In one embodiment, the fHbp variant v1 may not be v1.55. In one embodiment, the fHbp variant v1 may not be v1.1 or v1.55. In one embodiment, the fHbp variant v2 may be variant v2.16, v2.19, v2.22, or v2.25. In one embodiment, the fHbp variant v3 may be variant v3.45. In one embodiment, the fHbp comprises any one of fHbp variants v1.4, v2.25 or v3.45.

A variant of fHbp may comprise an orthologue of fHbp. For example, a variant of fHbp may comprise Ghfp, the Gonococcal homologue of fHbp. Ghfp is non-functional and closely related to V3 fHbps (>95% aa identity, dissociation constant KD>100 μM with factor H).

In one embodiment, the fHbp which is to be further modified with the at least one exogenous peptide loop may comprise or consist of the sequence of

```
            (SEQ ID NO: 1, fHbp V1.1 GI: 316985482)
CSSGGGGVAA DIGAGLADAL TAPLDHKDKG LQSLTLDQSV

RKNEKLKLAA QGAEKTYGNG DSLNTGKLKN DKVSRFDFIR

QIEVDGQLIT LESGEFQVYK QSHSALTAFQ TEQIQDSEHS

GKMVAKRQFR IGDIAGEHTS FDKLPEGGRA TYRGTAFGSD

DAGGKLTYTI DFAAKQGNGK IEHLKSPELN VDLAAADIKP

DGKRHAVISG SVLYNQAEKG SYSLGIFGGK AQEVAGSAEV

KTVNGIRHIG LAAKQ.
```

In another embodiment, the fHbp which is to be further modified with the at least one exogenous peptide loop may comprise or consist of the sequence of

```
            (SEQ ID NO: 2, fHbp V1.4 GI: 989557230)
CSSGGGGVAA DIGAGLADAL TAPLDHKDKS LQSLTLDQSV

RKNEKLKLAA QGAEKTYGNG DSLNTGKLKN DKVSRFDFIR

QIEVDGQLIT LESGEFQVYK QSHSALTALQ TEQVQDSEHS

GKMVAKRQFR IGDIAGEHTS FDKLPEGGRA TYRGTAFGSD

DASGKLTYTI DFAAKQGHGK IEHLKSPELN VDLAASDIKP

DKKRHAVISG SVLYNQAEKG SYSLGIFGGQ AQEVAGSAEV

ETANGIRHIG LAAKQ.
```

In another embodiment, the fHbp which is to be further modified with the at least one exogenous peptide loop may comprise or consist of the sequence of

```
            (SEQ ID NO: 3, fHbp V1.13 GI: 752774533)
CSSGGGGVAA DIGAGLADAL TAPLDHKDKG LQSLTLDQSV

RKNEKLKLAA QGAEKTYGNG DSLNTGKLKN DKVSRFDFIR

QIEVDGKLIT LESGEFQVYK QSHSALTALQ TEQVQDSEDS

GKMVAKRQFR IGDIAGEHTS FDKLPKGGSA TYRGTAFGSD

DAGGKLTYTI DFAAKQGHGK IEHLKSPELN VELATAYIKP

DEKRHAVISG SVLYNQDEKG SYSLGIFGGQ AQEVAGSAEV

ETANGIHHIG LAAKQ.
```

In another embodiment, the fHbp which is to be further modified with the at least one exogenous peptide loop may comprise or consist of the sequence of

```
            (SEQ ID NO: 4, fHbp V1.14 GI: 630057376)
CSSGGGGVAA DIGAGLADAL TAPLDHKDKS LQSLTLDQSV

RKNEKLKLAA QGAEKTYGNG DSLNTGKLKN DKVSRFDFIR

QIEVDGQLIT LESGEFQVYK QSHSALTALQ TEQEQDPEHS

GKMVAKRRFK IGDIAGEHTS FDKLPKDVMA TYRGTAFGSD

DAGGKLTYTI DFAAKQGHGK IEHLKSPELN VELATAYIKP

DEKHHAVISG SVLYNQDEKG SYSLGIFGGQ AQEVAGSAEV

ETANGIHHIG LAAKQ.
```

In another embodiment, the fHbp which is to be further modified with the at least one exogenous peptide loop may comprise or consist of the sequence of

```
            (SEQ ID NO: 5, fHbp V1.15 GI:504394462)
CSSGGGGSGG GGVAADIGAG LADALTAPLD HKDKGLKSLT

LEDSISQNGT LTLSAQGAER TFKAGDKDNS LNTGKLKNDK

ISRFDFIRQI EVDGQLITLE SGEFQVYKQS HSALTALQTE

QVQDSEHSGK MVAKRQFRIG DIVGEHTSFG KLPKDVMATY

RGTAFGSDDA GGKLTYTIDF AAKQGHGKIE HLKSPELNVD

LAAADIKPDE KHHAVISGSV LYNQAEKGSY SLGIFGGQAQ

EVAGSAEVET ANGIRHIGLA AKQ.
```

In another embodiment, the fHbp which is to be further modified with the at least one exogenous peptide loop may comprise or consist of the sequence of

```
                    (SEQ ID NO: 6, fHbpV 1.55 GI:40353481)
CSSGGGGSGG GGVTADIGTG LADALTAPLD HKDKGLKSLT

LEDSISQNGT LTLSAQGAEK TYGNGDSLNT GKLKNDKVSR

FDFIRQIEVD GQLITLESGE FQVYKQSHSA LTALQTEQEQ

DPEHSEKMVA KRRFRIGDIA GEHTSFDKLP KDVMATYRGT

AFGSDDAGGK LTYTIDFAAK QGHGKIEHLK SPELNVDLAV

AYIKPDEKHH AVISGSVLYN QDEKGSYSLG IFGEKAQEVA

GSAEVETANG IHHIGLAAKQ.
```

In another embodiment, the fHbp which is to be further modified with the at least one exogenous peptide loop may comprise or consist of the sequence of

```
                    (SEQ ID NO: 7, fHbp V2.16 GI:488155511)
CSSGGGGVAA DIGAGLADAL TAPLDHKDKS LQSLTLDQSV

RKNEKLKLAA QGAEKTYGNG DSLNTGKLKN

A variant of fHbp may comprise one or more amino acid residue mutations, including additions, deletions or substitutions, relative to wild type fHbp in addition to the exogenous peptide loop(s) provided on the modified fHbp. For example, the fHbp may act as a scaffold upon which exogenous peptide loops are provided and the variants relative to wild-type may comprise amino acid mutations in the scaffold framework in regions outside of the exogenous peptide loop(s) attachment points. Reference to wild-type fHbp may refer to any one of the variants of fHbp discussed herein, for example any one of SEQ ID NOs: 1 to 13).

A variant of fHbp may comprise at least one amino acid change compared to the amino acid in the wild type protein. A variant of fHbp may comprise no more than one amino acid change compared to the wild type protein. A variant of fHbp may comprise no more than three amino acid changes compared to the wild type protein. A variant of fHbp may comprise no more than four amino acid changes compared to the wild type protein. A variant of fHbp may comprise no more than five amino acid changes compared to the wild type protein. A variant of fHbp may comprise no more than six amino acid changes compared to the wild type protein. In one embodiment, a variant of fHbp is provided which comprises six amino acid mutations compared to the wild type protein.

Amino acid substitutions may be conservative substitutions. For example, a mutated residue may comprise substantially similar properties as the wild-type substituted residue. For example, a substituted residue may comprise substantially similar or equal charge or hydrophobicity as the wild-type substituted residue. For example, a substituted residue may comprise substantially similar molecular weight or steric bulk as the wild-type substituted residue.

In one embodiment a variant fHbp may have at least 75% identity with wild-type. In another embodiment a variant fHbp may have at least 80% identity with wild-type. In another embodiment a variant fHbp may have at least 85% identity with wild-type. In another embodiment a variant fHbp may have at least 90% identity with wild-type. In another embodiment a variant fHbp may have at least 95% identity with wild-type. In another embodiment a variant fHbp may have at least 98% identity with wild-type. In another embodiment a variant fHbp may have at least 99% identity with wild-type. In another embodiment a variant fHbp may have at least 99.5% identity with wild-type. The above percentage variation is not intended to include percentage identity variation with addition of the exogenous peptide loop(s) (i.e. it is the percentage identity of the fHbp component alone relative to the wild-type), and does not include deletion of fHbp sequence at the site where loops from other proteins are inserted.

The modified fHbp may be modified such that it is not capable of binding factor H, or at least has reduced factor H binding activity. The modified fHbp may be non-functional relative to the function of wild-type fHbp. In one embodiment, the modified fHbp has an impaired capacity to bind CFH with a KD>2 orders of magnitude compared with the wild-type protein. Non-functional fHbps may be provided by mutation of the fHbp sequence. In one embodiment, non-functional fHbps may be provided by one or more of the exogenous peptide loops preventing the binding site of factor H.

The amino acid residue mutation(s) may prevent or reduce complement factor H binding of the modified fHbp. In another embodiment, the amino acid residue mutation(s) may not substantially affect the fHbp function. In one embodiment, the amino acid residue mutation(s) in the fHbp, or variants thereof, may be selected from the group consisting of the amino acid at position 85, 133, 134, 135, 136, 204, 206, 211, 212, 213, 222, 225, 227, 231, and 252 on v1.1 fHbp or corresponding position in other fHbps.

In one embodiment, the amino acid residue mutation(s) may comprise or consist of a substitution to alanine instead of the wild type residue. In one embodiment, the amino acid residue change(s) may comprise or consist of a substitution to any other amino acid instead of the wild type residue.

Advantageously, providing a non-functional fHbp (i.e. non- or less-binding of factor H) can eliminate or reduce any adverse effects of factor H recruitment on the success of the vaccine.

In one embodiment, the amino acid residue mutation(s) may enhance the stability of the modified fHbp in particular, in an embodiment wherein fHbp V2 is provided, the fHbp V2 may be stabilised by mutations in the fHbp V2 sequence. Details of the mutations for V2 stability may be found in WO2014030003, which is herein incorporated by reference. For example, the amino acid substitution for stabilisation may be at one or more of the amino acids at position 35, 36, 42, 43, 46, 107, 112, 114, 137 and 138 in fHbp V2. The substitution for stabilisation may be at one or more of Ser35, Leu36, Asp42, Glu43, Arg46, Asp107, Val112, Leu114, Ser137, and Gly138.

In one embodiment, the exogenous peptide loop(s) is immunogenic. The exogenous peptide loop(s) may be derived from an outer membrane/surface exposed protein.

The exogenous peptide loop(s) may be prokaryotic in origin. The exogenous peptide loop(s) may be derived from a protein on the bacterium, such as an outer membrane protein (OMP) of a pathogen. The OMP may be an integral OMP or a lipoprotein. The exogenous peptide loop(s) may be derived from a meningococcal protein, such as a meningococcal outer membrane protein. The exogenous peptide loop(s) may be derived from an outer membrane protein of another pathogen such as *N. gonorrhoeae*.

The exogenous peptide loop may comprise a fragment of a transmembrane beta barrel protein. The exogenous peptide loop may comprise a fragment of a beta barrel porin protein. The exogenous peptide loop may comprise a fragment of PorA. In another embodiment, the exogenous peptide loop may comprise a fragment of FetA.

The exogenous peptide loop(s), such as PorA fragments, may be 16 amino acids in length. In one embodiment, the exogenous peptide loop(s), such as PorA fragments, may be between 8 and 20 amino acids in length. In another embodiment, the exogenous peptide loop(s), such as PorA fragments, may be between 8 and 16 amino acids in length. In another embodiment, the exogenous peptide loop(s), such as PorA fragments, may be between 10 and 16 amino acids in length. In another embodiment, the exogenous peptide loop(s), such as PorA fragments, may be between 12 and 16 amino acids in length. In another embodiment, the exogenous peptide loop(s), such as PorA fragments, may be between 14 and 18 amino acids in length. In another embodiment, the exogenous peptide loop(s), such as PorA fragment, may be any length sufficient to provide an immunogenic epitope. In another embodiment, the exogenous peptide loop(s), such as PorA fragments, may be any length sufficient to provide an immunogenic epitope and maintain native conformation relative to the fragment in wild-type.

The exogenous peptide loop(s) may be selected from any one of the PorA loops 1 to 7, or fragments thereof; and/or combinations thereof. The exogenous peptide loop(s) may be selected from any one of the PorA loops of loop 1 (from between beta-strands 1 and 2), loop 4 (from between beta-strands 7 and 8), loop 5 (from between beta-strands 9 and 10) and loop 7 (from between beta-strands 11 and 12; or fragments thereof; and/or combinations thereof.

The exogenous peptide loop may comprise any one peptide selected from PorA loop 1 (between beta-strands 1 and 2); loop 4 (between beta-barrels 7 and 8); and loop 5 (between beta-strands 9 and 10); or fragments thereof; and/or combinations thereof.

The exogenous peptide loop may comprise PorA loop 1 (between beta-barrels 1 and 2), or a fragment thereof. The an exogenous peptide loop may comprise PorA loop 4 (between beta-strands 7 and 8), or a fragment thereof. The exogenous peptide loop may comprise PorA loop 5 (between beta-strands 9 and 10), or a fragment thereof.

The skilled person will understand that variant sequences of PorA loops may be provided with minor mutations relative to wild-type and may still function as an epitope. Therefore, the exogenous peptide loop(s) may comprise PorA loop variants. Variants may include one or more amino acid additions, deletions or substitutions relative to the wild-type sequence. In another embodiment, variants may include no more than one amino acid addition, deletion or substitution relative to the wild-type sequence. In another embodiment, variants may include no more than 2, 3, 4 or 5 amino acid additions, deletions or substitutions relative to the wild-type sequence. The substitutions may be conservative substitutions. For example, providing an alternative amino acid residue having substantially similar properties, such as charge, hydrophobicity, steric size or molecular weight. Variants may include sequences having at least 85% sequence identity with wild-type PorA loop sequence. In another embodiment, variants may include sequences having at least 90%, 95%, 98%, 99%, or 99.5% sequence identity with wild-type PorA loop sequence.

In one embodiment, the modified fHbp may comprise two or more exogenous peptide loops. In one embodiment, the exogenous peptide loop in at least one position. The modified fHbp, or variant thereof, may be modified with an exogenous peptide loop in at least two positions. The modified fHbp, or variant thereof, may be modified with an exogenous peptide loop in at least three positions. The modified fHbp, or variant thereof, may be modified with an exogenous peptide loop in at least four positions. The modified fHbp, or variant thereof, may be modified with an exogenous peptide loop in at least five positions. The modified fHbp, or variant thereof, may be modified with an exogenous peptide loop in at least six positions. The modified fHbp, or variant thereof, may be modified with an exogenous peptide loop in at least seven positions.

A peptide loop may be provided (for example using fHbp as a scaffold) between two beta sheets of the factor H binding protein. The peptide loop may be inserted into fHbp, or a variant thereof, at one or more of amino acid positions selected from positions where exogenous peptide loops, such as PorA loops, can be inserted (range is inclusive of all residues in loop) between amino acids 49-54, 83-88, 114-124, 199-206, 227-233, and 240-246 of v1.1 fHbp or corresponding positions in other fHbps.

The at least one exogenous peptide loop may not be provided as an N- or C-terminal fusion.

Sequences of fHbp into which the exogenous peptide loop(s) can be inserted may be at any of those positions underlined with regards to fHbp V1.1 primary amino acid sequence below. In an embodiment using an alternative variant fHBP, the insert sites may be at equivalent positions.

Position 1 in fHbp (P1), residues 83-88
P2, residues 199-206
P3, residues 227-233
P4, residues 49-54
P5, residues 114-124
P7, residues 240-246

```
                                                            (SEQ ID NO: 14)
  1 CSSGGGGVAA DIGAGLADAL TAPLDHKDKG LQSLTLDQSV RKNEKLKLAA
                                                       P4

51 QGAEKTYGNG DSLNTGKLKN DKVSRFDFIR QIEVDGQLIT LESGEFQVYK
    P4                                P1

101 QSHSALTAFQ TEQIQDSEHS GKMVAKRQFR IGDIAGEHTS FDKLPEGGRA
               P5

151 TYRGTAFGSD DAGGKLTYTI DFAAKQGNGK IEHLKSPELN VDLAAADIKP
                                                       P2

201 DGKRHAVISG SVLYNQAEKG SYSLGIFGGK AQEVAGSAEV KTVNGIRHIG
    P2                              P3                  P7

251 LAAKQ
``` modified fHbp may comprise three or more exogenous peptide loops. In one embodiment, the modified fHbp may comprise between 1 and 7 exogenous peptide loops. In one embodiment, the modified fHbp may comprise between 1 and 5 exogenous peptide loops. In one embodiment, the modified fHbp may comprise between 1 and 3 exogenous peptide loops. In one embodiment, the modified fHbp may comprise between 2 and 7 exogenous peptide loops. In one embodiment, the modified fHbp may comprise between 3 and 7 exogenous peptide loops. In one embodiment, the modified fHbp may comprise between 2 and 5 exogenous peptide loops. In one embodiment, the modified fHbp may comprise between 3 and 5 exogenous peptide loops. The modified fHbp, or variants thereof, may be modified with an In one embodiment, the insert site of an exogenous peptide loop may be at position 1 in fHbp (P1), residues 83-88 (Sequence EVDGQL (SEQ ID NO: 15)). In another embodiment, the insert site of an exogenous peptide loop may be at position P2, residues 199-206 (Sequence KPDGKRHA (SEQ ID NO: 16)). In another embodiment, the insert site of an exogenous peptide loop may be at position P3, residues 227-233 (Sequence FGGKAQE (SEQ ID NO: 17)). In another embodiment, the insert site of an exogenous peptide loop may be at position P4, residues 49-54 (Sequence AAQGAE (SEQ ID NO: 18)). In another embodiment, the insert site of an exogenous peptide loop may be at position P5, residues 114-124 (Sequence IQDSEHSGKM (SEQ ID NO: 19)). In another embodiment, the insert site of an exogenous peptide loop may be at position P7, residues 240-246 (Sequence KTVNGI (SEQ ID NO: 20)).

The exogenous peptide loop insert site at any given position 1-7 may be between any of the residues identified at positions 1 to 7 of fHbp. Alternatively, The exogenous peptide loop insert site at any given position 1-7 may be before the first residue or after the last residue identified at positions 1 to 7 of fHbp. For example if the exogenous peptide loop is inserted at position 4, the insert may be *AAQGAE (SEQ ID NO: 21), A*AQGAE (SEQ ID NO: 22), AA*QGAE (SEQ ID NO: 23), AAQ*GAE (SEQ ID NO: 24), AAQG*AE (SEQ ID NO: 25), AAQGA*E (SEQ ID NO: 26), or AAQGAE* (SEQ ID NO: 27), where * denotes the insert site.

In another embodiment, the skilled person will understand that the exogenous peptide loop insertion site may be variable such that between 1 and 5 residues in the region of the insertion site may be removed from fHbp (e.g. replaced by the loop) without significantly affecting the fHbp structure. In one embodiment, one or more of the amino acid residues at the identified positions are replaced/substituted by an exogenous peptide loop. In an alternative embodiment, two, three, four, five or more of the amino acid residues at the identified positions are replaced/substituted by an exogenous peptide loop. In another embodiment, the exogenous peptide loop insertion site may be variable such that between 1 and 3 residues in the region of the insertion site may be removed from fHbp (e.g. replaced by the loop) without significantly affecting the fHbp structure. In another embodiment, the exogenous peptide loop insertion site may be variable such that 1 or 2 residues in the region of the insertion site may be removed from fHbp (e.g. replaced by the loop) without significantly affecting the fHbp structure. In another embodiment, the exogenous peptide loop insertion site may be variable such that 1 residue in the region of the insertion site may be removed from fHbp (e.g. replaced by the loop) without significantly affecting the fHbp structure. For example, where an insertion site is amino acid residue 86 at one end of the loop and residue 87 at the other end of the loop, a variant can include a 5, 4, 3, 2, or 1 residue replacement with the loop in the region of the stated insertion site. In an alternative embodiment, six or more of the amino acid residues at the identified positions are replaced/substituted by an exogenous peptide loop. In an alternative embodiment, seven or more (where applicable) of the amino acid residues at the identified positions are replaced/substituted by an exogenous peptide loop. In an alternative embodiment, eight or more (where applicable) of the amino acid residues at the identified positions are replaced/substituted by an exogenous peptide loop. In an alternative embodiment, nine or more (where applicable) of the amino acid residues at the identified positions are replaced/substituted by an exogenous peptide loop. The entire amino acid residues of any of insert positions 1 to 7 may be substituted with an exogenous peptide loop.

For example if the exogenous peptide loop is inserted at position 4 and substitutes one or more residues, the insert may be A*QGAE (SEQ ID NO: 28), AA*GAE (SEQ ID NO: 29), AA*AE (SEQ ID NO: 30), AA*E (SEQ ID NO: 31), AA*, A*GAE (SEQ ID NO: 32), A*AE (SEQ ID NO: 33), AA*E (SEQ ID NO: 34), A*E, A*, *AQGAE (SEQ ID NO: 35), *QGAE (SEQ ID NO: 36), *GAE (SEQ ID NO: 37), *AE, *E, AAQ*AE (SEQ ID NO: 38), AAQ*E (SEQ ID NO: 39), AAQ* (SEQ ID NO: 40), AAQG*E (SEQ ID NO: 41), AAQG* (SEQ ID NO: 42), AAQGA* (SEQ ID NO: 43), where * denotes the insert site, and one or more residues are removed from the original sequence.

The skilled person will understand that equivalent combinations of insertion sites and/or substitutions with the exogenous peptide loop may be made with alternative sequences of the other identified insert positions 1 to 7.

In one embodiment, the region of the insertion site may be shifted +/−5 residues up or downstream of any the positions 1 to 7. Alternatively, the region of the insertion site may be shifted +/−4 residues up or downstream of any the positions 1 to 7. Alternatively, the region of the insertion site may be shifted +/−3 residues up or downstream of any the positions 1 to 7. Alternatively, the region of the insertion site may be shifted +/−2 residues up or downstream of any the positions 1 to 7. Alternatively, the region of the insertion site may be shifted +/−1 residue up or downstream of any the positions 1 to 7.

Additionally or alternatively, the peptide loop(s) may be provided in a position that sterically prevents fHbp:CFH interaction. These include an exogenous peptide loop inserted into any one or more site between residues 114-124, 199-206, or 240-246 (e.g. Positions 2, 5 and 7), underlined on V1 primary sequence below:

```
                                                        (SEQ ID NO: 44)
  1 CSSGGGGVAA DIGAGLADAL TAPLDHKDKG LQSLTLDQSV RKNEKLKLAA

51 QGAEKTYGNG DSLNTGKLKN DKVSRFDFIR QIEVDGQLIT LESGEFQVYK

101 QSHSALTAFQ TEQIQDSEHS GKMVAKRQFR IGDIAGEHTS FDKLPEGGRA

151 TYRGTAFGSD DAGGKLTYTI DFAAKQGNGK IEHLKSPELN VDLAAADIKP

201 DGKRHAVISG SVLYNQAEKG SYSLGIFGGK AQEVAGSAEV KTVNGIRHIG

251 LAAKQ
```

In one embodiment of the invention, the modified fHbp is immunogenic. The modified fHbp may be a recombinant protein. The modified fHbp may be a fusion protein, such as a recombinant fusion protein. The modified fHbp may be an isolated modified fHbp molecule. The modified fHbp molecule of the invention may be described as a single protein, multi-valent vaccine. The modified fHbp could be included in an OMV vaccine.

In embodiments where more than one exogenous peptide loop is inserted into fHbp, or variants thereof, the exogenous peptide loops may be the same, e.g. the same sequence, or substantially similar. For example, some epitopes such as PorA epitopes, may not elicit sufficient functional responses when displayed singly on fHbp. In this instance, the present invention may be used to provide the same epitope at multiple sites on the same modified fHbp molecule, thereby enhancing the immunogenic recognition of the epitope.

Alternatively, the exogenous peptide loops may be different relative to each other. For example, where the exogenous peptide loops are derived from a single protein, such as PorA, the different exogenous peptide loops may be from distinct regions of the protein, such as PorA. In one embodiment, the different exogenous peptide loops may be derived from overlapping and distinct regions of the protein, such as PorA.

In embodiments where more than one exogenous peptide loop is inserted into fHbp, or variants thereof, the exogenous peptide loops may be derived from different species or strains. For example, when a multivalent vaccine is desired for multiple different antigens including different organisms.

The PorA peptide loop sequence may be selected from any of the sequences provided in Table 1 (e.g. any of SEQ ID NOs: 45 to 79). Combinations of different PorA sequences of Table 1 may be provided (one loop per site) in any of insertion sites P1 to P7 described herein. Additionally or alternatively, two or more of the same PorA sequences of Table 1 may be provided (one loop per site) in any of insertion sites P1 to P7 described herein.

TABLE 1 sequences of PorA VR2 loops, any of which may be inserted into any variant of fHbp to make a chimeric fHbp-PorA protein.

| PorA VR2 Loop | Primary sequence |
|---|---|
| P1.1 | YVAVENGVAKKVA (SEQ ID NO: 45) |
| P1.2 | HFVQQTPKSQPTLVP (SEQ ID NO: 46) |
| P1.2_2 | HFVQQTPQSQPTLVP (SEQ ID NO: 47) |
| P1.3 | TLANGANNTIIRVP (SEQ ID NO: 48) |
| P1.3_5 | TLAKGANNTIIRVP (SEQ ID NO: 49) |
| P1.4 | HVVVNNKVATHVP (SEQ ID NO: 50) |
| P1.9 | YVDEQSKYHA (SEQ ID NO: 51) |
| P1.10 | HFVQNKQNQRPTLVP (SEQ ID NO: 52) |
| P1.10_1 | HFVQNKQNQPPTLVP (SEQ ID NO: 53) |
| P1.10_2 | HFVQDKKGQPPTLVP (SEQ ID NO: 54) |
| P1.10_8 | HFVQNKQNQQNQPPTLVP (SEQ ID NO: 55) |
| P1.10_4 | HFVQNKQNKQNQPPTLVP (SEQ ID NO: 56) |
| P1.10_7 | HFVQNKQNKPPTLVP (SEQ ID NO: 57) |
| P1.13 | YWTTVNTGSATTTTTFVP (SEQ ID NO: 58) |
| P1.13_1 | YWTTVNTGSATTTTFVP (SEQ ID NO: 59) |
| P1.13_2 | YWTTVNTGSATTTFVP (SEQ ID NO: 60) |

TABLE 1-continued sequences of PorA VR2 loops, any of which may be inserted into any variant of fHbp to make a chimeric fHbp-PorA protein.

| PorA VR2 Loop | Primary sequence |
|---|---|
| P1.13_4 | YYTTVTQGSATTTTFVP (SEQ ID NO: 61) |
| P1.14 | YVDEKKMVHA (SEQ ID NO: 62) |
| P1.14_6 | YVDEKQVSHA (SEQ ID NO: 63) |
| P1.14_26 | YVDEKKVVHA (SEQ ID NO: 64) |
| P1.15 | HYTRQNNADVFVP (SEQ ID NO: 65) |
| P1.15_1 | HYTRQNNTDVFVP (SEQ ID NO: 66) |
| P1.15_11 | HYTRQNNIDVFVP (SEQ ID NO: 67) |
| P1.16 | YYTKDTNNNLTLVP (SEQ ID NO: 68) |
| P1.16_3 | YYTKDKNDNLTLVP (SEQ ID NO: 69) |
| P1.16_4 | YYTKDKNDKLTLVP (SEQ ID NO: 70) |
| P1.16_26 | YYTNTNNNLTLVP (SEQ ID NO: 71) |
| P1.23 | HWNTVYNTNGTTTTFVP (SEQ ID NO: 72) |
| P1.23_2 | HWNTVYNTNGTTTTTFVP (SEQ ID NO: 73) |
| P1.25 | TYTVDSSGVVTPVP (SEQ ID NO: 74) |
| P1.26 | HFVADSQGKITRVP (SEQ ID NO: 75) |
| P1.28 | YYYTTATNSSTSTTFVP (SEQ ID NO: 76) |
| P1.30 | HYTTVYNATTTTTTFVP (SEQ ID NO: 77) |
| P1.30_2 | HYTTVYNATTTTTTTFVP (SEQ ID NO: 78) |
| P1.34 | YVDDQGKVKGP (SEQ ID NO: 79) |

The skilled person will understand that variants involving one or two or more amino acid substitutions, additions or deletions may be provided for the PorA sequences of Table 1 without substantially removing the immunogenic function. Substitutions may be to similar amino acid residues, for example having similar MW, charge, hydrophobicity or moieties, or synthetic analogues. The skilled person will further understand that variants may be truncations of the PorA sequences of Table 1, wherein the truncated variants provide sufficient amino acid residues to form a recognisable epitope. In one embodiment the PorA sequence has at least 80% identity to any one of the sequences in Table 1. In another embodiment the PorA sequence has at least 85% identity to any one of the sequences in Table 1. In another embodiment the PorA sequence has at least 90% identity to any one of the sequences in Table 1. In another embodiment the PorA sequence has at least 95% identity to any one of the sequences in Table 1. In another embodiment the PorA sequence has at least 98% identity to any one of the sequences in Table 1.

In one embodiment, the fHbp which is to be further modified with an exogenous peptide loop may comprise or consist of the sequence:

(SEQ ID NO: 80, fHbp V1.1 GI:316985482)
CSSGGGGVAA DIGAGLADAL TAPLDHKDKG LQSLTLDQSV RKNEKLKL<u>AA</u>

<u>QGAEK</u>TYGNG DSLNTGKLKN DKVSRFDFIR QI<u>EVDGQL</u>IT LESGEFQVYK

QSHSALTAFQ TEQ<u>IQDSEHS GKMV</u>AKRQFR IGDIAGEHTS FDKLPEGGRA

TYRGTAFGSD DADDKLTYTI DFAAKQGNGK IEHLKSPELN VDLAAADI<u>KP</u>

<u>DGKRHA</u>VISG SVLYNQAEKG SYSLGI<u>FGGK AQE</u>VAGSAEV <u>KTVNGI</u>RHIG

LAAKQ, wherein the sequence of any PorA VR2 loop in Table 1 may replace any amino acid or groups of amino acids highlighted by a box.

In one embodiment, the fHbp which is to be further modified with an exogenous peptide loop may comprise or consist of the sequence:

(SEQ ID NO: 81, fHbp V1.4 GI:989557230)
CSSGGGGVAA DIGAGLADAL TAPLDHKDKG LQSLTLDQSV RKNEKLKL<u>AA</u>

<u>QGAEK</u>TYGNG DSLNTGKLKN DKVSRFDFIR QI<u>EVDGQL</u>IT LESGEFQVYK

QSHSALTALQ TEQ<u>VQDSEHS GKMV</u>AKRQFR IGDIAGEHTS FDKLPEGGRA

TYRGTAFGSD DASGKLTYTI DFAAKQGHGK IEHLKSPELN VDLAAADI<u>KP</u>

<u>DKKRHA</u>VISG SVLYNQAEKG SYSLGI<u>FGGQ AQE</u>VAGSAEV <u>ETANGI</u>RHIG

LAAKQ, wherein the sequence of any PorA VR2 loop in Table 1 may replace any amino acid or groups of amino acids highlighted by a box.

In one embodiment, the fHbp which is to be further modified with an exogenous peptide loon may comprise or consist of the sequence:

(SEQ ID NO: 82, fHbp V1.13 GI:752774533)
CSSGGGGVAA DIGAGLADAL TAPLDHKDKG LQSLTLDQSV RKNEKLKL<u>AA</u>

<u>QGAEK</u>TYGNG DSLNTGKLKN DKVSRFDFIR QI<u>EVDGKL</u>IT LESGEFQVYK

QSHSALTALQ TEQ<u>VQDSEDS GKMV</u>AKRQFR IGDIAGEHTS FDKLPKGGSA

TYRGTAFGSD DAGGKLTYTI DFAAKQGHGK IEHLKSPELN VELATAYI<u>KP</u>

<u>DEKRHA</u>VISG SVLYNQDEKG SYSLGI<u>FGGQ AQE</u>VAGSAEV <u>ETANGI</u>HHIG

LAAKQ, wherein the sequence of any PorA VR2 loop in Table 1 may replace any amino acid or groups of amino acids highlighted by a box.

In one embodiment, the fHbp which is to be further modified with an exogenous peptide loop may comprise or consist of the sequence:

(SEQ ID NO: 83, fHbp V1.14 GI:630057376)
CSSGGGGVAA DIGAGLADAL TAPLDHKDKS LQSLTLDQSV RKNEKLKL[AA]

[QGAEK]TYGNG DSLNTGKLKN DKVSRFDFIR QI[EVDGQL]IT LESGEFQVYK

QSHSALTALQ TEQ[EQDPEHS GKMV]AKRRFK IGDIAGEHTS FDKLPKDVMA

TYRGTAFGSD DAGGKLTYTI DFAAKQGHGK IEHLKSPELN VELATAYI[KP]

[DEKHHA]VISG SVLYNQDEKG SYSLGI[FGGQ AQE]VAGSAEV [ETANGI]HHIG

LAAKQ, wherein the sequence of any PorA VR2 loop in Table 1 may replace any amino acid or groups of amino acids highlighted by a box.

In one embodiment, the fHbp which is to be further modified with an exogenous peptide loop may comprise or consist of the sequence:

(SEQ ID NO: 84, fHbp V1.15 GI:504394462)
CSSGGGGSGG GGVAADIGAG LADALTAPLD HKDKGLKSLT LEDSISQNGT

LTL[SAQGAER] TFKAGDKDNS LNTGKLKNDK ISRFDFIRQI [EVDGQL]ITLE

SGEFQVYKQS HSALTALQTE Q[VQDSEHSGK MV]AKRQFRIG DIVGEHTSFG

KLPKDVMATY RGTAFGSDDA GGKLTYTIDF AAKQGHGKIE HLKSPELNVD

LAAADI[KPDE KHHA]VISGSV LYNQAEKGSY SLGI[FGGQAQ E]VAGSAEV[ET]

[ANGI]RHIGLA AKQ, wherein the sequence of any PorA VR2 loop in Table 1 may replace any amino acid or groups of amino acids highlighted by a box.

In one embodiment, the fHbp which is to be further modified with an exogenous peptide loop may comprise or consist of the sequence:

(SEQ ID NO: 85, fHbpV 1.55 GI:40353481)
CSSGGGGSGG GGVTADIGTG LADALTAPLD HKDKGLKSLT LEDSISQNGT

LTL[SAQGAEK] TYGNGDSLNT GKLKNDKVSR FDFIRQI[EVD GQL]ITLESGE

FQVYKQSHSA LTALQTEQ[EQ DPEHSEKMV]A KRRFRIGDIA GEHTSFDKLP

KDVMATYRGT AFGSDDAGGK LTYTIDFAAK QGHGKIEHLK SPELNVDLAV

AYIKP[DEKHH A]VISGSVLYN QDEKGSYSLG I[FGEKAQE]VA GSAEV[ETANG]

[I]HHIGLAAKQ, wherein the sequence of any PorA VR2 loop in Table 1 may replace any amino acid or groups of amino acids highlighted by a box.

In one embodiment, the fHbp which is to be further modified with an exogenous peptide loop may comprise or consist of the sequence:

```
                       (SEQ ID NO: 86, fHbp V2.16 GI:488155511)
CSSGGGGVAA DIGAGLADAL TAPLDHKDKS LQSLTLDQSV RKNEKLKLAA

QGAEKTYGNG DSLNTGKLKN DKVSRFDFIR QIEVDGQLIT LESGEFQIYK

QDHSAVVALQ IEKINNPDKI DSLINQRSFL VSGLGGEHTA FNQLPDGKAE

YHGKAFSSDD AGGKLTYTID FAAKQGHGKI EHLKTPEQNV ELAAAELKAD

EKSHAVILGD TRYGSEEKGT YHLALFGDRA QEIAGSATVK IGEKVHEIGI

AGKQ,
``` wherein the sequence of any PorA VR2 loop in Table 1 may replace any amino acid or groups of amino acids highlighted by a box.

In one embodiment, the fHbp which is to be further modified with an exogenous peptide loop may comprise or consist of the sequence:

```
                       (SEQ ID NO: 87, fHbp V2.19 GI:488148626)
CSSGGGGVAA DIGAGLADAL TAPLDHKDKS LQSLTLDQSV RKNEKLKLAA

QGAEKTYGNG DSLNTGKLKN DKVSRFDFIR QIEVDGQLIT LESGEFQIYK

QDHSAVVALQ IEKINNPDKI DSLINQRSFL VSGLGGEHTA FNQLPSGKAE

YHGKAFSSDD AGGKLTYTID FAAKQGHGKI EHLKTPEQNV ELASAELKAD

EKSHAVILGD TRYGGEEKGT YHLALFGDRA QEIAGSATVK IREKVHEIGI

AGKQ,
``` wherein the sequence of any PorA VR2 loop in Table 1 may replace any amino acid or groups of amino acids highlighted by a box.

In one embodiment, the fHbp which is to be further modified with an exogenous peptide loop may comprise or consist of the sequence:

```
                       (SEQ ID NO: 88, fHbp V2.22 GI:120865922)
CSSGGGGVAA DIGAGLADAL TAPLDHKDKS LQSLTLDQSV RKNEKLKLAA

QGAEKTYGNG DSLNTGKLKN DKVSRFDFIR QIEVDGQLIT LESGEFQIYK

QDHSAVVALQ IEKINNPDKI DSLINQRSFL VSGLGGEHTA FNQLPSGKAE

YHGKAFSSDD PNGRLHYSID FTKKQGYGRI EHLKTPEQNV ELASAELKAD

EKSHAVILGD TRYGGEEKGT YHLALFGDRA QEIAGSATVK IREKVHEIGI

AGKQ,
``` wherein the sequence of any PorA VR2 loop in Table 1 may replace any amino acid or groups of amino acids highlighted by a box.

In one embodiment, the fHbp which is to be further modified with an exogenous peptide loon may comprise or consist of the sequence:

```
                         (SEQ ID NO: 89, fHbp 2.25 GI:488158712)
CSSGGGGVAA DIGAGLADAL TTPLDHKDKS LQSLTLDQSV RKNEKLKLAA

QGAEKTYGNG DSLNTGKLKN DKVSRFDFIR QIEVDGQTIT LASGEFQIYK

QNHSAVVALQ IEKINNPDKI DSLINQRSFL VSGLGGEHTA FNQLPDGKAE

YHGKAFSSDD PNGRLHYSID FTKKQGYGRI EHLKTPEQNV ELASAELKAD

EKSHAVILGD TRYGGEEKGT YHLALFGDRA QEIAGSATVK IREKVHEIGI

AGKQ,
``` wherein the sequence of any PorA VR2 loop in Table 1 may replace any amino acid or groups of amino acids highlighted by a box.

In one embodiment, the fHbp which is to be further modified with an exogenous peptide loon may comprise or consist of the sequence:

```
                        (SEQ ID NO: 90, fHbp V3.45 GI:284466869)
CSSGSGSGGG GVAADIGTGL ADALTAPLDH KDKGLKSLTL EDSISQNGTL

TLSAQGAEKT FKVGDKDNSL NTGKLKNDKI SRFDFVQKIE VDGQTITLAS

GEFQIYKQDH SAVVALQIEK INNPDKIDSL INQRSFLVSG LGGEHTAFNQ

LPSGKAEYHG KAFSSDDAGG KLTYTIDFAA KQGHGKIEHL KTPEQNVELA

SAELKADEKS HAVILGDTRY GSEEKGTYHL ALFGDRAQEI AGSATVKIRE

KVHEIGIAGK Q,
``` wherein the sequence of any PorA VR2 loop in Table 1 may replace any amino acid or groups of amino acids highlighted by a box.

In one embodiment, the fHbp which is to be further modified with an exogenous peptide loon may comprise or consist of the sequence:

```
                        (SEQ ID NO: 91, fHbp V3.47 GI:284466897)
CSSGGGGVAA DIGAGLADAL TAPLDHKDKG LKSLTLEDSI SQNGTLTLSA

QGAEKTFKVG DKDNSLNTGK LKNDKISRFD FVQKIEVDGQ TITLASGEFQ

IYKQNHSAVV ALQIEKINNP DKIDSLINQR SFLVSGLGGE HTAFNQLPGG

KAEYHGKAFS SDDAGGKLTY TIDFAAKQGH GKIEHLKTPE QNVELAAAEL

KADEKSHAVI LGDTRYGSEE KGTYHLALFG DRAQEIAGSA TVKIGEKVHE

ISIAGKQ,
``` wherein the sequence of any PorA VR2 loop in Table 1 may replace any amino acid or groups of amino acids highlighted by a box.

The modified fHbp may comprise the sequence of any one of SEQ ID NOs: 92 to 109.

The modified fHbp may comprise the sequence of SEQ ID NO: 92 to 109, wherein the sequence YYTKDTNNNLTLVP (SEQ ID NO: 68) is replaced by any PorA VR2 loop sequence, for example any VR2 loop sequence provided in Table 1.

In one embodiment, the modified fHbp may comprise or consist of the sequence:

```
                              (SEQ ID NO: 92, fHbp V1.1
                  GI:316985482, PorA VR2 P1.16 in P1)
CSSGGGGVAA DIGAGLADAL TAPLDHKDKG LQSLTLDQSV
RKNEKLKLAA QGAEKTYGNG DSLNTGKLKN DKVSRFDFIR
QIEVDYYTKDT NNNLTLVPQL ITLESGEFQV YKQSHSALTA
FQTEQIQDSE HSGKMVAKRQ FRIGDIAGEH TSFDKLPEGG
RATYRGTAFG SDDAGGKLTY TIDFAAKQGN GKIEHLKSPE
LNVDLAAADI KPDGKRHAVI SGSVLYNQAE KGSYSLGIFG
GKAQEVAGSA EVKTVNGIRH IGLAAKQ,
``` or the same sequence whereby the sequence YYTKDTNNNLTLVP (SEQ ID NO: 68) is replaced by any PorA VR2 loop sequence, for example any PorA loop sequence as provided in Table 1.

In one embodiment, the modified fHbp may comprise or consist of the sequence:

```
                              (SEQ ID NO: 93, fHbp V3.45
                  GI:284466869, PorA VR2 P1.16 in P1)
CSSGSGSGGG GVAADIGTGL ADALTAPLDH KDKGLKSLTL
EDSISQNGTL TLSAQGAEKT FKVGDKDNSL NTGKLKNDKI
SRFDFVQKIE VDYYTKDTNN NLTLVPQTIT LASGEFQIYK
QDHSAVVALQ IEKINNPDKI DSLINQRSFL VSGLGGEHTA
FNQLPSGKAE YHGKAFSSDD AGGKLTYTID FAAKQGHGKI
EHLKTPEQNV ELASAELKAD EKSHAVILGD TRYGSEEKGT
YHLALFGDRA QEIAGSATVK IREKVHEIGI AGKQ,
``` or the same sequence whereby the sequence YYTKDTNNNLTLVP (SEQ ID NO: 68) is replaced by any PorA VR2 loop sequence, for example any PorA loop sequence as provided in Table 1.

In one embodiment, the modified fHbp may comprise or consist of the sequence:

```
                              (SEQ ID NO: 94, fHbp V2.19
                  GI:488148626, PorA VR2 P1.16 in P1)
CSSGGGGVAA DIGAGLADAL TAPLDHKDKS LQSLTLDQSV
RKNEKLKLAA QGAEKTYGNG DSLNTGKLKN DKVSRFDFIR
QIEVDYYTKD TNNNLTLVPQ LITLESGEFQ IYKQDHSAVV
ALQIEKINNP DKIDSLINQR SFLVSGLGGE HTAFNQLPSG
KAEYHGKAFS SDDAGGKLTY TIDFAAKQGH GKIEHLKTPE
QNVELASAEL KADEKSHAVI LGDTRYGGEE KGTYHLALFG
DRAQEIAGSA TVKIREKVHE IGIAGKQ,
``` or the same sequence whereby the sequence YYTKDTNNNLTLVP (SEQ ID NO: 68) is replaced by any PorA VR2 loop sequence, for example any PorA loop sequence as provided in Table 1.

In one embodiment, the modified fHbp may comprise or consist of the sequence:

```
(SEQ ID NO: 95, fHbp V1.1 GI: 316985482, PorA VR2 P1.16 in P2)
CSSGGGGVAA DIGAGLADAL TAPLDHKDKG LQSLTLDQSV RKNEKLKLAA QGAEKTYGNG
DSLNTGKLKN DKVSRFDFIR QIEVDGQLIT LESGEFQVYK QSHSALTAFQ TEQIQDSEHS
GKMVAKRQFR IGDIAGEHTS FDKLPEGGRA TYRGTAFGSD DAGGKLTYTI DFAAKQGNGK
IEHLKSPELN VDLAAADIKP DYYTKDTNNN LTLVPKRHAV ISGSVLYNQA EKGSYSLGIF
GGKAQEVAGS AEVKTVNGIR HIGLAAKQ,
``` or the same sequence whereby the sequence YYTKDTNNNLTLVP (SEQ ID NO: 68) is replaced by any PorA VR2 loop sequence, for example any PorA loop sequence as provided in Table 1.

In one embodiment, the modified fHbp may comprise or consist of the sequence:

```
(SEQ ID NO: 96, fHbp V3.45 GI: 284466869, PorA VR2 P1.16 in P2)
CSSGSGSGGG GVAADIGTGL ADALTAPLDH KDKGLKSLTL EDSISQNGTL TLSAQGAEKT
FKVGDKDNSL NTGKLKNDKI SRFDFVQKIE VDGQTITLAS GEFQIYKQDH SAVVALQIEK
INNPDKIDSL INQRSFLVSG LGGEHTAFNQ LPSGKAEYHG KAFSSDDAGG KLTYTIDFAA
KQGHGKIEHL KTPEQNVELA SAELKADYYT KDTNNNLTLV PKSHAVILGD TRYGSEEKGT
YHLALFGDRA QEIAGSATVK IREKVHEIGI AGKQ,
``` or the same sequence whereby the sequence YYTKDTNNNLTLVP (SEQ ID NO: 68) is replaced by any PorA VR2 loop sequence, for example any PorA loop sequence as provided in Table 1.

In one embodiment, the modified fHbp may comprise or consist of the sequence:

```
    (SEQ ID NO: 97, fHbp V2.19 GI: 488148626, PorA VR2 P1.16 in P2)
CSSGGGGVAA DIGAGLADAL TAPLDHKDKS LQSLTLDQSV RKNEKLKLAA QGAEKTYGNG

DSLNTGKLKN DKVSRFDFIR QIEVDGQLIT LESGEFQIYK QDHSAVVALQ IEKINNPDKI

DSLINQRSFL VSGLGGEHTA FNQLPSGKAE YHGKAFSSDD AGGKLTYTID FAAKQGHGKI

EHLKTPEQNV ELASAELKAD YYTKDTNNNL TLVPKSHAVI LGDTRYGGEE KGTYHLALFG

DRAQEIAGSA TVKIREKVHE IGIAGKQ,
``` or the same sequence whereby the sequence YYTKDTNNNLTLVP (SEQ ID NO: 68) is replaced by any PorA VR2 loop sequence, for example any PorA loop sequence as provided in Table 1.

In one embodiment, the modified fHbp may comprise or consist of the sequence:

```
    (SEQ ID NO: 98, fHbp V1.1 GI: 316985482, PorA VR2 P1.16 in P3)
CSSGGGGVAA DIGAGLADAL TAPLDHKDKG LQSLTLDQSV RKNEKLKLAA QGAEKTYGNG

DSLNTGKLKN DKVSRFDFIR QIEVDGQLIT LESGEFQVYK QSHSALTAFQ TEQIQDSEHS

GKMVAKRQFR IGDIAGEHTS FDKLPEGGRA TYRGTAFGSD DAGGKLTYTI DFAAKQGNGK

IEHLKSPELN VDLAAADIKP DGKRHAVISG SVLYNQAEKG SYSLGIFGYY TKDTNNNLTL

VPKAQEVAGS AEVKTVNGIR HIGLAAKQ,
``` or the same sequence whereby the sequence YYTKDTNNNLTLVP (SEQ ID NO: 68) is replaced by any PorA VR2 loop sequence, for example any PorA loop sequence as provided in Table 1.

In one embodiment, the modified fHbp may comprise or consist of the sequence:

```
    (SEQ ID NO: 99, fHbp V3.45 GI: 284466869, PorA VR2 P1.16 in P3)
CSSGSGSGGG GVAADIGTGL ADALTAPLDH KDKGLKSLTL EDSISQNGTL TLSAQGAEKT

FKVGDKDNSL NTGKLKNDKI SRFDFVQKIE VDGQTITLAS GEFQIYKQDH SAVVALQIEK

INNPDKIDSL INQRSFLVSG LGGEHTAFNQ LPSGKAEYHG KAFSSDDAGG KLTYTIDFAA

KQGHGKIEHL KTPEQNVELA SAELKADEKS HAVILGDTRY GSEEKGTYHL ALFGYYTKDT

NNNLTLVPRA QEIAGSATVK IREKVHEIGI AGKQ,
``` or the same sequence whereby the sequence YYTKDTNNNLTLVP (SEQ ID NO: 68) is replaced by any PorA VR2 loop sequence, for example any PorA loop sequence as provided in Table 1.

In one embodiment, the modified fHbp may comprise or consist of the sequence:

```
    (SEQ ID NO: 100, fHbp V2.19 GI: 488148626, PorA VR2 P1.16 in P3)
CSSGGGGVAA DIGAGLADAL TAPLDHKDKS LQSLTLDQSV RKNEKLKLAA QGAEKTYGNG

DSLNTGKLKN DKVSRFDFIR QIEVDGQLIT LESGEFQIYK QDHSAVVALQ IEKINNPDKI

DSLINQRSFL VSGLGGEHTA FNQLPSGKAE YHGKAFSSDD AGGKLTYTID FAAKQGHGKI

EHLKTPEQNV ELASAELKAD EKSHAVILGD TRYGGEEKGT YHLALFGYYT KDTNNNLTLV

PRAQEIAGSA TVKIREKVHE IGIAGKQ,
``` or the same sequence whereby the sequence YYTKDTNNNLTLVP (SEQ ID NO: 68) is replaced by any PorA VR2 loop sequence, for example any PorA loop sequence as provided in Table 1.

In one embodiment, the modified fHbp may comprise or consist of the sequence:

```
  (SEQ ID NO: 101, fHbp V1.1 GI: 316985482, PorA VR2 P1.16 in P4)
CSSGGGGVAA DIGAGLADAL TAPLDHKDKG LQSLTLDQSV RKNEKLKLAA QYYTKDTNNN

LTLVPAEKTY GNGDSLNTGK LKNDKVSRFD FIRQIEVDGQ LITLESGEFQ VYKQSHSALT

AFQTEQIQDS EHSGKMVAKR QFRIGDIAGE HTSFDKLPEG GRATYRGTAF GSDDAGGKLT

YTIDFAAKQG NGKIEHLKSP ELNVDLAAAD IKPDGKRHAV ISGSVLYNQA EKGSYSLGIF

GGKAQEVAGS AEVKTVNGIR HIGLAAKQ,
``` or the same sequence whereby the sequence YYTKDTNNNLTLVP (SEQ ID NO: 68) is replaced by any PorA VR2 loop sequence, for example any PorA loop sequence as provided in Table 1.

In one embodiment, the modified fHbp may comprise or consist of the sequence:

```
  (SEQ ID NO: 102, fHbp V3.45 GI: 284466869, PorA VR2 P1.16 in P4)
CSSGSGSGGG GVAADIGTGL ADALTAPLDH KDKGLKSLTL EDSISQNGTL TLSAQYYTKD

TNNNLTLVPA EKTFKVGDKD NSLNTGKLKN DKISRFDFVQ KIEVDGQTIT LASGEFQIYK

QDHSAVVALQ IEKINNPDKI DSLINQRSFL VSGLGGEHTA FNQLPSGKAE YHGKAFSSDD

AGGKLTYTID FAAKQGHGKI EHLKTPEQNV ELASAELKAD EKSHAVILGD TRYGSEEKGT

YHLALFGDRA QEIAGSATVK IREKVHEIGI AGKQ,
``` or the same sequence whereby the sequence YYTKDTNNNLTLVP (SEQ ID NO: 68) is replaced by any PorA VR2 loop sequence, for example any PorA loop sequence as provided in Table 1.

In one embodiment, the modified fHbp may comprise or consist of the sequence:

```
  (SEQ ID NO: 103, fHbp V2.19 GI: 488148626, PorA VR2 P1.16 in P4)
CSSGGGGVAA DIGAGLADAL TAPLDHKDKS LQSLTLDQSV RKNEKLKLAA QYYTKDTNNN

LTLVPAEKTY GNGDSLNTGK LKNDKVSRFD FIRQIEVDGQ LITLESGEFQ IYKQDHSAVV

ALQIEKINNP DKIDSLINQR SFLVSGLGGE HTAFNQLPSG KAEYHGKAFS SDDAGGKLTY

TIDFAAKQGH GKIEHLKTPE QNVELASAEL KADEKSHAVI LGDTRYGGEE KGTYHLALFG

DRAQEIAGSA TVKIREKVHE IGIAGKQ,
``` or the same sequence whereby the sequence YYTKDTNNNLTLVP (SEQ ID NO: 68) is replaced by any PorA VR2 loop sequence, for example any PorA loop sequence as provided in Table 1.

In one embodiment, the modified fHbp may comprise or consist of the sequence:

```
  (SEQ ID NO: 104, fHbp V1.1 GI: 316985482, PorA VR2 P1.16 in P5)
CSSGGGGVAA DIGAGLADAL TAPLDHKDKG LQSLTLDQSV RKNEKLKLAA QGAEKTYGNG

DSLNTGKLKN DKVSRFDFIR QIEVDGQLIT LESGEFQVYK QSHSALTAFQ TEQIQDSYYT

KDTNNNLTLV PHSGKNMAKR QFRIGDIAGE HTSFDKLPEG GRATYRGTAF GSDDAGGKLT

YTIDFAAKQG NGKIEHLKSP ELNVDLAAAD IKPDGKRHAV ISGSVLYNQA EKGSYSLGIF

GGKAQEVAGS AEVKTVNGIR HIGLAAKQ,
``` or the same sequence whereby the sequence YYTKDTNNNLTLVP (SEQ ID NO: 68) is replaced by any PorA VR2 loop sequence, for example any PorA loop sequence as provided in Table 1.

In one embodiment, the modified fHbp may comprise or consist of the sequence:

```
  (SEQ ID NO: 105, fHbp V3.45 GI: 284466869, PorA VR2 P1.16 in P5)
CSSGSGSGGG GVAADIGTGL ADALTAPLDH KDKGLKSLTL EDSISQNGTL TLSAQGAEKT

FKVGDKDNSL NTGKLKNDKI SRFDFVQKIE VDGQTITLAS GEFQIYKQDH SAVVALQIEK

INNPYYTKDT NNNLTLVPKI DSLINQRSFL VSGLGGEHTA FNQLPSGKAE YHGKAFSSDD

AGGKLTYTID FAAKQGHGKI EHLKTPEQNV ELASAELKAD EKSHAVILGD TRYGSEEKGT

YHLALFGDRA QEIAGSATVK IREKVHEIGI AGKQ,
``` or the same sequence whereby the sequence YYTKDTNNNLTLVP (SEQ ID NO: 68) is replaced by any PorA VR2 loop sequence, for example any PorA loop sequence as provided in Table 1.

In one embodiment, the modified fHbp may comprise or consist of the sequence:

```
  (SEQ ID NO: 106, fHbp V2.19 GI: 488148626, PorA VR2 P1.16 in P5)
CSSGGGGVAA DIGAGLADAL TAPLDHKDKS LQSLTLDQSV RKNEKLKLAA QGAEKTYGNG

DSLNTGKLKN DKVSRFDFIR QIEVDGQLIT LESGEFQIYK QDHSAVVALQ IEKINNPYYT

KDTNNNLTLV PKIDSLINQR SFLVSGLGGE HTAFNQLPSG KAEYHGKAFS SDDAGGKLTY

TIDFAAKQGH GKIEHLKTPE QNVELASAEL KADEKSHAVI LGDTRYGGEE KGTYHLALFG

DRAQEIAGSA TVKIREKVHE IGIAGKQ,
``` or the same sequence whereby the sequence YYTKDTNNNLTLVP (SEQ ID NO: 68) is replaced by any PorA VR2 loop sequence, for example any PorA loop sequence as provided in Table 1.

In one embodiment, the modified fHbp may comprise or consist of the sequence:

```
  (SEQ ID NO: 107, fHbp V1.1 GI: 316985482, PorA VR2 P1.16 in P7)
CSSGGGGVAA DIGAGLADAL TAPLDHKDKG LQSLTLDQSV RKNEKLKLAA QGAEKTYGNG

DSLNTGKLKN DKVSRFDFIR QIEVDGQLIT LESGEFQVYK QSHSALTAFQ TEQIQDSEHS

GKMVAKRQFR IGDIAGEHTS FDKLPEGGRA TYRGTAFGSD DAGGKLTYTI DFAAKQGNGK

IEHLKSPELN VDLAAADIKP DGKRHAVISG SVLYNQAEKG SYSLGIFGGK AQEVAGSAEV

KTVYYTKDTN NNLTLVPGIR HIGLAAKQ,
``` or the same sequence whereby the sequence YYTKDTNNNLTLVP (SEQ ID NO: 68) is replaced by any PorA VR2 loop sequence, for example any PorA loop sequence as provided in Table 1.

In one embodiment, the modified fHbp may comprise or consist of the sequence:

```
  (SEQ ID NO: 108, fHbp V3.45 GI: 284466869, PorA VR2 P1.16 in P7)
CSSGSGSGGG GVAADIGTGL ADALTAPLDH KDKGLKSLTL EDSISQNGTL TLSAQGAEKT

FKVGDKDNSL NTGKLKNDKI SRFDFVQKIE VDGQTITLAS GEFQIYKQDH SAVVALQIEK

INNPDKIDSL INQRSFLVSG LGGEHTAFNQ LPSGKAEYHG KAFSSDDAGG KLTYTIDFAA

KQGHGKIEHL KTPEQNVELA SAELKADEKS HAVILGDTRY GSEEKGTYHL ALFGDRAQEI

AGSATVKIRY YTKDTNNNLT LVPKVHEIGI AGKQ,
``` or the same sequence whereby the sequence YYTKDTNNNLTLVP (SEQ ID NO: 68) is replaced by any PorA VR2 loop sequence, for example any PorA VR2 loop sequence as provided in Table 1.

In one embodiment, the modified fHbp may comprise or consist of the sequence:

```
  (SEQ ID NO: 109, fHbp V2.19 GI: 488148626, PorA VR2 P1.16 in P7)
CSSGGGGVAA DIGAGLADAL TAPLDHKDKS LQSLTLDQSV RKNEKLKLAA QGAEKTYGNG

DSLNTGKLKN DKVSRFDFIR QIEVDGQLIT LESGEFQIYK QDHSAVVALQ IEKINNPDKI

DSLINQRSFL VSGLGGEHTA FNQLPSGKAE YHGKAFSSDD AGGKLTYTID FAAKQGHGKI

EHLKTPEQNV ELASAELKAD EKSHAVILGD TRYGGEEKGT YHLALFGDRA QEIAGSATVK

IRYYTKDTNN NLTLVPKVHE IGIAGKQ,
``` or the same sequence whereby the sequence YYTKDTNNNLTLVP (SEQ ID NO: 68) is replaced by any PorA VR2 loop sequence, for example any PorA loop sequence as provided in Table 1.

The skilled person will understand that one, two, three or four or more amino acid substitutions, deletions or additions may be made to the modified fHbp of the invention herein without substantially removing its immunogenic function or affecting stability. Substitutions may be to similar amino acid residues, for example having similar MW, charge, hydrophobicity or moieties, or synthetic analogues. Such modifications are envisaged as part of the invention. In one embodiment the modified fHbp may have at least 75% identity with any one of the modified fHbp described herein. In one embodiment the modified fHbp may have at least 80% identity with any one of the modified fHbp described herein. In one embodiment the modified fHbp may have at least 85% identity with any one of the modified fHbp described herein. In one embodiment the modified fHbp may have at least 90% identity with any one of the modified fHbp described herein. In one embodiment the modified fHbp may have at least 95% identity with any one of the modified fHbp described herein. In one embodiment the modified fHbp may have at least 98% identity with any one of the modified fHbp described herein. In one embodiment the modified fHbp may have at least 99% identity with any one of the modified fHbp described herein. In one embodiment the modified fHbp may have at least 99.5% identity with any one of the modified fHbp described herein.

According to another aspect of the invention, there is provided a nucleic acid encoding essentially or at least the modified fHbp according to the invention herein.

The nucleic acid may be in a vector, such as a viral vector.

According to another aspect of the invention, there is provided a composition comprising the modified fHbp according the invention herein.

The composition may comprise two or more different modified fHbp molecules (e.g. different forms/species thereof) according to the invention herein. For example, the composition may comprise two or more different variants of the modified fHbp according to the invention. For example, the composition may comprise fHbp variants v1 and v2. The composition may comprise fHbp variants v2 and v3. In another embodiment, the composition comprises at least fHbp variant v2.

According to another aspect of the invention, there is provided a composition comprising the nucleic acid according the invention herein.

The composition may comprise a pharmaceutically acceptable carrier. The composition may further comprise an adjuvant.

According to a further aspect of the invention, there is provided a modified fHbp, nucleic acid, or composition according to the invention, for use as a medicament.

According to a further aspect of the invention, there is provided a modified fHbp, nucleic acid, or composition according to the invention, for use in the treatment or prevention of a pathogenic infection or colonisation of a subject.

According to a further aspect of the invention, there is provided a method of treatment or prevention of a pathogenic infection or colonisation of a subject, comprising the administration of a modified fHbp, nucleic acid, or composition according to the invention to the subject.

According to a further aspect of the invention, there is provided a method of vaccination, comprising the administration of a modified fHbp, nucleic acid, or composition according to the invention to a subject.

The administration may be provided in a therapeutically effective amount. A skilled person will be capable of determining an appropriate dosage and repetitions for administration.

The subject may be mammalian, such as human.

The infection may be a bacterial infection. For example, the infection may be meningitis, such as *Neisseria meningitidis*, or *Neisseria gonorrhoeae*.

According to a further aspect of the invention, there is provided a single protein, multi-valent vaccine comprising the modified factor H binding protein (fHbp) according to the invention.

The vaccine may be used as a prophylactic or a therapeutic vaccine directed to Nm.

The use may be with a pharmaceutically acceptable carrier. Additionally or alternatively, the use may be with an adjuvant. Suitable pharmaceutically acceptable carriers and adjuvants are well known to the skilled person.

According to a further aspect of the invention, there is provided a combination of the modified fHbp according to the invention and at least one other prophylactically or therapeutically active molecule.

The at least one other prophylactically or therapeutically active molecule may comprise a vaccine or antigen different to the modified fHbp according to the invention herein. The combination may be used in a combination vaccine or therapy. For example, the combination may be used in a combination vaccine or therapy where another meningococcal antigen is provided.

In one embodiment, the at least one other prophylactically or therapeutically active molecule comprises a monovalent protein:capsule polysaccharide vaccine. The monovalent protein:capsule polysaccharide vaccine may comprise any of serogroup C or A capsule with bacterial toxoids, bi-valent vaccines (with serogroup C and A capsular polysaccharide conjugated to bacterial toxoids), quadri- (serogroups A, C, Y, W) or penta- (A, C, Y, W, X) valent conjugate vaccines.

Alternatively, the at least one other prophylactically or therapeutically active molecule may comprise a conjugate vaccine, wherein antigen(s) comprising the fHbp scaffold bearing exogenous peptide loops (such as PorA loops) may be incorporated as the protein carrier molecule in the conjugate vaccine. The conjugate vaccine may comprise any of serogroup capsular polysaccharides from A, C, Y, W, or X strains individually or in combination.

According to another aspect of the invention, there is provided the use of factor H binding protein (fHbp) as an epitope display scaffold.

The use as an epitope display scaffold may comprise the use of a factor H binding protein (fHbp) comprising any of the modifications described herein.

In addition to their potential use as vaccines, compositions or modified fHbps according to the invention may be useful as diagnostic reagents and as a measure of the immune competence of a vaccine.

The term "immunogenic" means that the molecule is capable of eliciting an immune response in a human or animal body. The immune response may be protective.

The immune response elicited by the modified fHbp of the invention may affect the ability of Neisseria meningitidis (Nm) to infect a subject immunised with the modified fHbp of the invention. Preferably, the ability of Nm to infect a subject immunised with the modified fHbp of the invention is impeded or prevented. The immune response elicited may recognise and destroy Nm. Alternatively or additionally, the immune response elicited may impede or prevent replication of Nm. Alternatively or additionally, the immune response elicited may impede or prevent Nm causing disease in the human or non-human animal.

The term "peptide loop" used herein is intended to refer to a single chain polypeptide sequence anchored at both ends (e.g. anchored to a scaffold such as fHbp). The term "loop" does not infer or require any particular secondary structure adopted by the polypeptide.

The term "exogenous" used in the context of "exogenous peptide loop" is understood to mean that the peptide loop is derived from a different source relative to the fHbp protein (i.e. it is not fHbp or a fragment thereof). However, it may be from the same organism as the fHbp. For example a modified fHbp may include an N. meningitidis fHbp modified with (exogenous) peptide loop(s) derived from N. meningitidis PorA.

The term "fusion protein" used herein is understood to mean a polypeptide comprising a combination of sequences from different gene products or sources. Term "fusion protein" may be used interchangeably with the term "chimeric molecule".

Reference to sequence "identity" used herein may refer to the percentage identity between two aligned sequences using standard NCBI BLASTp parameters.

The term "isolated", when applied to the modified fHbp of the present invention means a protein: (i) encoded by nucleic acids using recombinant DNA methods or a viral vector; or (ii) synthesized by, for example, chemical synthetic methods; or (iii) separated from biological materials, and then purified. An isolated polypeptide of the invention includes a protein expressed from a nucleotide sequence encoding the protein, or from a recombinant vector containing a nucleotide sequence encoding the protein.

The term "protective" means prevention of a disease, a reduced risk of disease infection, transmission and/or progression, reduced severity of disease, a cure of a condition or disease, an alleviation of symptoms, or a reduction in severity of a disease or disease symptoms.

The term "prophylaxis" means prevention of or protective treatment for a disease. The prophylaxis may include a reduced risk of infection, transmission and/or progression, or reduced severity of disease.

The term "treatment", means a cure of a condition or disease, an alleviation of symptoms, or a reduction in severity of a disease or disease symptoms.

The skilled person will understand that optional features of one embodiment or aspect of the invention may be applicable, where appropriate, to other embodiments or aspects of the invention.

Embodiments of the invention will now be described in more detail, by way of example only, with reference to the accompanying drawings.

FIG. 1 Design of chimeric fHbp:PorAs (A) Schematic of the surface of N. meningitidis, showing the pre-dominant outer membrane features, lipo-oligosaccharide and type 4 pili, and the important antigens, fHbp and PorA. The immunogenic PorA VR2 loop is highlighted and fHbp is shown interacting with domains 6 and 7 of human CFH.

(B) Structure of V1 fHbp with CFH domains 6-7 showing the six positions (P1-5, and P7) used to generate chimeric fHbp:PorAs into which we have inserted PorA loops. N.B. position 5 is in the fHbp:CFH interface.

Figure 2:
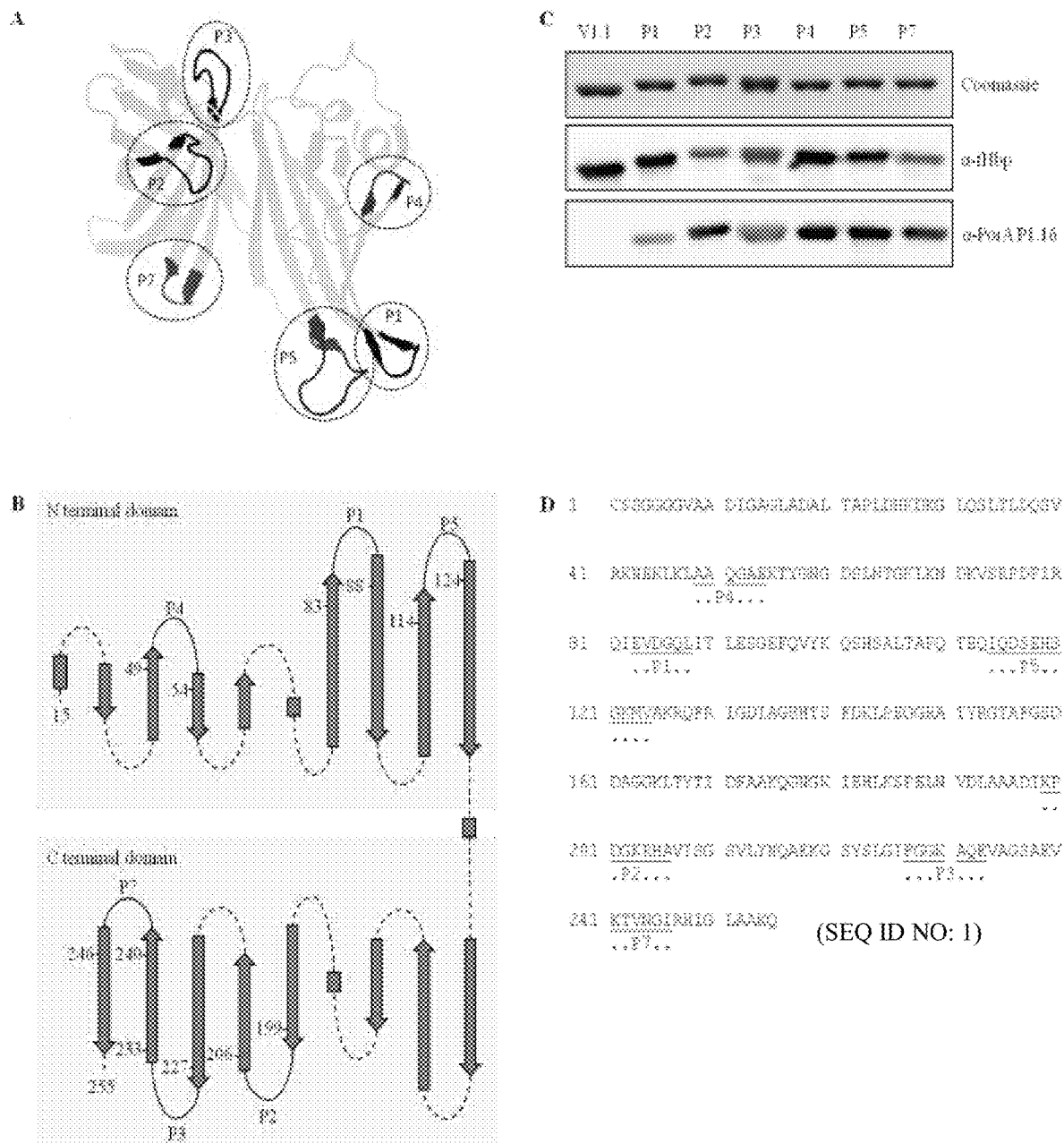

FIG. 2: Use of fHbp as a molecular scaffold

A) Protein structure of fHbp V1.1 (grey, ribbon representation) with the six positions (P1-5, and P7) used to generate chimeric fHbp:PorAs. B) Secondary structure of fHbp V1.1 (grey, arrows represent β-sheets, rectangles represent α-helices). Locations of the VR2 P1.16 PorA insertion sites are indicated by solid black lines, numbers indicate the residue range that the PorA VR2 loops may be inserted (corresponds with residue numbers in 1D). C) Analysis of purified fHbp:PorAs with the PorA P1.16 VR2 loop in positions 1-5 or 7 of fHbp, the wild-type (WT V1.1) by SDS-PAGE and Western blot. Blots were probed with α-V1 fHbp pAb and an α-P1.16 mAb. D) Primary sequence (SEQ ID NO: 1) of V1.1 fHbp indicating the locations (underlined) of positions 1-5 and 7 into which loops from other proteins can be inserted.

Figure 3:
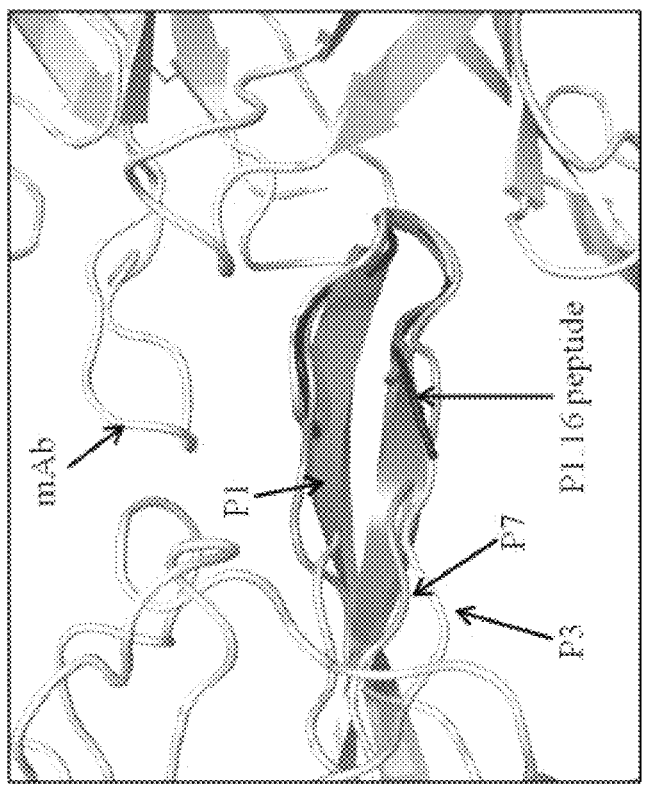

FIG. 3 Characterisation of chimeric fHbp:PorAs (A) Structure of fHbp:PorAs overlaid with the P1.16 loop (black, PDBID: 2 mpa) with the Fab of the α-P1.16 mAb and fHbp:PorAs with the loop in position 1, position 3 and position 7, demonstrating that the epitope is in a conformation recognised by a bactericidal antibody.

(B) Stability of fHbp N-terminal (NT) and C-terminal (CT) beta-barrels of fHbps by Differential Scanning calorimetry analysis performed using a 20-120° C. temperature gradient. Melting temperature is shown for the fHbp N-terminal (NTT) and C-terminal (CTT) barrels. Binding fHbp:PorAs to Complement Factor H (CFH) and mAbs SPR analysis of fHbp and chimeric fHbp:PorAs coupled to a BIAcore CM5 chip. CFH (fH67) was flowed over at a dilution range of 0.5-32 nM, and the dissociation constant ($K_D$) calculated; dissociation constants (KDs) for fHbp:

PorAs confirms lack of CFH binding of fHbp with a loop in position 5 which impinges on the fHbp:CFH interface (FIG. 2A). NB=Non-binding.

Figure 4:
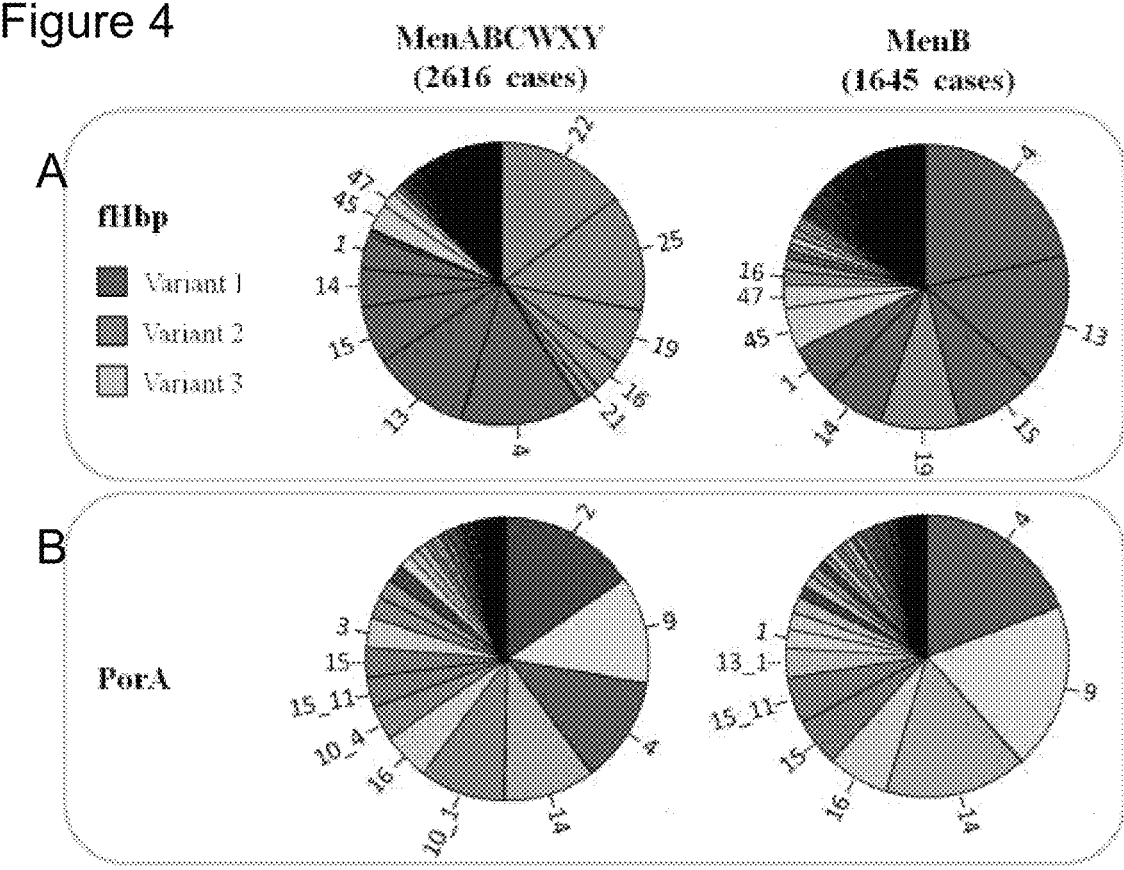

FIG. 4 Repertoire of antigens selected for chimeric fHbp: PorAs (A, B) Frequency of fHbp variants and PorA VR2 subtypes, respectively, in *N. meningitidis* disease isolates in the UK between 2010-2015 from the Meningitis Research Foundation Genome Library, shown as Pie Charts (above) and Tables (below) with the frequency of specific fHbps and PorAs. N.B. V2 fHbp accounts for 38.9% of isolates.

TABLE 2

Exact sequence matches for all N. meningitidis UK isolates between 2009-2015:

| Antigen | Variant | % MenB coverage |
|---|---|---|
| fHbp | 1.4 | 21.5 |
|  | 2.19 | 9.1 |
|  | 3.45 | 4.8 |
| PorA | P1.4 | 19.3 |
|  | P1.9 | 19.1 |
|  | P1.14 | 16.3 |
|  | P1.16 | 7.0 |
|  | P1.15 | 5.5 |
|  | P1.1511 | 5.3 |
| % coverage minus antigen overlap in ALL UK strains (isolated between 2009-2015) |  | 70.6 |
| % coverage minus antigen overlap in UK MenB strains (isolated between 2009-2015) |  | 79.2 |

Exact sequence matches for:
Pfizer vaccine, 3.02%
Bexsero fHbp (V1.1) or PorA (P1.16), 15.86%
Chimeric fHbp:PorAs, fHbp or PorA, 72%
(23.5% with fHbp AND PorA)

Figure 5:
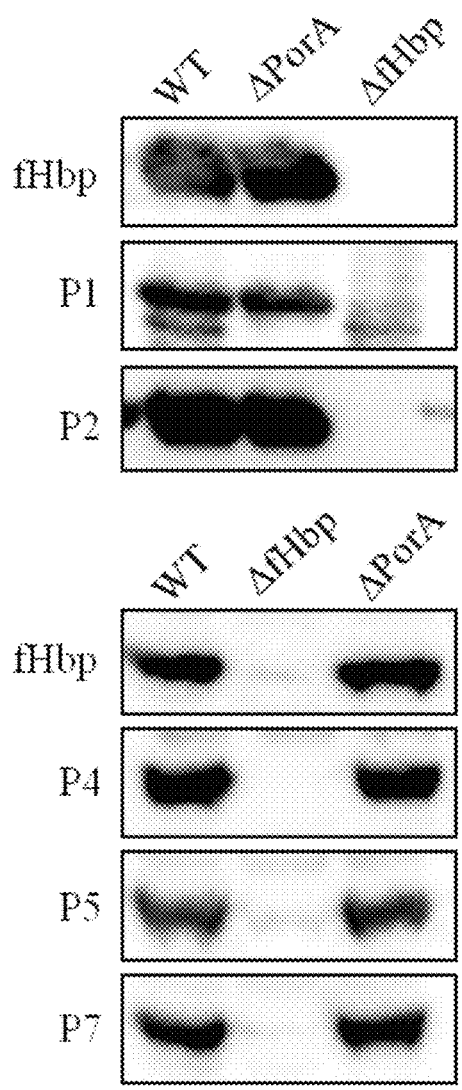
Figure 5:
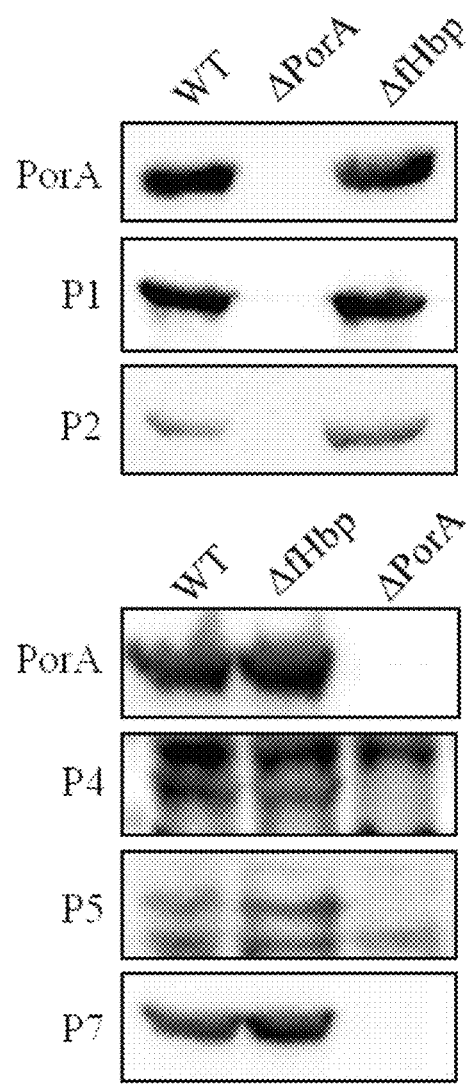

FIG. 5 Recognition of *Neisseria meningitidis* fHbp (A) and PorA (B) antigens by mouse immune sera. Whole cell lysates from *Neisseria meningitidis* strains H44/76 (WT), H44/67 ΔfHbp and H44/67 ΔPorA, were separated by SDS-PAGE, transferred to a PVDF membrane and probed with mouse immune sera. Mouse immune sera were obtained by immunising BalbC mice three times with 20 μg of purified fHbp-PorA chimeras with VR2 loops in P1, P2, P4, P5 or P7.

Figure 6:
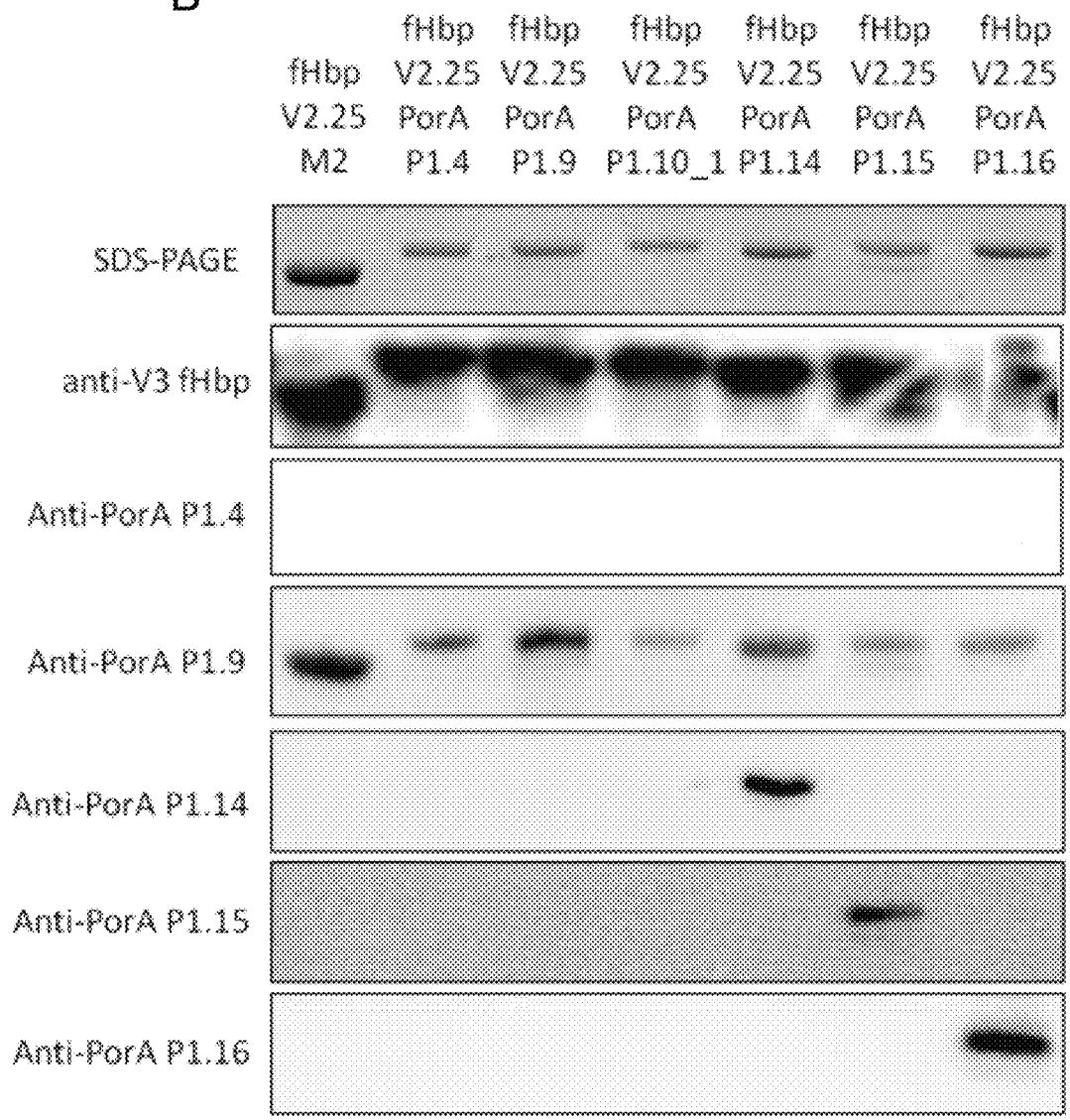

FIG. 6 Stabilisation of V2 fHbp: construction and immunogenicity of fHbp:PorAs (A) Stabilisation of V2 fHbp V2.22 and V2.25 with six (M6) or two (M2) a.a. substitutions. DSC analysis was performed with 20 μM of protein, using a 20-120° C. temperature gradient. Melting temperature is recorded for the fHbp N-terminal ($NT_{TM}$) and C-terminal barrels ($CT_{TM}$).

(B) Chimeric fHbp:PorAs PorA loops are recognised by corresponding mAbs. PorA VR2 loops from P1.2, P1.4, P1.9, P1.14 and P1.15 were inserted into position 1 of V2.25 fHbp. SDS-PAGE and Western blot analysis of purified wild type V2.25 fHbp and V3.45 fHbp-PorA chimeras. Western blots were probed with fHbp V2.25 pAbs and loop specific PorA mAbs (NIBSC). CFH binding was detected by far Western blot analysis with normal human sera and CFH pAbs.

Figure 7:
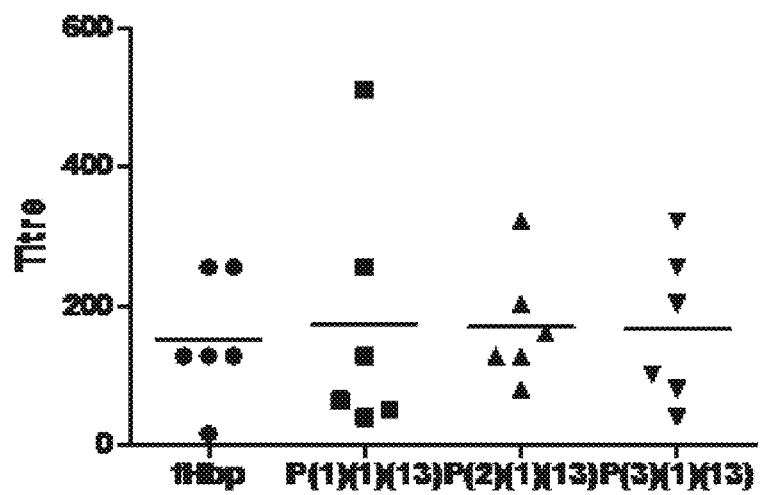
Figure 7:
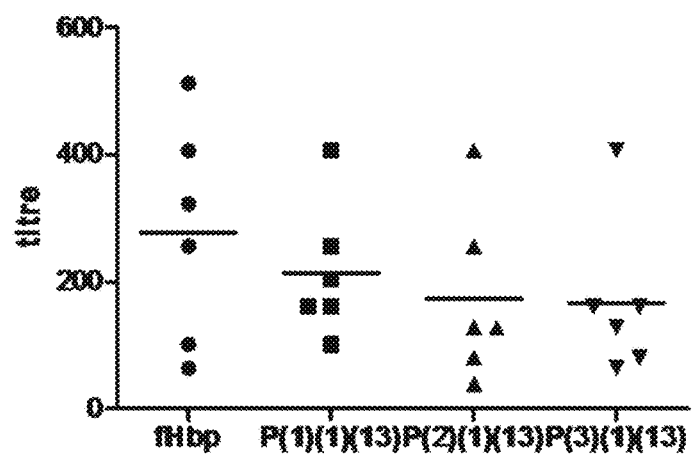
Figure 7:
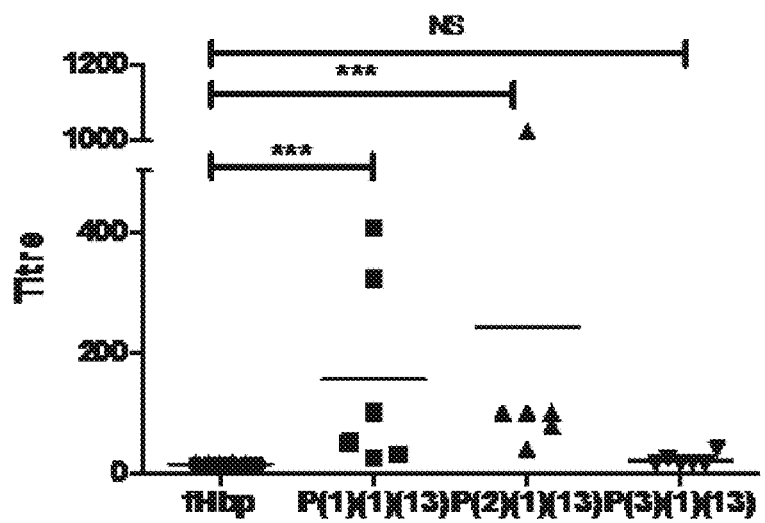

FIG. 7 Chimeric fHbp:PorAs elicit protective immunity. Mice were immunised with chimeric fHbp:PorA i.e. P(1)(1)(13), P(2)(1)(13), and P(3)(1)(13) on three occasions, and SBAs measured against the strains indicated; an SBA >8 is considered protective. The lack of PorA-directed SBA (i.e. SBA 0, against the fHbp mutant) with VR2 loop in position 3 i.e. P(3)(1)(13) is likely because the loop does not protrude from fHbp barrel as far as in pos. 1.

Figure 8:
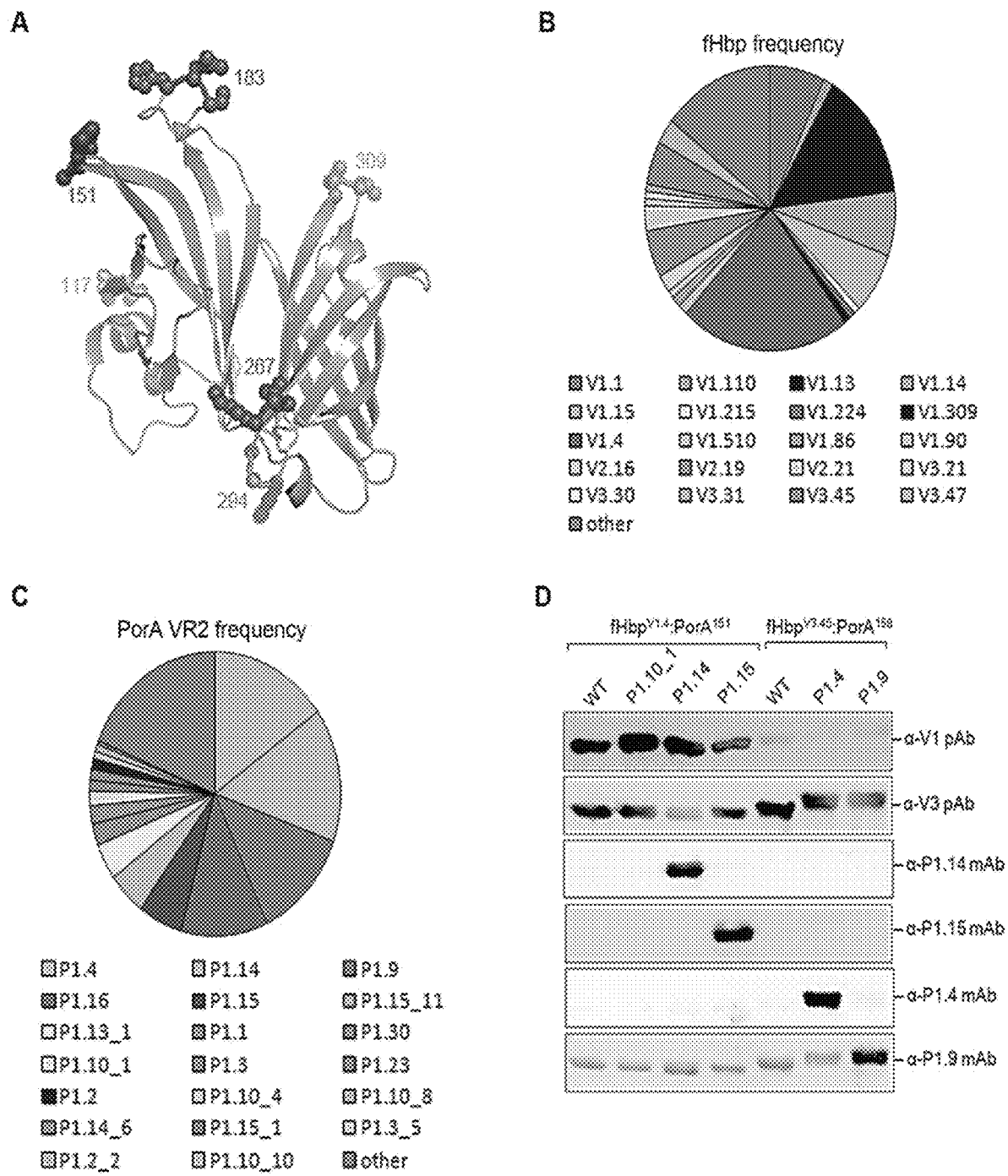
Figure 8:
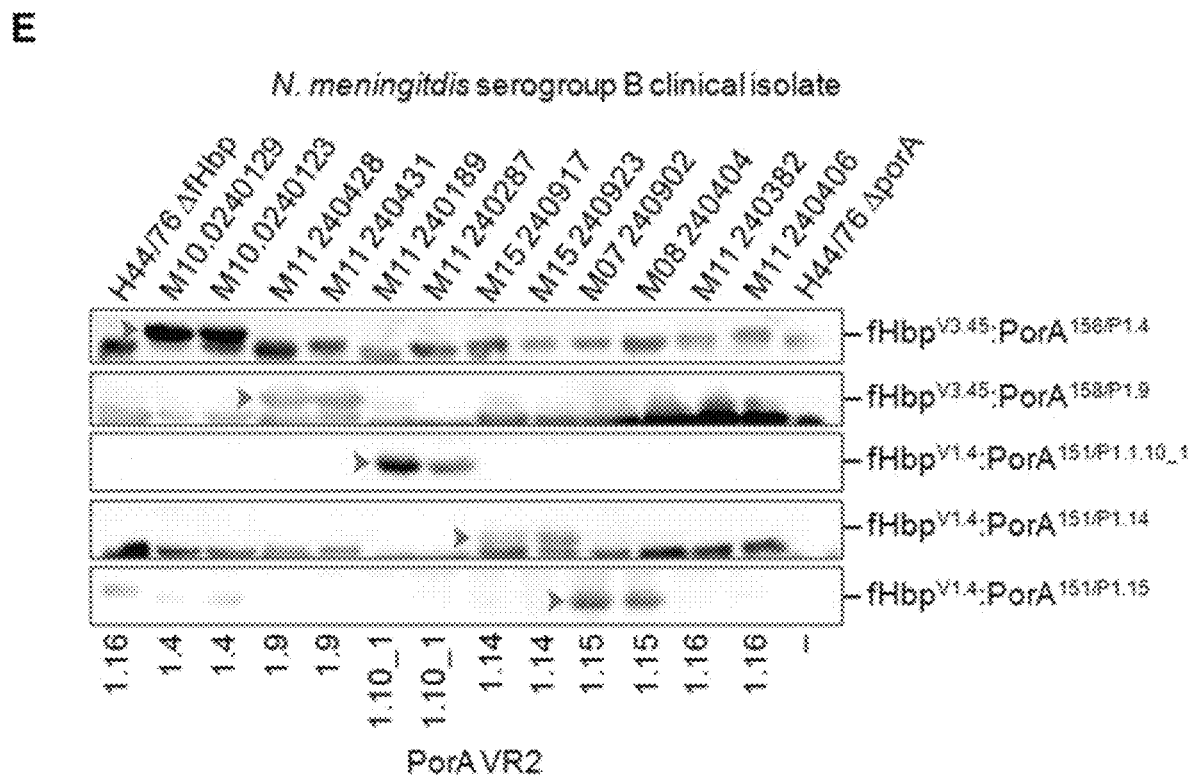

FIG. 8. Frequency of PorA VR2 (A) and fHbp variants (B) in *N. meningitidis* serogroup B strains (n=243) isolated in 2016 in the UK. Data downloaded from the Meningococcal Research Foundation, 27 Jun. 2017. Other: remaining alleles that occur in <4 isolates. (C) Analysis of recombinant Chimeric antigens by SDS-PAGE and Western blot. Immunoblots are probed with α-PorA VR2 mAbs: P1.4, P1.9, P1.14 and P1.15. (D) Detection of PorA in a panel of *N. meningitidis* serogroup B isolates by mouse polyclonal antisera from Chimeric Antigens $fHbp^{V1.4}$:$PorA^{151/P1.1.10\_1}$, $fHbp^{V1.4}$: $PorA^{151/P1.14}$ and $fHbp^{V1.4}$:$PorA^{151/P1.15}$, $fHbp^{V3.45}$:$PorA^{158/P1.4}$ and $fHbp^{V3.45}$:$PorA^{158/P1.9}$.

EXAMPLE 1

It has been shown that immunogenic peptides can be introduced into factor H binding protein (fHbp), and the peptides are presented to the immune system and are able to elicit protective responses (FIGS. 5 and 7). Peptides have been used from the integral membrane protein PorA for proof-in principle of this approach. PorA is difficult to express because of the insolubility of its membrane spanning domains. The immunogenic portions of the molecule reside in extracellular loops which are exposed to the immune system. However effective immune responses are only generated against the loops in their right conformation; linear peptide sequences do not elicit functional immune responses. Through knowledge of the structure of fHbp, it is possible to introduce PorA loops into fHbp and generate relevant responses against PorA. This results in a chimeric molecule, based on fHbp and PorA sequences in specific sites to generate a chimeric molecule. This approach can be used for any other immunogenic integral outer membrane protein.

It has been shown that the likely reason for the exclusion of v2 fHbp from vaccines is the inherent instability of its N-terminal β-barrel: i) it was not possible to determine the atomic structure of this portion of v2 fHbp[10], ii) v2 fHbp is sensitive to protease digestion (mass spectrometry demonstrates that the cleaved sites reside in the N-terminal β-barrel, not shown), and iii) differential scanning calorimetry confirms that the instability lies in this region of v2 fHbp[10].

Stable v2 fHbps have been successfully generated. Mutagenesis affecting the N-terminal barrel has been undertaken, substituting amino acids (a.a.s) singly or in combination. Substitution of six amino acids in M6 fHbp stabilises v2 fHbp (i.e. 6 changes in c 130 a.a.s of this β-barrel, <0.5%) (see WO2014030003 for details of the mutations). This is evident from differential scanning calorimetry (DSC) and protease sensitivity (see WO2014030003 for details). The side chains of the altered residues promote interactions between the β-sheets of the N-terminal barrel, so are orientated towards the centre of the molecule; the changes do not affect the immunogenicity of the protein as expected (no difference in SBA, or α-fHbp IgG levels not shown).

Chimeric v1.1 fHbp has been generated incorporating the 13 amino acid VR2 from P1.16 PorA which elicits SBA in recipients of OMV vaccines[16]. While integral membrane proteins contain hydrophobic (thence insoluble) β-barrels, fHbp contains two barrels which can be expressed and purified to high levels. The VR2 sequence has been introduced into six different positions of fHbp (FIG. 2B); these sites were selected on the basis of similar spacing of flanking β-sheets in PorA[22] and fHbp to reduce the likelihood of the insertion disrupting the overall structure of fHbp (FIG. 2B for predicted effect of the insertions). The immunogenicity of three fHbps with insertion of VR2 into a different of fHbp (FIG. 2B) has been assessed. All proteins elicit antibody responses that recognise against fHbp and PorA (FIGS. 5 and 7), and importantly both proteins tested so far (with the VR2 in site 1 or 2) elicit SBA against fHbp and PorA independently (SBA for Nm H44/76, 512; and for Nm H44/76αfHbp, 256 for both fHbps). This provides proof of principle for this approach.

fHbp as a Scaffold for Multi-Valent Vaccines

Non-functional fHbps as vaccines—The function of fHbp was not known when clinical trials of fHbp-containing vaccines began; fHbp displays high affinity interactions with fH (dissociation constant <5 nM) irrespective of variant group, with fH engaging a large area of fHbp[5]. This interaction could impair the use of fHbp as a vaccine by i) blocking immunogenic epitopes and preventing the generation of antibodies that could compete with fH, and ii) reducing complement activation (through fH recruitment) and thence B cell activation at the site of immune induction. The use of non-functional fHbps circumvents these problems. Key amino acids of v1, 2 and 3 fHbps have been identified that are necessary for fH interactions[10], and modification of single a.a.s of v1, v2 and v3 fHbps which prevent fH binding have been shown to retain or even enhance immunogenicity of this important vaccine antigen[10,23].

To Generate and Evaluate Single Protein, Multi-Valent Vaccine Candidates:

Protective PorA epitopes from prevalent serosubtypes (which are defined by their PorA sequence) of Nm'[5] have been introduced into v1, stable v2 and v3 proteins; their stability and recognition by PorA and fHbp mAbs has been determined. PorA sequences have been selected to cover the diversity of isolates in the UK but data from any collection of meningococcal strains can be used.

Methods of Research

Generation and characterisation of vaccine candidates—Recombinant fHbps were constructed and expressed in *E. coli* using standard plasmid vectors; proteins were affinity purified using the polyHis tag in the protein, anion exchange and gel filtration[10] of chimeric v1, V2 and V3 fHbps as these are either in existing vaccines (v1.1 and 3.45) or because of experience with the protein (v2), or because of their prevalence in Nm strains. PorA loops have been introduced into fHbp by standard methods, and we have demonstrated that the fusion proteins bind mAbs against common serosubtypes of PorA. This strategy has been used to compare native and designed sequences, and perform fine mapping of antigenic and fH-binding of the candidates. DSC has been carried out using a VP Capillary DSC (GEHealthcare) and SPR with a Biacore 3000 (GE Healthcare) or ProteOn XPR36 (BioRad) as previously[10].

REFERENCES

1. Rosenstein, N. E., B. A. Perkins, D. S. Stephens, T. Popovic, and J. M. Hughes. 2001. Meningococcal disease. N. Engl. J. Med. 344:1378-1388.
2. Tan, L. K., Carlone, G. M., and Borrow, R. 2010. Advances in the development of vaccines against *Neisseria meningitidis*. N Engl J Med 362: 1511-1520
3. http://www.meningitis.org/research/genome
4. Finne, J., M. Leinonen, and P. H. Makela. 1983. Antigenic similarities between brain c omponents and bacteria causing meningitis. Implications for vaccine development and pathogenesis. Lancet 2:355-357.
5. Schneider, M. C., B. E. Prosser, J. J. Caesar, E. Kugelberg, S. et al. 2009. *Neisseria meningitidis* recruits factor H using protein mimicry of host carbohydrates. Nature 458:890-893.
6. Fletcher, L. D., L. Bernfield, V. Barniak, J. E. Farley, et al. 2004. Vaccine potential of the *Neisseria meningitidis* 2086 lipoprotein. Infect. Immun. 72:2088-2100
7. Masignani, V., Comanducci, M., Giuliani, M., Bambini, S., et al. 2003. Vaccination against *Neisseria meningitidis* using three variants of the lipoprotein GNA1870. J. Exp. Med. 197:789-799.
8. Beernink, P. T., Shaughnessy, J., Pajon, R., Braga, E. M., et al. 2012. The Effect of Human Factor H on Immunogenicity of Meningococcal Native Outer Membrane Vesicle Vaccines with Over-Expressed Factor H Binding Protein. PLoS Pathogens 8: e1002688
9. Granoff, D. M., Welsch, J. A., and Ram, S. 2009. Binding of complement factor H (fH) to *Neisseria meningitidis* is specific for human fH and inhibits complement activation by rat and rabbit sera. Infect. Immun. 77: 764-769.
10. Johnson, S., Tan, L., van der Veen, S., Caesar, J., et al. (2012) Design and evaluation of meningococcal vaccines through structure-based modification of host and pathogen molecules. PLoS pathogens 8: e1002981
11. Zipfel, P. F., Skerka, C., Hellwage, J., Jokiranta, S. T., et al. 2002. Factor H family proteins: on complement, microbes and human diseases. Biochem. Soc. Trans. 30: 971-978.
12. Schneider, M. C., Exley, R. M., Ram, S., Sim, R. B., and Tang, C. M. 2007. Interactions between *Neisseria meningitidis* and the complement system. Trends Microbiol 15: 233-240
13. Richmond, P. C., Marshall, H. S., Nissen, M D., Jiang, Q., et al. 2012. Safety, immunogenicity, and tolerability of meningococcal serogroup B bivalent recombinant lipoprotein 2086 vaccine in healthy adolescents: a randomised, single-blind, placebo-controlled, phase 2 trial. *Lancet infect Dis.* 12: 597-607.
14. Gorringe A R, Pajón R 2011. Bexsero: a multicomponent vaccine for prevention of meningococcal disease. Expert Opin Biol Ther. 11: 969-85.
15. Lucidarme, J., Comanducci, M., Findlow, J., Gray, S. J., et al. 2010. Characterization of fHbp, nhba (gna2132), nadA, porA, and sequence type in group B meningococcal case isolates collected in England and Wales during January 2008 and potential coverage of an investigational group B meningococcal vaccine. Clin Vaccine Immunol. 2010 17: 919-29
16. Rosenqvist, E., Høiby, E. A., Wedege, E. Caugant, D. A., et al. 1993. A new variant of serosubtype P1.16 in *Neisseria meningitidis* from Norway, associated with increased resistance to bactericidal antibodies induced by a serogroup B outer membrane protein vaccine. Microb Pathog. 15: 197
17. Martin, S. L., Borrow, R., van der Ley, P., Dawson, M., Fox, A. J., and Cartwright, K. A. 2000. Effect of sequence variation in meningococcal PorA outer membrane protein on the effectiveness of a hexavalent PorA outer membrane vesicle vaccine. Vaccine 18: 2476-81.
18. Martin, D. R., Ruijne, N., McCallum, L., O'Hallahan, J., and Oster, P. 2006. The VR2 epitope on the PorA P1.7-2,4 protein is the major target for the immune response elicited by the strain-specific group B meningococcal vaccine MeNZB. Clinical and Vaccine Immunology 13: 486-491.
19. McGuinness, B., Barlow, A. K., Clarke, I. N., Farley, J. E. et al. 1990 *Deduced amino acid sequences of class* 1 protein (PorA) from three strains of Neisseria meninintidis. Synthetic peptides define the epitopes responsible for serosubtype specificity. J Exp Med. June 171: 1871-82.
20. Christodoulides, M., McGuinness, B. T., Heckels, J. E. 1993. Immunization with synthetic peptides containing epitopes of the class 1 outer-membrane protein of Neisseria meningitidis: production of bactericidal antibodies on immunization with a cyclic peptide. J Gen Micro 139: 1729
21. Gossger, N., Snape, M. D., Yu, L. M., Finn, A., et al. 2012. Immunogenicity and tolerability of recombinant serogroup B meningococcal vaccine administered with or without routine infant vaccinations according to different immunization schedules: a randomized controlled trial. JAMA. 307: 573-82.
22. van den Elsen, J. M. H., Herron, J. N., Hoogerhout, P., Poolman, J. T., et al. 1997. Bactericidal antibody recognition of a PorA epitope of Neisseria meningitidis: Crystal structure of a Fab fragment in complex with a fluorescein-conjugated peptide. Proteins: Structure, Function, and Bioinformatics 29: 113-125.
23. Beernink, P. T., Shaughnessy, J., Braga, E. M., Liu, Q., et al. 2011. A meningococcal factor H binding protein mutant that eliminates factor H binding enhances protective antibody responses to vaccination. J. Immunol. 186: 3606-3614.
24. Ufret-Vincenty, R. L., Aredo, B., Liu, X., McMahon, A., et al. 2010. Transgenic mice expressing variants of complement factor H develop AMD-like retinal findings. Invest Ophthalmol. Vis. Sci. 51: 5878-5887.

All references are herein incorporated by reference.

EXAMPLE 2—CHIMERIC ANTIGENS CONTAINING AN EXPANDED RANGE OF PORA VR2 LOOPS GENERATE IMMUNE RESPONSES

To test the adaptability of the fHbp:PorA Chimeric antigens, several Chimeric antigens composed from different combinations of fHbp and PorA VR2 were generated. The comprehensive meningococcal genome data available for strains isolated in the UK (Meningitis Research Foundation Meningococcus Genome Library developed by Public health England, the Wellcome Trust Sanger Institute and the University of Oxford as a collaboration.) enables construction of Chimeric antigens that have exact sequence matches to the most common antigens in a given region. In 2016, the most prevalent PorA VR2s in serogroup B N. meningitidis isolates were P1.4 (15.2%), P1.14 (15.2%), P1.9 (12.8%), P1.16 (11.1%) and P1.15 (5.8%, FIG. 8B). VR2 P1.10_1 was present in 1.6% serogroup B isolates. The most prevalent variant 1, variant 2 and variant 3 fHbps were V1.4, V2.19 and V3.45, present in 21.8%, 5.3% and 4.9% of serogroup B N. meningitidis isolates respectively (FIG. 8C). Five different Chimeric antigens were constructed, in which a PorA VR2 was inserted position 151 (V1.4) or position 158 (V3.45, FIG. 8A). Following Chimeric antigen expression and purification, Western blot analyses confirmed these Chimeric antigens all retained epitopes recognised by their cognate α-VR2 mAb and α-fHbp pAbs (FIG. 8D). The thermal stability of wild type fHbps V1.1, V1.4 and V3.45 and the Chimeric antigens was determined by differential scanning calorimetry (DSC, Table 3).

To examine the ability of these fHbp:PorA Chimeric antigens to elicit immune responses, groups of CD1 mice were immunized with each Chimeric antigen/alum; antisera obtained post immunisation were pooled. To assess the resulting PorA immune responses, Western blot were conducted with pooled antisera and a panel of serogroup B N. meningitidis disease isolates. FIG. 8E demonstrates that all Chimeric antigens elicited α-PorA antibodies that recognised their cognate PorA VR2. To evaluate α-PorA SBA responses, Serum Bactericidal Assays were performed with pooled Chimeric antigen/alum antisera and serogroup B N. meningitidis strains with mismatched fHbp variants, to negate fHbp cross-protection. Titres range between ≥20 to ≥1280 and are above the ≥8 threshold for an accepted correlate of protective immunity against N. meningitidis (Andrews, N. et al. Clin Diagn Lab Immunol 10, 780-786 (2003)) (Table 4).

TABLE 3

Stability of wild type fHbp and Chimeric Antigens

| | Cp (kcal mole$^{-1}$ ° C.$^{-1}$) | |
| --- | --- | --- |
| Protein | N-terminal $T_m$ | C-Terminal $T_m$ |
| fHbp V1.1 | 69.8 | 87.9 |
| fHbp V1.4 | 64.0 | 89.0 |
| fHbp V3.45 | 41.0 | 83.0 |
| fHbp$^{V1.4}$:PorA$^{151/P1.1.10\_1}$ | 54.0 | 89.0 |
| fHbp$^{V1.4}$:PorA$^{151/P1.14}$ | 55.0 | 88.0 |
| fHbp$^{V1.4}$:PorA$^{151/P1.15}$ | 55.0 | 89.0 |
| fHbp$^{V3.45}$:PorA$^{158/P1.4}$ | 40.0 | 81.0 |
| fHbp$^{V3.45}$:PorA$^{158/P1.9}$ | 39.0 | 80.0 |

Melting temperature, $T_m$

TABLE 4

Serum bactericidal assay titres

| Pooled antisera | Serogroup B isolate | fHbp variant | PorA VR2 | SBA titre |
| --- | --- | --- | --- | --- |
| fHbp$^{V3.45}$:PorA$^{158/P1.4}$ | M10240123 | V1.92* | P1.4 | 1/160 |
| fHbp$^{V3.45}$:PorA$^{158/P1.9}$ | M11240431 | V2.19 | P1.9 | 1/1280 |
| fHbp$^{V1.4}$:PorA$^{151/P1.1.10\_1}$ | M11240189 | V3.84 | P1.10_1 | 1/20 |
| fHbp$^{V1.4}$:PorA$^{151/P1.14}$ | M15240853 | V3.45 | P1.14 | 1/640 |

α-PorA SBA titres generated using pooled Chimeric Antigen/alum antisera and serogroup B N. meningitidis isolates with mismatched fHbp variants.
*fHbp truncated at residue 242.
fHbp$^{V1.4}$:PorA$^{151/P1.15}$ not tested, as it was needed to generate ΔfHbp strains, as the fHbp in strains with PorA VR2 P1.15 is not mismatched.

SEQUENCE LISTING

<160> NUMBER OF SEQ ID NOS: 109

<210> SEQ ID NO 1
<211> LENGTH: 255
<212> TYPE: PRT
<213> ORGANISM: Neisseria meningitidis

<400> SEQUENCE: 1

```
Cys Ser Ser Gly Gly Gly Val Ala Ala Asp Ile Gly Ala Gly Leu
1               5                   10                  15

Ala Asp Ala Leu Thr Ala Pro Leu Asp His Lys Asp Lys Gly Leu Gln
            20                  25                  30

Ser Leu Thr Leu Asp Gln Ser Val Arg Lys Asn Glu Lys Leu Lys Leu
        35                  40                  45

Ala Ala Gln Gly Ala Glu Lys Thr Tyr Gly Asn Gly Asp Ser Leu Asn
    50                  55                  60

Thr Gly Lys Leu Lys Asn Asp Lys Val Ser Arg Phe Asp Phe Ile Arg
65                  70                  75                  80

Gln Ile Glu Val Asp Gly Gln Leu Ile Thr Leu Glu Ser Gly Glu Phe
                85                  90                  95

Gln Val Tyr Lys Gln Ser His Ser Ala Leu Thr Ala Phe Gln Thr Glu
            100                 105                 110

Gln Ile Gln Asp Ser Glu His Ser Gly Lys Met Val Ala Lys Arg Gln
        115                 120                 125

Phe Arg Ile Gly Asp Ile Ala Gly Glu His Thr Ser Phe Asp Lys Leu
    130                 135                 140

Pro Glu Gly Gly Arg Ala Thr Tyr Arg Gly Thr Ala Phe Gly Ser Asp
145                 150                 155                 160

Asp Ala Gly Gly Lys Leu Thr Tyr Thr Ile Asp Phe Ala Ala Lys Gln
                165                 170                 175

Gly Asn Gly Lys Ile Glu His Leu Lys Ser Pro Glu Leu Asn Val Asp
            180                 185                 190

Leu Ala Ala Ala Asp Ile Lys Pro Asp Gly Lys Arg His Ala Val Ile
        195                 200                 205

Ser Gly Ser Val Leu Tyr Asn Gln Ala Glu Lys Gly Ser Tyr Ser Leu
    210                 215                 220

Gly Ile Phe Gly Gly Lys Ala Gln Glu Val Ala Gly Ser Ala Glu Val
225                 230                 235                 240

Lys Thr Val Asn Gly Ile Arg His Ile Gly Leu Ala Ala Lys Gln
                245                 250                 255
```

<210> SEQ ID NO 2
<211> LENGTH: 255
<212> TYPE: PRT
<213> ORGANISM: Neisseria meningitidis

<400> SEQUENCE: 2

```
Cys Ser Ser Gly Gly Gly Val Ala Ala Asp Ile Gly Ala Gly Leu
1               5                   10                  15

Ala Asp Ala Leu Thr Ala Pro Leu Asp His Lys Asp Lys Ser Leu Gln
            20                  25                  30

Ser Leu Thr Leu Asp Gln Ser Val Arg Lys Asn Glu Lys Leu Lys Leu
        35                  40                  45

Ala Ala Gln Gly Ala Glu Lys Thr Tyr Gly Asn Gly Asp Ser Leu Asn
    50                  55                  60

Thr Gly Lys Leu Lys Asn Asp Lys Val Ser Arg Phe Asp Phe Ile Arg
65                  70                  75                  80

Gln Ile Glu Val Asp Gly Gln Leu Ile Thr Leu Glu Ser Gly Glu Phe
                85                  90                  95

Gln Val Tyr Lys Gln Ser His Ser Ala Leu Thr Ala Leu Gln Thr Glu
            100                 105                 110
```

Gln Val Gln Asp Ser Glu His Ser Gly Lys Met Val Ala Lys Arg Gln
            115                 120                 125

Phe Arg Ile Gly Asp Ile Ala Gly Glu His Thr Ser Phe Asp Lys Leu
        130                 135                 140

Pro Glu Gly Gly Arg Ala Thr Tyr Arg Gly Thr Ala Phe Gly Ser Asp
145                 150                 155                 160

Asp Ala Ser Gly Lys Leu Thr Tyr Thr Ile Asp Phe Ala Ala Lys Gln
                165                 170                 175

Gly His Gly Lys Ile Glu His Leu Lys Ser Pro Glu Leu Asn Val Asp
            180                 185                 190

Leu Ala Ala Ser Asp Ile Lys Pro Asp Lys Arg His Ala Val Ile
        195                 200                 205

Ser Gly Ser Val Leu Tyr Asn Gln Ala Glu Lys Gly Ser Tyr Ser Leu
    210                 215                 220

Gly Ile Phe Gly Gly Gln Ala Gln Glu Val Ala Gly Ser Ala Glu Val
225                 230                 235                 240

Glu Thr Ala Asn Gly Ile Arg His Ile Gly Leu Ala Ala Lys Gln
                245                 250                 255

<210> SEQ ID NO 3
<211> LENGTH: 255
<212> TYPE: PRT
<213> ORGANISM: Neisseria meningitidis

<400> SEQUENCE: 3

Cys Ser Ser Gly Gly Gly Val Ala Ala Asp Ile Gly Ala Gly Leu
1               5                   10                  15

Ala Asp Ala Leu Thr Ala Pro Leu Asp His Lys Asp Lys Gly Leu Gln
            20                  25                  30

Ser Leu Thr Leu Asp Gln Ser Val Arg Lys Asn Glu Lys Leu Lys Leu
        35                  40                  45

Ala Ala Gln Gly Ala Glu Lys Thr Tyr Gly Asn Gly Asp Ser Leu Asn
    50                  55                  60

Thr Gly Lys Leu Lys Asn Asp Lys Val Ser Arg Phe Asp Phe Ile Arg
65                  70                  75                  80

Gln Ile Glu Val Asp Gly Lys Leu Ile Thr Leu Glu Ser Gly Glu Phe
                85                  90                  95

Gln Val Tyr Lys Gln Ser His Ser Ala Leu Thr Ala Leu Gln Thr Glu
            100                 105                 110

Gln Val Gln Asp Ser Glu Asp Ser Gly Lys Met Val Ala Lys Arg Gln
            115                 120                 125

Phe Arg Ile Gly Asp Ile Ala Gly Glu His Thr Ser Phe Asp Lys Leu
        130                 135                 140

Pro Lys Gly Gly Ser Ala Thr Tyr Arg Gly Thr Ala Phe Gly Ser Asp
145                 150                 155                 160

Asp Ala Gly Gly Lys Leu Thr Tyr Thr Ile Asp Phe Ala Ala Lys Gln
                165                 170                 175

Gly His Gly Lys Ile Glu His Leu Lys Ser Pro Glu Leu Asn Val Glu
            180                 185                 190

Leu Ala Thr Ala Tyr Ile Lys Pro Asp Glu Lys Arg His Ala Val Ile
        195                 200                 205

Ser Gly Ser Val Leu Tyr Asn Gln Asp Glu Lys Gly Ser Tyr Ser Leu
    210                 215                 220

Gly Ile Phe Gly Gly Gln Ala Gln Glu Val Ala Gly Ser Ala Glu Val

```
                225                 230                 235                 240
Glu Thr Ala Asn Gly Ile His His Ile Gly Leu Ala Ala Lys Gln
                    245                 250                 255

<210> SEQ ID NO 4
<211> LENGTH: 255
<212> TYPE: PRT
<213> ORGANISM: Neisseria meningitidis

<400> SEQUENCE: 4

Cys Ser Ser Gly Gly Gly Val Ala Ala Asp Ile Gly Ala Gly Leu
1               5                   10                  15

Ala Asp Ala Leu Thr Ala Pro Leu Asp His Lys Asp Lys Ser Leu Gln
            20                  25                  30

Ser Leu Thr Leu Asp Gln Ser Val Arg Lys Asn Glu Lys Leu Lys Leu
        35                  40                  45

Ala Ala Gln Gly Ala Glu Lys Thr Tyr Gly Asn Gly Asp Ser Leu Asn
    50                  55                  60

Thr Gly Lys Leu Lys Asn Asp Lys Val Ser Arg Phe Asp Phe Ile Arg
65                  70                  75                  80

Gln Ile Glu Val Asp Gly Gln Leu Ile Thr Leu Glu Ser Gly Glu Phe
                85                  90                  95

Gln Val Tyr Lys Gln Ser His Ser Ala Leu Thr Ala Leu Gln Thr Glu
            100                 105                 110

Gln Glu Gln Asp Pro Glu His Ser Gly Lys Met Val Ala Lys Arg Arg
        115                 120                 125

Phe Lys Ile Gly Asp Ile Ala Gly Glu His Thr Ser Phe Asp Lys Leu
    130                 135                 140

Pro Lys Asp Val Met Ala Thr Tyr Arg Gly Thr Ala Phe Gly Ser Asp
145                 150                 155                 160

Asp Ala Gly Gly Lys Leu Thr Tyr Thr Ile Asp Phe Ala Ala Lys Gln
                165                 170                 175

Gly His Gly Lys Ile Glu His Leu Lys Ser Pro Glu Leu Asn Val Glu
            180                 185                 190

Leu Ala Thr Ala Tyr Ile Lys Pro Asp Glu Lys His His Ala Val Ile
        195                 200                 205

Ser Gly Ser Val Leu Tyr Asn Gln Asp Glu Lys Gly Ser Tyr Ser Leu
    210                 215                 220

Gly Ile Phe Gly Gly Gln Ala Gln Glu Val Ala Gly Ser Ala Glu Val
225                 230                 235                 240

Glu Thr Ala Asn Gly Ile His His Ile Gly Leu Ala Ala Lys Gln
                245                 250                 255

<210> SEQ ID NO 5
<211> LENGTH: 263
<212> TYPE: PRT
<213> ORGANISM: Neisseria meningitidis

<400> SEQUENCE: 5

Cys Ser Ser Gly Gly Gly Ser Gly Gly Gly Gly Val Ala Ala Asp
1               5                   10                  15

Ile Gly Ala Gly Leu Ala Asp Ala Leu Thr Ala Pro Leu Asp His Lys
            20                  25                  30

Asp Lys Gly Leu Lys Ser Leu Thr Leu Glu Asp Ser Ile Ser Gln Asn
        35                  40                  45

Gly Thr Leu Thr Leu Ser Ala Gln Gly Ala Glu Arg Thr Phe Lys Ala
```

Gly Asp Lys Asp Asn Ser Leu Asn Thr Gly Lys Leu Lys Asn Asp Lys
65                  70                  75                  80

Ile Ser Arg Phe Asp Phe Ile Arg Gln Ile Glu Val Asp Gly Gln Leu
                85                  90                  95

Ile Thr Leu Glu Ser Gly Glu Phe Gln Val Tyr Lys Gln Ser His Ser
            100                 105                 110

Ala Leu Thr Ala Leu Gln Thr Glu Gln Val Gln Asp Ser Glu His Ser
        115                 120                 125

Gly Lys Met Val Ala Lys Arg Gln Phe Arg Ile Gly Asp Ile Val Gly
    130                 135                 140

Glu His Thr Ser Phe Gly Lys Leu Pro Lys Asp Val Met Ala Thr Tyr
145                 150                 155                 160

Arg Gly Thr Ala Phe Gly Ser Asp Asp Ala Gly Gly Lys Leu Thr Tyr
                165                 170                 175

Thr Ile Asp Phe Ala Ala Lys Gln Gly His Gly Lys Ile Glu His Leu
            180                 185                 190

Lys Ser Pro Glu Leu Asn Val Asp Leu Ala Ala Ala Asp Ile Lys Pro
        195                 200                 205

Asp Glu Lys His His Ala Val Ile Ser Gly Ser Val Leu Tyr Asn Gln
210                 215                 220

Ala Glu Lys Gly Ser Tyr Ser Leu Gly Ile Phe Gly Gly Gln Ala Gln
225                 230                 235                 240

Glu Val Ala Gly Ser Ala Glu Val Glu Thr Ala Asn Gly Ile Arg His
                245                 250                 255

Ile Gly Leu Ala Ala Lys Gln
            260

<210> SEQ ID NO 6
<211> LENGTH: 260
<212> TYPE: PRT
<213> ORGANISM: Neisseria meningitidis

<400> SEQUENCE: 6

Cys Ser Ser Gly Gly Gly Gly Ser Gly Gly Gly Gly Val Thr Ala Asp
1               5                   10                  15

Ile Gly Thr Gly Leu Ala Asp Ala Leu Thr Ala Pro Leu Asp His Lys
            20                  25                  30

Asp Lys Gly Leu Lys Ser Leu Thr Leu Glu Asp Ser Ile Ser Gln Asn
        35                  40                  45

Gly Thr Leu Thr Leu Ser Ala Gln Gly Ala Glu Lys Thr Tyr Gly Asn
    50                  55                  60

Gly Asp Ser Leu Asn Thr Gly Lys Leu Lys Asn Asp Lys Val Ser Arg
65                  70                  75                  80

Phe Asp Phe Ile Arg Gln Ile Glu Val Asp Gly Gln Leu Ile Thr Leu
                85                  90                  95

Glu Ser Gly Glu Phe Gln Val Tyr Lys Gln Ser His Ser Ala Leu Thr
            100                 105                 110

Ala Leu Gln Thr Glu Gln Glu Gln Asp Pro Glu His Ser Glu Lys Met
        115                 120                 125

Val Ala Lys Arg Arg Phe Arg Ile Gly Asp Ile Ala Gly Glu His Thr
    130                 135                 140

Ser Phe Asp Lys Leu Pro Lys Asp Val Met Ala Thr Tyr Arg Gly Thr
145                 150                 155                 160

```
Ala Phe Gly Ser Asp Ala Gly Gly Lys Leu Thr Tyr Thr Ile Asp
            165                 170                 175

Phe Ala Ala Lys Gln Gly His Gly Lys Ile Glu His Leu Lys Ser Pro
        180                 185                 190

Glu Leu Asn Val Asp Leu Ala Val Ala Tyr Ile Lys Pro Asp Glu Lys
            195                 200                 205

His His Ala Val Ile Ser Gly Ser Val Leu Tyr Asn Gln Asp Glu Lys
        210                 215                 220

Gly Ser Tyr Ser Leu Gly Ile Phe Gly Glu Lys Ala Gln Glu Val Ala
225                 230                 235                 240

Gly Ser Ala Glu Val Glu Thr Ala Asn Gly Ile His His Ile Gly Leu
            245                 250                 255

Ala Ala Lys Gln
            260

<210> SEQ ID NO 7
<211> LENGTH: 254
<212> TYPE: PRT
<213> ORGANISM: Neisseria meningitidis

<400> SEQUENCE: 7

Cys Ser Ser Gly Gly Gly Val Ala Ala Asp Ile Gly Ala Gly Leu
1               5                   10                  15

Ala Asp Ala Leu Thr Ala Pro Leu Asp His Lys Asp Lys Ser Leu Gln
            20                  25                  30

Ser Leu Thr Leu Asp Gln Ser Val Arg Lys Asn Glu Lys Leu Lys Leu
        35                  40                  45

Ala Ala Gln Gly Ala Glu Lys Thr Tyr Gly Asn Gly Asp Ser Leu Asn
    50                  55                  60

Thr Gly Lys Leu Lys Asn Asp Lys Val Ser Arg Phe Asp Phe Ile Arg
65                  70                  75                  80

Gln Ile Glu Val Asp Gly Gln Leu Ile Thr Leu Glu Ser Gly Glu Phe
                85                  90                  95

Gln Ile Tyr Lys Gln Asp His Ser Ala Val Val Ala Leu Gln Ile Glu
            100                 105                 110

Lys Ile Asn Asn Pro Asp Lys Ile Asp Ser Leu Ile Asn Gln Arg Ser
        115                 120                 125

Phe Leu Val Ser Gly Leu Gly Gly Glu His Thr Ala Phe Asn Gln Leu
    130                 135                 140

Pro Asp Gly Lys Ala Glu Tyr His Gly Lys Ala Phe Ser Ser Asp Asp
145                 150                 155                 160

Ala Gly Gly Lys Leu Thr Tyr Thr Ile Asp Phe Ala Ala Lys Gln Gly
                165                 170                 175

His Gly Lys Ile Glu His Leu Lys Thr Pro Glu Gln Asn Val Glu Leu
            180                 185                 190

Ala Ala Ala Glu Leu Lys Ala Asp Glu Lys Ser His Ala Val Ile Leu
        195                 200                 205

Gly Asp Thr Arg Tyr Gly Ser Glu Glu Lys Gly Thr Tyr His Leu Ala
    210                 215                 220

Leu Phe Gly Asp Arg Ala Gln Glu Ile Ala Gly Ser Ala Thr Val Lys
225                 230                 235                 240

Ile Gly Glu Lys Val His Glu Ile Gly Ile Ala Gly Lys Gln
                245                 250

<210> SEQ ID NO 8
```

<211> LENGTH: 254
<212> TYPE: PRT
<213> ORGANISM: Neisseria meningitidis

<400> SEQUENCE: 8

```
Cys Ser Ser Gly Gly Gly Gly Val Ala Ala Asp Ile Gly Ala Gly Leu
1               5                   10                  15

Ala Asp Ala Leu Thr Ala Pro Leu Asp His Lys Asp Lys Ser Leu Gln
            20                  25                  30

Ser Leu Thr Leu Asp Gln Ser Val Arg Lys Asn Glu Lys Leu Lys Leu
        35                  40                  45

Ala Ala Gln Gly Ala Glu Lys Thr Tyr Gly Asn Gly Asp Ser Leu Asn
50                  55                  60

Thr Gly Lys Leu Lys Asn Asp Lys Val Ser Arg Phe Asp Phe Ile Arg
65                  70                  75                  80

Gln Ile Glu Val Asp Gly Gln Leu Ile Thr Leu Glu Ser Gly Glu Phe
                85                  90                  95

Gln Ile Tyr Lys Gln Asp His Ser Ala Val Val Ala Leu Gln Ile Glu
            100                 105                 110

Lys Ile Asn Asn Pro Asp Lys Ile Asp Ser Leu Ile Asn Gln Arg Ser
        115                 120                 125

Phe Leu Val Ser Gly Leu Gly Gly Glu His Thr Ala Phe Asn Gln Leu
130                 135                 140

Pro Ser Gly Lys Ala Glu Tyr His Gly Lys Ala Phe Ser Ser Asp Asp
145                 150                 155                 160

Ala Gly Gly Lys Leu Thr Tyr Thr Ile Asp Phe Ala Ala Lys Gln Gly
                165                 170                 175

His Gly Lys Ile Glu His Leu Lys Thr Pro Glu Gln Asn Val Glu Leu
            180                 185                 190

Ala Ser Ala Glu Leu Lys Ala Asp Glu Lys Ser His Ala Val Ile Leu
        195                 200                 205

Gly Asp Thr Arg Tyr Gly Gly Glu Glu Lys Gly Thr Tyr His Leu Ala
210                 215                 220

Leu Phe Gly Asp Arg Ala Gln Glu Ile Ala Gly Ser Ala Thr Val Lys
225                 230                 235                 240

Ile Arg Glu Lys Val His Glu Ile Gly Ile Ala Gly Lys Gln
                245                 250
```

<210> SEQ ID NO 9
<211> LENGTH: 254
<212> TYPE: PRT
<213> ORGANISM: Neisseria meningitidis

<400> SEQUENCE: 9

```
Cys Ser Ser Gly Gly Gly Gly Val Ala Ala Asp Ile Gly Ala Gly Leu
1               5                   10                  15

Ala Asp Ala Leu Thr Ala Pro Leu Asp His Lys Asp Lys Ser Leu Gln
            20                  25                  30

Ser Leu Thr Leu Asp Gln Ser Val Arg Lys Asn Glu Lys Leu Lys Leu
        35                  40                  45

Ala Ala Gln Gly Ala Glu Lys Thr Tyr Gly Asn Gly Asp Ser Leu Asn
50                  55                  60

Thr Gly Lys Leu Lys Asn Asp Lys Val Ser Arg Phe Asp Phe Ile Arg
65                  70                  75                  80

Gln Ile Glu Val Asp Gly Gln Leu Ile Thr Leu Glu Ser Gly Glu Phe
                85                  90                  95
```

Gln Ile Tyr Lys Gln Asp His Ser Ala Val Ala Leu Gln Ile Glu
                100                 105                 110

Lys Ile Asn Asn Pro Asp Lys Ile Asp Ser Leu Ile Asn Gln Arg Ser
                115                 120                 125

Phe Leu Val Ser Gly Leu Gly Gly Glu His Thr Ala Phe Asn Gln Leu
            130                 135                 140

Pro Ser Gly Lys Ala Glu Tyr His Gly Lys Ala Phe Ser Ser Asp Asp
145                 150                 155                 160

Pro Asn Gly Arg Leu His Tyr Ser Ile Asp Phe Thr Lys Lys Gln Gly
                165                 170                 175

Tyr Gly Arg Ile Glu His Leu Lys Thr Pro Glu Gln Asn Val Glu Leu
            180                 185                 190

Ala Ser Ala Glu Leu Lys Ala Asp Glu Lys Ser His Ala Val Ile Leu
            195                 200                 205

Gly Asp Thr Arg Tyr Gly Gly Glu Glu Lys Gly Thr Tyr His Leu Ala
        210                 215                 220

Leu Phe Gly Asp Arg Ala Gln Glu Ile Ala Gly Ser Ala Thr Val Lys
225                 230                 235                 240

Ile Arg Glu Lys Val His Glu Ile Gly Ile Ala Gly Lys Gln
                245                 250

<210> SEQ ID NO 10
<211> LENGTH: 254
<212> TYPE: PRT
<213> ORGANISM: Neisseria meningitidis

<400> SEQUENCE: 10

Cys Ser Ser Gly Gly Gly Gly Val Ala Ala Asp Ile Gly Ala Gly Leu
1               5                   10                  15

Ala Asp Ala Leu Thr Thr Pro Leu Asp His Lys Asp Lys Ser Leu Gln
                20                  25                  30

Ser Leu Thr Leu Asp Gln Ser Val Arg Lys Asn Glu Lys Leu Lys Leu
            35                  40                  45

Ala Ala Gln Gly Ala Glu Lys Thr Tyr Gly Asn Gly Asp Ser Leu Asn
        50                  55                  60

Thr Gly Lys Leu Lys Asn Asp Lys Val Ser Arg Phe Asp Phe Ile Arg
65                  70                  75                  80

Gln Ile Glu Val Asp Gly Gln Thr Ile Thr Leu Ala Ser Gly Glu Phe
                85                  90                  95

Gln Ile Tyr Lys Gln Asn His Ser Ala Val Val Ala Leu Gln Ile Glu
                100                 105                 110

Lys Ile Asn Asn Pro Asp Lys Ile Asp Ser Leu Ile Asn Gln Arg Ser
                115                 120                 125

Phe Leu Val Ser Gly Leu Gly Gly Glu His Thr Ala Phe Asn Gln Leu
            130                 135                 140

Pro Asp Gly Lys Ala Glu Tyr His Gly Lys Ala Phe Ser Ser Asp Asp
145                 150                 155                 160

Pro Asn Gly Arg Leu His Tyr Ser Ile Asp Phe Thr Lys Lys Gln Gly
                165                 170                 175

Tyr Gly Arg Ile Glu His Leu Lys Thr Pro Glu Gln Asn Val Glu Leu
            180                 185                 190

Ala Ser Ala Glu Leu Lys Ala Asp Glu Lys Ser His Ala Val Ile Leu
            195                 200                 205

Gly Asp Thr Arg Tyr Gly Gly Glu Glu Lys Gly Thr Tyr His Leu Ala

```
                210                 215                 220
Leu Phe Gly Asp Arg Ala Gln Glu Ile Ala Gly Ser Ala Thr Val Lys
225                 230                 235                 240

Ile Arg Glu Lys Val His Glu Ile Gly Ile Ala Gly Lys Gln
                245                 250
```

<210> SEQ ID NO 11
<211> LENGTH: 261
<212> TYPE: PRT
<213> ORGANISM: Neisseria meningitidis

<400> SEQUENCE: 11

```
Cys Ser Ser Gly Ser Gly Ser Gly Gly Gly Val Ala Ala Asp Ile
1               5                   10                  15

Gly Thr Gly Leu Ala Asp Ala Leu Thr Ala Pro Leu Asp His Lys Asp
                20                  25                  30

Lys Gly Leu Lys Ser Leu Thr Leu Glu Asp Ser Ile Ser Gln Asn Gly
            35                  40                  45

Thr Leu Thr Leu Ser Ala Gln Gly Ala Glu Lys Thr Phe Lys Val Gly
        50                  55                  60

Asp Lys Asp Asn Ser Leu Asn Thr Gly Lys Leu Lys Asn Asp Lys Ile
65                  70                  75                  80

Ser Arg Phe Asp Phe Val Gln Lys Ile Glu Val Asp Gly Gln Thr Ile
                85                  90                  95

Thr Leu Ala Ser Gly Glu Phe Gln Ile Tyr Lys Gln Asp His Ser Ala
            100                 105                 110

Val Val Ala Leu Gln Ile Glu Lys Ile Asn Asn Pro Asp Lys Ile Asp
        115                 120                 125

Ser Leu Ile Asn Gln Arg Ser Phe Leu Val Ser Gly Leu Gly Gly Glu
130                 135                 140

His Thr Ala Phe Asn Gln Leu Pro Ser Gly Lys Ala Glu Tyr His Gly
145                 150                 155                 160

Lys Ala Phe Ser Ser Asp Asp Ala Gly Gly Lys Leu Thr Tyr Thr Ile
                165                 170                 175

Asp Phe Ala Ala Lys Gln Gly His Gly Lys Ile Glu His Leu Lys Thr
            180                 185                 190

Pro Glu Gln Asn Val Glu Leu Ala Ser Ala Glu Leu Lys Ala Asp Glu
        195                 200                 205

Lys Ser His Ala Val Ile Leu Gly Asp Thr Arg Tyr Gly Ser Glu Glu
    210                 215                 220

Lys Gly Thr Tyr His Leu Ala Leu Phe Gly Asp Arg Ala Gln Glu Ile
225                 230                 235                 240

Ala Gly Ser Ala Thr Val Lys Ile Arg Glu Lys Val His Glu Ile Gly
                245                 250                 255

Ile Ala Gly Lys Gln
            260
```

<210> SEQ ID NO 12
<211> LENGTH: 257
<212> TYPE: PRT
<213> ORGANISM: Neisseria meningitidis

<400> SEQUENCE: 12

```
Cys Ser Ser Gly Gly Gly Gly Val Ala Ala Asp Ile Gly Ala Gly Leu
1               5                   10                  15

Ala Asp Ala Leu Thr Ala Pro Leu Asp His Lys Asp Lys Gly Leu Lys
```

```
                    20                  25                  30
Ser Leu Thr Leu Glu Asp Ser Ile Ser Gln Asn Gly Thr Leu Thr Leu
                35                  40                  45

Ser Ala Gln Gly Ala Glu Lys Thr Phe Lys Val Gly Asp Lys Asp Asn
            50                  55                  60

Ser Leu Asn Thr Gly Lys Leu Lys Asn Asp Lys Ile Ser Arg Phe Asp
65                  70                  75                  80

Phe Val Gln Lys Ile Glu Val Asp Gly Gln Thr Ile Thr Leu Ala Ser
                85                  90                  95

Gly Glu Phe Gln Ile Tyr Lys Gln Asn His Ser Ala Val Val Ala Leu
            100                 105                 110

Gln Ile Glu Lys Ile Asn Asn Pro Asp Lys Ile Asp Ser Leu Ile Asn
        115                 120                 125

Gln Arg Ser Phe Leu Val Ser Gly Leu Gly Gly Glu His Thr Ala Phe
    130                 135                 140

Asn Gln Leu Pro Gly Gly Lys Ala Glu Tyr His Gly Lys Ala Phe Ser
145                 150                 155                 160

Ser Asp Asp Ala Gly Gly Lys Leu Thr Tyr Thr Ile Asp Phe Ala Ala
                165                 170                 175

Lys Gln Gly His Gly Lys Ile Glu His Leu Lys Thr Pro Glu Gln Asn
            180                 185                 190

Val Glu Leu Ala Ala Ala Glu Leu Lys Ala Asp Glu Lys Ser His Ala
        195                 200                 205

Val Ile Leu Gly Asp Thr Arg Tyr Gly Ser Glu Glu Lys Gly Thr Tyr
    210                 215                 220

His Leu Ala Leu Phe Gly Asp Arg Ala Gln Glu Ile Ala Gly Ser Ala
225                 230                 235                 240

Thr Val Lys Ile Gly Glu Lys Val His Glu Ile Ser Ile Ala Gly Lys
                245                 250                 255

Gln

<210> SEQ ID NO 13
<211> LENGTH: 285
<212> TYPE: PRT
<213> ORGANISM: Neisseria meningitidis

<400> SEQUENCE: 13

Met Thr Arg Ser Lys Pro Val Asn Arg Thr Thr Phe Cys Cys Leu Ser
1               5                   10                  15

Leu Thr Ala Gly Pro Asp Ser Asp Arg Leu Gln Gln Arg Arg Gly Gly
                20                  25                  30

Gly Gly Gly Val Ala Ala Asp Ile Gly Thr Gly Leu Ala Asp Ala Leu
            35                  40                  45

Thr Ala Pro Leu Asp His Lys Asp Lys Gly Leu Lys Ser Leu Thr Leu
        50                  55                  60

Glu Ala Ser Ile Pro Gln Asn Gly Thr Leu Thr Leu Ser Ala Gln Gly
65                  70                  75                  80

Ala Glu Lys Thr Phe Lys Ala Gly Gly Lys Asp Asn Ser Leu Asn Thr
                85                  90                  95

Gly Lys Leu Lys Asn Asp Lys Ile Ser Arg Phe Asp Phe Val Gln Lys
            100                 105                 110

Ile Glu Val Asp Gly Gln Thr Ile Thr Leu Ala Ser Gly Glu Phe Gln
        115                 120                 125

Ile Tyr Lys Gln Asp His Ser Ala Val Val Ala Leu Arg Ile Glu Lys
```

```
                130                 135                 140
Ile Asn Asn Pro Asp Lys Ile Asp Ser Leu Ile Asn Gln Arg Ser Phe
145                 150                 155                 160

Leu Val Ser Asp Leu Gly Gly Glu His Thr Ala Phe Asn Gln Leu Pro
                165                 170                 175

Asp Gly Lys Ala Glu Tyr His Gly Lys Ala Phe Ser Ser Asp Asp Ala
            180                 185                 190

Asp Gly Lys Leu Thr Tyr Thr Ile Asp Phe Ala Ala Lys Gln Gly His
            195                 200                 205

Gly Lys Ile Glu His Leu Lys Thr Pro Glu Gln Asn Val Glu Leu Ala
            210                 215                 220

Ser Ala Glu Leu Lys Ala Asp Glu Lys Ser His Ala Val Ile Leu Gly
225                 230                 235                 240

Asp Thr Arg Tyr Gly Gly Glu Glu Lys Gly Thr Tyr Arg Leu Ala Leu
                245                 250                 255

Phe Gly Asp Arg Ala Gln Glu Ile Ala Gly Ser Ala Thr Val Lys Ile
                260                 265                 270

Gly Glu Lys Val His Glu Ile Gly Ile Ala Asp Lys Gln
            275                 280                 285

<210> SEQ ID NO 14
<211> LENGTH: 256
<212> TYPE: PRT
<213> ORGANISM: Neisseria meningitidis

<400> SEQUENCE: 14

Cys Ser Ser Gly Gly Gly Val Ala Ala Asp Ile Gly Ala Gly Leu
1               5                   10                  15

Ala Asp Ala Leu Thr Ala Pro Leu Asp His Lys Asp Lys Gly Leu Gln
                20                  25                  30

Ser Leu Thr Leu Asp Gln Ser Val Arg Lys Asn Glu Lys Leu Lys Leu
            35                  40                  45

Ala Ala Pro Gln Gly Ala Glu Lys Thr Tyr Gly Asn Gly Asp Ser Leu
50                  55                  60

Asn Thr Gly Lys Leu Lys Asn Asp Lys Val Ser Arg Phe Asp Phe Ile
65                  70                  75                  80

Arg Gln Ile Glu Val Asp Gly Gln Leu Ile Thr Leu Glu Ser Gly Glu
                85                  90                  95

Phe Gln Val Tyr Lys Gln Ser His Ser Ala Leu Thr Ala Phe Gln Thr
            100                 105                 110

Glu Gln Ile Gln Asp Ser Glu His Ser Gly Lys Met Val Ala Lys Arg
            115                 120                 125

Gln Phe Arg Ile Gly Asp Ile Ala Gly Glu His Thr Ser Phe Asp Lys
            130                 135                 140

Leu Pro Glu Gly Gly Arg Ala Thr Tyr Arg Gly Thr Ala Phe Gly Ser
145                 150                 155                 160

Asp Asp Ala Gly Gly Lys Leu Thr Tyr Thr Ile Asp Phe Ala Ala Lys
                165                 170                 175

Gln Gly Asn Gly Lys Ile Glu His Leu Lys Ser Pro Glu Leu Asn Val
            180                 185                 190

Asp Leu Ala Ala Ala Asp Ile Lys Pro Asp Gly Lys Arg His Ala Val
            195                 200                 205

Ile Ser Gly Ser Val Leu Tyr Asn Gln Ala Glu Lys Gly Ser Tyr Ser
            210                 215                 220
```

Leu Gly Ile Phe Gly Gly Lys Ala Gln Glu Val Ala Gly Ser Ala Glu
225                 230                 235                 240

Val Lys Thr Val Asn Gly Ile Arg His Ile Gly Leu Ala Ala Lys Gln
            245                 250                 255

<210> SEQ ID NO 15
<211> LENGTH: 6
<212> TYPE: PRT
<213> ORGANISM: Neisseria meningitidis

<400> SEQUENCE: 15

Glu Val Asp Gly Gln Leu
1               5

<210> SEQ ID NO 16
<211> LENGTH: 8
<212> TYPE: PRT
<213> ORGANISM: Neisseria meningitidis

<400> SEQUENCE: 16

Lys Pro Asp Gly Lys Arg His Ala
1               5

<210> SEQ ID NO 17
<211> LENGTH: 7
<212> TYPE: PRT
<213> ORGANISM: Neisseria meningitidis

<400> SEQUENCE: 17

Phe Gly Gly Lys Ala Gln Glu
1               5

<210> SEQ ID NO 18
<211> LENGTH: 6
<212> TYPE: PRT
<213> ORGANISM: Neisseria meningitidis

<400> SEQUENCE: 18

Ala Ala Gln Gly Ala Glu
1               5

<210> SEQ ID NO 19
<211> LENGTH: 10
<212> TYPE: PRT
<213> ORGANISM: Neisseria meningitidis

<400> SEQUENCE: 19

Ile Gln Asp Ser Glu His Ser Gly Lys Met
1               5                   10

<210> SEQ ID NO 20
<211> LENGTH: 6
<212> TYPE: PRT
<213> ORGANISM: Neisseria meningitidis

<400> SEQUENCE: 20

Lys Thr Val Asn Gly Ile
1               5

<210> SEQ ID NO 21
<211> LENGTH: 7
<212> TYPE: PRT
<213> ORGANISM: Neisseria meningitidis
<220> FEATURE:
<221> NAME/KEY: misc_feature

```
<222> LOCATION: (1)..(1)
<223> OTHER INFORMATION: exogenous loop insert; Xaa can be any naturally
      occurring amino acid

<400> SEQUENCE: 21

Xaa Ala Ala Gln Gly Ala Glu
1               5

<210> SEQ ID NO 22
<211> LENGTH: 7
<212> TYPE: PRT
<213> ORGANISM: Artificial Sequence
<220> FEATURE:
<223> OTHER INFORMATION: Modified polypeptide
<220> FEATURE:
<221> NAME/KEY: misc_feature
<222> LOCATION: (2)..(2)
<223> OTHER INFORMATION: Exogenous loop insert; Xaa can be any naturally
      occurring amino acid

<400> SEQUENCE: 22

Ala Xaa Ala Gln Gly Ala Glu
1               5

<210> SEQ ID NO 23
<211> LENGTH: 7
<212> TYPE: PRT
<213> ORGANISM: Artificial Sequence
<220> FEATURE:
<223> OTHER INFORMATION: Modified polypeptide
<220> FEATURE:
<221> NAME/KEY: misc_feature
<222> LOCATION: (3)..(3)
<223> OTHER INFORMATION: Exogenous loop insert; Xaa can be any naturally
      occurring amino acid

<400> SEQUENCE: 23

Ala Ala Xaa Gln Gly Ala Glu
1               5

<210> SEQ ID NO 24
<211> LENGTH: 7
<212> TYPE: PRT
<213> ORGANISM: Artificial Sequence
<220> FEATURE:
<223> OTHER INFORMATION: Modified polypeptide
<220> FEATURE:
<221> NAME/KEY: misc_feature
<222> LOCATION: (4)..(4)
<223> OTHER INFORMATION: Exogenous loop insert; Xaa can be any naturally
      occurring amino acid

<400> SEQUENCE: 24

Ala Ala Gln Xaa Gly Ala Glu
1               5

<210> SEQ ID NO 25
<211> LENGTH: 7
<212> TYPE: PRT
<213> ORGANISM: Artificial Sequence
<220> FEATURE:
<223> OTHER INFORMATION: Modified polypeptide
<220> FEATURE:
<221> NAME/KEY: misc_feature
<222> LOCATION: (5)..(5)
<223> OTHER INFORMATION: Exogenous loop insert; Xaa can be any naturally
      occurring amino acid

<400> SEQUENCE: 25

Ala Ala Gln Gly Xaa Ala Glu
```

```
<210> SEQ ID NO 26
<211> LENGTH: 7
<212> TYPE: PRT
<213> ORGANISM: Artificial Sequence
<220> FEATURE:
<223> OTHER INFORMATION: Modified polypeptide
<220> FEATURE:
<221> NAME/KEY: misc_feature
<222> LOCATION: (6)..(6)
<223> OTHER INFORMATION: Exogenous loop insert; Xaa can be any naturally
      occurring amino acid

<400> SEQUENCE: 26

Ala Ala Gln Gly Ala Xaa Glu
1               5

<210> SEQ ID NO 27
<211> LENGTH: 7
<212> TYPE: PRT
<213> ORGANISM: Artificial Sequence
<220> FEATURE:
<223> OTHER INFORMATION: Modified polypeptide
<220> FEATURE:
<221> NAME/KEY: misc_feature
<222> LOCATION: (7)..(7)
<223> OTHER INFORMATION: Exogenous loop insert; Xaa can be any naturally
      occurring amino acid

<400> SEQUENCE: 27

Ala Ala Gln Gly Ala Glu Xaa
1               5

<210> SEQ ID NO 28
<211> LENGTH: 6
<212> TYPE: PRT
<213> ORGANISM: Artificial Sequence
<220> FEATURE:
<223> OTHER INFORMATION: Modified polypeptide
<220> FEATURE:
<221> NAME/KEY: misc_feature
<222> LOCATION: (2)..(2)
<223> OTHER INFORMATION: Exogenous loop insert; Xaa can be any naturally
      occurring amino acid

<400> SEQUENCE: 28

Ala Xaa Gln Gly Ala Glu
1               5

<210> SEQ ID NO 29
<211> LENGTH: 6
<212> TYPE: PRT
<213> ORGANISM: Artificial Sequence
<220> FEATURE:
<223> OTHER INFORMATION: Modified polypeptide
<220> FEATURE:
<221> NAME/KEY: misc_feature
<222> LOCATION: (3)..(3)
<223> OTHER INFORMATION: Exogenous loop insert; Xaa can be any naturally
      occurring amino acid

<400> SEQUENCE: 29

Ala Ala Xaa Gly Ala Glu
1               5

<210> SEQ ID NO 30
<211> LENGTH: 5
<212> TYPE: PRT
<213> ORGANISM: Artificial Sequence
```

```
<220> FEATURE:
<223> OTHER INFORMATION: Modified polypeptide
<220> FEATURE:
<221> NAME/KEY: misc_feature
<222> LOCATION: (3)..(3)
<223> OTHER INFORMATION: Exogenous loop insertion; Xaa can be any
      naturally occurring amino acid

<400> SEQUENCE: 30

Ala Ala Xaa Ala Glu
1               5

<210> SEQ ID NO 31
<211> LENGTH: 4
<212> TYPE: PRT
<213> ORGANISM: Artificial Sequence
<220> FEATURE:
<223> OTHER INFORMATION: Modified polypeptide
<220> FEATURE:
<221> NAME/KEY: misc_feature
<222> LOCATION: (3)..(3)
<223> OTHER INFORMATION: Xaa can be any naturally occurring amino acid

<400> SEQUENCE: 31

Ala Ala Xaa Glu
1

<210> SEQ ID NO 32
<211> LENGTH: 5
<212> TYPE: PRT
<213> ORGANISM: Artificial Sequence
<220> FEATURE:
<223> OTHER INFORMATION: Modified polypepitide
<220> FEATURE:
<221> NAME/KEY: misc_feature
<222> LOCATION: (2)..(2)
<223> OTHER INFORMATION: Exogenous loop insertion; Xaa can be any
      naturally occurring amino acid

<400> SEQUENCE: 32

Ala Xaa Gly Ala Glu
1               5

<210> SEQ ID NO 33
<211> LENGTH: 4
<212> TYPE: PRT
<213> ORGANISM: Artificial Sequence
<220> FEATURE:
<223> OTHER INFORMATION: Modified polypeptide
<220> FEATURE:
<221> NAME/KEY: misc_feature
<222> LOCATION: (2)..(2)
<223> OTHER INFORMATION: Exogenous loop insertion; Xaa can be any
      naturally occurring amino acid

<400> SEQUENCE: 33

Ala Xaa Ala Glu
1

<210> SEQ ID NO 34
<211> LENGTH: 4
<212> TYPE: PRT
<213> ORGANISM: Artificial Sequence
<220> FEATURE:
<223> OTHER INFORMATION: Modified polypeptide
<220> FEATURE:
<221> NAME/KEY: misc_feature
<222> LOCATION: (3)..(3)
<223> OTHER INFORMATION: Exogenous loop insertion; Xaa can be any
      naturally occurring amino acid
```

```
<400> SEQUENCE: 34

Ala Ala Xaa Glu
1

<210> SEQ ID NO 35
<211> LENGTH: 6
<212> TYPE: PRT
<213> ORGANISM: Artificial Sequence
<220> FEATURE:
<223> OTHER INFORMATION: Modified polypeptide
<220> FEATURE:
<221> NAME/KEY: misc_feature
<222> LOCATION: (1)..(1)
<223> OTHER INFORMATION: Exogenous loop insertion; Xaa can be any
      naturally occurring amino acid

<400> SEQUENCE: 35

Xaa Ala Gln Gly Ala Glu
1               5

<210> SEQ ID NO 36
<211> LENGTH: 5
<212> TYPE: PRT
<213> ORGANISM: Artificial Sequence
<220> FEATURE:
<223> OTHER INFORMATION: Modified polypeptide
<220> FEATURE:
<221> NAME/KEY: misc_feature
<222> LOCATION: (1)..(1)
<223> OTHER INFORMATION: Exogenous loop insertion; Xaa can be any
      naturally occurring amino acid

<400> SEQUENCE: 36

Xaa Gln Gly Ala Glu
1               5

<210> SEQ ID NO 37
<211> LENGTH: 4
<212> TYPE: PRT
<213> ORGANISM: Artificial Sequence
<220> FEATURE:
<223> OTHER INFORMATION: Modified polypeptide
<220> FEATURE:
<221> NAME/KEY: misc_feature
<222> LOCATION: (1)..(1)
<223> OTHER INFORMATION: Exogenous loop insertion; Xaa can be any
      naturally occurring amino acid

<400> SEQUENCE: 37

Xaa Gly Ala Glu
1

<210> SEQ ID NO 38
<211> LENGTH: 6
<212> TYPE: PRT
<213> ORGANISM: Artificial Sequence
<220> FEATURE:
<223> OTHER INFORMATION: Modified polypeptide
<220> FEATURE:
<221> NAME/KEY: misc_feature
<222> LOCATION: (4)..(4)
<223> OTHER INFORMATION: Exogenous loop insertion; Xaa can be any
      naturally occurring amino acid

<400> SEQUENCE: 38

Ala Ala Gln Xaa Ala Glu
1               5

<210> SEQ ID NO 39
```

```
<211> LENGTH: 5
<212> TYPE: PRT
<213> ORGANISM: Artificial Sequence
<220> FEATURE:
<223> OTHER INFORMATION: Modified polypeptide
<220> FEATURE:
<221> NAME/KEY: misc_feature
<222> LOCATION: (4)..(4)
<223> OTHER INFORMATION: Exogenous loop insertion; Xaa can be any
      naturally occurring amino acid

<400> SEQUENCE: 39

Ala Ala Gln Xaa Glu
1               5

<210> SEQ ID NO 40
<211> LENGTH: 4
<212> TYPE: PRT
<213> ORGANISM: Artificial Sequence
<220> FEATURE:
<223> OTHER INFORMATION: Modified polypeptide
<220> FEATURE:
<221> NAME/KEY: misc_feature
<222> LOCATION: (4)..(4)
<223> OTHER INFORMATION: Exogenous loop insertion; Xaa can be any
      naturally occurring amino acid

<400> SEQUENCE: 40

Ala Ala Gln Xaa
1

<210> SEQ ID NO 41
<211> LENGTH: 6
<212> TYPE: PRT
<213> ORGANISM: Artificial Sequence
<220> FEATURE:
<223> OTHER INFORMATION: Modified polypeptide
<220> FEATURE:
<221> NAME/KEY: Xaa can be any naturally occurring amino acid
<222> LOCATION: (5)..(5)
<223> OTHER INFORMATION: Exogenous loop insertion; Xaa can be any
      naturally occurring amino acid

<400> SEQUENCE: 41

Ala Ala Gln Gly Xaa Glu
1               5

<210> SEQ ID NO 42
<211> LENGTH: 5
<212> TYPE: PRT
<213> ORGANISM: Artificial Sequence
<220> FEATURE:
<223> OTHER INFORMATION: Modified polypeptide
<220> FEATURE:
<221> NAME/KEY: misc_feature
<222> LOCATION: (5)..(5)
<223> OTHER INFORMATION: Exogenous loop insertion; Xaa can be any
      naturally occurring amino acid

<400> SEQUENCE: 42

Ala Ala Gln Gly Xaa
1               5

<210> SEQ ID NO 43
<211> LENGTH: 6
<212> TYPE: PRT
<213> ORGANISM: Artificial Sequence
<220> FEATURE:
<223> OTHER INFORMATION: Modified polypeptide
<220> FEATURE:
<221> NAME/KEY: misc_feature
```

<222> LOCATION: (6)..(6)
<223> OTHER INFORMATION: Exogenous loop insertion; Xaa can be any
      naturally occurring amino acid

<400> SEQUENCE: 43

Ala Ala Gln Gly Ala Xaa
1               5

<210> SEQ ID NO 44
<211> LENGTH: 255
<212> TYPE: PRT
<213> ORGANISM: Neisseria meningitidis

<400> SEQUENCE: 44

Cys Ser Ser Gly Gly Gly Val Ala Ala Asp Ile Gly Ala Gly Leu
1               5                   10                  15

Ala Asp Ala Leu Thr Ala Pro Leu Asp His Lys Asp Lys Gly Leu Gln
                20                  25                  30

Ser Leu Thr Leu Asp Gln Ser Val Arg Lys Asn Glu Lys Leu Lys Leu
            35                  40                  45

Ala Ala Gln Gly Ala Glu Lys Thr Tyr Gly Asn Gly Asp Ser Leu Asn
        50                  55                  60

Thr Gly Lys Leu Lys Asn Asp Lys Val Ser Arg Phe Asp Phe Ile Arg
65                  70                  75                  80

Gln Ile Glu Val Asp Gly Gln Leu Ile Thr Leu Glu Ser Gly Glu Phe
                85                  90                  95

Gln Val Tyr Lys Gln Ser His Ser Ala Leu Thr Ala Phe Gln Thr Glu
            100                 105                 110

Gln Ile Gln Asp Ser Glu His Ser Gly Lys Met Val Ala Lys Arg Gln
        115                 120                 125

Phe Arg Ile Gly Asp Ile Ala Gly Glu His Thr Ser Phe Asp Lys Leu
130                 135                 140

Pro Glu Gly Gly Arg Ala Thr Tyr Arg Gly Thr Ala Phe Gly Ser Asp
145                 150                 155                 160

Asp Ala Gly Gly Lys Leu Thr Tyr Thr Ile Asp Phe Ala Ala Lys Gln
                165                 170                 175

Gly Asn Gly Lys Ile Glu His Leu Lys Ser Pro Glu Leu Asn Val Asp
            180                 185                 190

Leu Ala Ala Ala Asp Ile Lys Pro Asp Gly Lys Arg His Ala Val Ile
        195                 200                 205

Ser Gly Ser Val Leu Tyr Asn Gln Ala Glu Lys Gly Ser Tyr Ser Leu
    210                 215                 220

Gly Ile Phe Gly Gly Lys Ala Gln Glu Val Ala Gly Ser Ala Glu Val
225                 230                 235                 240

Lys Thr Val Asn Gly Ile Arg His Ile Gly Leu Ala Ala Lys Gln
                245                 250                 255

<210> SEQ ID NO 45
<211> LENGTH: 13
<212> TYPE: PRT
<213> ORGANISM: Neisseria meningitidis

<400> SEQUENCE: 45

Tyr Val Ala Val Glu Asn Gly Val Ala Lys Lys Val Ala
1               5                   10

<210> SEQ ID NO 46
<211> LENGTH: 15

```
<212> TYPE: PRT
<213> ORGANISM: Neisseria meningitidis

<400> SEQUENCE: 46

His Phe Val Gln Gln Thr Pro Lys Ser Gln Pro Thr Leu Val Pro
1               5                   10                  15

<210> SEQ ID NO 47
<211> LENGTH: 15
<212> TYPE: PRT
<213> ORGANISM: Neisseria meningitidis

<400> SEQUENCE: 47

His Phe Val Gln Gln Thr Pro Gln Ser Gln Pro Thr Leu Val Pro
1               5                   10                  15

<210> SEQ ID NO 48
<211> LENGTH: 14
<212> TYPE: PRT
<213> ORGANISM: Neisseria meningitidis

<400> SEQUENCE: 48

Thr Leu Ala Asn Gly Ala Asn Asn Thr Ile Ile Arg Val Pro
1               5                   10

<210> SEQ ID NO 49
<211> LENGTH: 14
<212> TYPE: PRT
<213> ORGANISM: Neisseria meningitidis

<400> SEQUENCE: 49

Thr Leu Ala Lys Gly Ala Asn Asn Thr Ile Ile Arg Val Pro
1               5                   10

<210> SEQ ID NO 50
<211> LENGTH: 13
<212> TYPE: PRT
<213> ORGANISM: Neisseria meningitidis

<400> SEQUENCE: 50

His Val Val Val Asn Asn Lys Val Ala Thr His Val Pro
1               5                   10

<210> SEQ ID NO 51
<211> LENGTH: 10
<212> TYPE: PRT
<213> ORGANISM: Neisseria meningitidis

<400> SEQUENCE: 51

Tyr Val Asp Glu Gln Ser Lys Tyr His Ala
1               5                   10

<210> SEQ ID NO 52
<211> LENGTH: 15
<212> TYPE: PRT
<213> ORGANISM: Neisseria meningitidis

<400> SEQUENCE: 52

His Phe Val Gln Asn Lys Gln Asn Gln Arg Pro Thr Leu Val Pro
1               5                   10                  15

<210> SEQ ID NO 53
<211> LENGTH: 15
<212> TYPE: PRT
<213> ORGANISM: Neisseria meningitidis
```

<400> SEQUENCE: 53

His Phe Val Gln Asn Lys Gln Asn Gln Pro Pro Thr Leu Val Pro
1               5                   10                  15

<210> SEQ ID NO 54
<211> LENGTH: 15
<212> TYPE: PRT
<213> ORGANISM: Neisseria meningitidis

<400> SEQUENCE: 54

His Phe Val Gln Asp Lys Lys Gly Gln Pro Pro Thr Leu Val Pro
1               5                   10                  15

<210> SEQ ID NO 55
<211> LENGTH: 18
<212> TYPE: PRT
<213> ORGANISM: Neisseria meningitidis

<400> SEQUENCE: 55

His Phe Val Gln Asn Lys Gln Asn Gln Asn Gln Pro Pro Thr Leu
1               5                   10                  15

Val Pro

<210> SEQ ID NO 56
<211> LENGTH: 18
<212> TYPE: PRT
<213> ORGANISM: Neisseria meningitidis

<400> SEQUENCE: 56

His Phe Val Gln Asn Lys Gln Asn Lys Gln Asn Gln Pro Pro Thr Leu
1               5                   10                  15

Val Pro

<210> SEQ ID NO 57
<211> LENGTH: 15
<212> TYPE: PRT
<213> ORGANISM: Neisseria meningitidis

<400> SEQUENCE: 57

His Phe Val Gln Asn Lys Gln Asn Lys Pro Pro Thr Leu Val Pro
1               5                   10                  15

<210> SEQ ID NO 58
<211> LENGTH: 18
<212> TYPE: PRT
<213> ORGANISM: Neisseria meningitidis

<400> SEQUENCE: 58

Tyr Trp Thr Thr Val Asn Thr Gly Ser Ala Thr Thr Thr Thr Phe
1               5                   10                  15

Val Pro

<210> SEQ ID NO 59
<211> LENGTH: 17
<212> TYPE: PRT
<213> ORGANISM: Neisseria meningitidis

<400> SEQUENCE: 59

Tyr Trp Thr Thr Val Asn Thr Gly Ser Ala Thr Thr Thr Thr Phe Val
1               5                   10                  15

Pro

<210> SEQ ID NO 60
<211> LENGTH: 16
<212> TYPE: PRT
<213> ORGANISM: Neisseria meningitidis

<400> SEQUENCE: 60

Tyr Trp Thr Thr Val Asn Thr Gly Ser Ala Thr Thr Thr Phe Val Pro
1               5                   10                  15

<210> SEQ ID NO 61
<211> LENGTH: 17
<212> TYPE: PRT
<213> ORGANISM: Neisseria meningitidis

<400> SEQUENCE: 61

Tyr Tyr Thr Thr Val Thr Gln Gly Ser Ala Thr Thr Thr Thr Phe Val
1               5                   10                  15

Pro

<210> SEQ ID NO 62
<211> LENGTH: 10
<212> TYPE: PRT
<213> ORGANISM: Neisseria meningitidis

<400> SEQUENCE: 62

Tyr Val Asp Glu Lys Lys Met Val His Ala
1               5                   10

<210> SEQ ID NO 63
<211> LENGTH: 10
<212> TYPE: PRT
<213> ORGANISM: Neisseria meningitidis

<400> SEQUENCE: 63

Tyr Val Asp Glu Lys Gln Val Ser His Ala
1               5                   10

<210> SEQ ID NO 64
<211> LENGTH: 10
<212> TYPE: PRT
<213> ORGANISM: Neisseria meningitidis

<400> SEQUENCE: 64

Tyr Val Asp Glu Lys Lys Val Val His Ala
1               5                   10

<210> SEQ ID NO 65
<211> LENGTH: 13
<212> TYPE: PRT
<213> ORGANISM: Neisseria meningitidis

<400> SEQUENCE: 65

His Tyr Thr Arg Gln Asn Asn Ala Asp Val Phe Val Pro
1               5                   10

<210> SEQ ID NO 66
<211> LENGTH: 13
<212> TYPE: PRT
<213> ORGANISM: Neisseria meningitidis

<400> SEQUENCE: 66

His Tyr Thr Arg Gln Asn Asn Thr Asp Val Phe Val Pro
1               5                   10

```
<210> SEQ ID NO 67
<211> LENGTH: 13
<212> TYPE: PRT
<213> ORGANISM: Neisseria meningitidis

<400> SEQUENCE: 67

His Tyr Thr Arg Gln Asn Asn Ile Asp Val Phe Val Pro
1               5                   10

<210> SEQ ID NO 68
<211> LENGTH: 14
<212> TYPE: PRT
<213> ORGANISM: Neisseria meningitidis

<400> SEQUENCE: 68

Tyr Tyr Thr Lys Asp Thr Asn Asn Asn Leu Thr Leu Val Pro
1               5                   10

<210> SEQ ID NO 69
<211> LENGTH: 14
<212> TYPE: PRT
<213> ORGANISM: Neisseria meningitidis

<400> SEQUENCE: 69

Tyr Tyr Thr Lys Asp Lys Asn Asp Asn Leu Thr Leu Val Pro
1               5                   10

<210> SEQ ID NO 70
<211> LENGTH: 14
<212> TYPE: PRT
<213> ORGANISM: Neisseria meningitidis

<400> SEQUENCE: 70

Tyr Tyr Thr Lys Asp Lys Asn Asp Lys Leu Thr Leu Val Pro
1               5                   10

<210> SEQ ID NO 71
<211> LENGTH: 13
<212> TYPE: PRT
<213> ORGANISM: Neisseria meningitidis

<400> SEQUENCE: 71

Tyr Tyr Thr Asn Thr Asn Asn Asn Leu Thr Leu Val Pro
1               5                   10

<210> SEQ ID NO 72
<211> LENGTH: 17
<212> TYPE: PRT
<213> ORGANISM: Neisseria meningitidis

<400> SEQUENCE: 72

His Trp Asn Thr Val Tyr Asn Thr Asn Gly Thr Thr Thr Thr Phe Val
1               5                   10                  15

Pro

<210> SEQ ID NO 73
<211> LENGTH: 18
<212> TYPE: PRT
<213> ORGANISM: Neisseria meningitidis

<400> SEQUENCE: 73

His Trp Asn Thr Val Tyr Asn Thr Asn Gly Thr Thr Thr Thr Thr Phe
1               5                   10                  15
```

Val Pro

<210> SEQ ID NO 74
<211> LENGTH: 14
<212> TYPE: PRT
<213> ORGANISM: Neisseria meningitidis

<400> SEQUENCE: 74

Thr Tyr Thr Val Asp Ser Ser Gly Val Val Thr Pro Val Pro
1               5                   10

<210> SEQ ID NO 75
<211> LENGTH: 14
<212> TYPE: PRT
<213> ORGANISM: Neisseria meningitidis

<400> SEQUENCE: 75

His Phe Val Ala Asp Ser Gln Gly Lys Ile Thr Arg Val Pro
1               5                   10

<210> SEQ ID NO 76
<211> LENGTH: 17
<212> TYPE: PRT
<213> ORGANISM: Neisseria meningitidis

<400> SEQUENCE: 76

Tyr Tyr Tyr Thr Thr Ala Thr Asn Ser Ser Thr Ser Thr Thr Phe Val
1               5                   10                  15
Pro

<210> SEQ ID NO 77
<211> LENGTH: 17
<212> TYPE: PRT
<213> ORGANISM: Neisseria meningitidis

<400> SEQUENCE: 77

His Tyr Thr Thr Val Tyr Asn Ala Thr Thr Thr Thr Thr Thr Phe Val
1               5                   10                  15
Pro

<210> SEQ ID NO 78
<211> LENGTH: 18
<212> TYPE: PRT
<213> ORGANISM: Neisseria meningitidis

<400> SEQUENCE: 78

His Tyr Thr Thr Val Tyr Asn Ala Thr Thr Thr Thr Thr Thr Thr Phe
1               5                   10                  15
Val Pro

<210> SEQ ID NO 79
<211> LENGTH: 11
<212> TYPE: PRT
<213> ORGANISM: Neisseria meningitidis

<400> SEQUENCE: 79

Tyr Val Asp Asp Gln Gly Lys Val Lys Gly Pro
1               5                   10

<210> SEQ ID NO 80
<211> LENGTH: 255
<212> TYPE: PRT

<213> ORGANISM: Neisseria meningitidis

<400> SEQUENCE: 80

Cys Ser Ser Gly Gly Gly Val Ala Ala Asp Ile Gly Ala Gly Leu
1               5                   10                  15

Ala Asp Ala Leu Thr Ala Pro Leu Asp His Lys Asp Lys Gly Leu Gln
            20                  25                  30

Ser Leu Thr Leu Asp Gln Ser Val Arg Lys Asn Glu Lys Leu Lys Leu
            35                  40                      45

Ala Ala Gln Gly Ala Glu Lys Thr Tyr Gly Asn Gly Asp Ser Leu Asn
    50                  55                  60

Thr Gly Lys Leu Lys Asn Asp Lys Val Ser Arg Phe Asp Phe Ile Arg
65                  70                  75                  80

Gln Ile Glu Val Asp Gly Gln Leu Ile Thr Leu Glu Ser Gly Glu Phe
                85                  90                  95

Gln Val Tyr Lys Gln Ser His Ser Ala Leu Thr Ala Phe Gln Thr Glu
            100                 105                 110

Gln Ile Gln Asp Ser Glu His Ser Gly Lys Met Val Ala Lys Arg Gln
            115                 120                 125

Phe Arg Ile Gly Asp Ile Ala Gly Glu His Thr Ser Phe Asp Lys Leu
    130                 135                 140

Pro Glu Gly Gly Arg Ala Thr Tyr Arg Gly Thr Ala Phe Gly Ser Asp
145                 150                 155                 160

Asp Ala Gly Gly Lys Leu Thr Tyr Thr Ile Asp Phe Ala Ala Lys Gln
                165                 170                 175

Gly Asn Gly Lys Ile Glu His Leu Lys Ser Pro Glu Leu Asn Val Asp
            180                 185                 190

Leu Ala Ala Ala Asp Ile Lys Pro Asp Gly Lys Arg His Ala Val Ile
        195                 200                 205

Ser Gly Ser Val Leu Tyr Asn Gln Ala Glu Lys Gly Ser Tyr Ser Leu
    210                 215                 220

Gly Ile Phe Gly Gly Lys Ala Gln Glu Val Ala Gly Ser Ala Glu Val
225                 230                 235                 240

Lys Thr Val Asn Gly Ile Arg His Ile Gly Leu Ala Ala Lys Gln
                245                 250                 255

<210> SEQ ID NO 81
<211> LENGTH: 255
<212> TYPE: PRT
<213> ORGANISM: Neisseria meningitidis

<400> SEQUENCE: 81

Cys Ser Ser Gly Gly Gly Val Ala Ala Asp Ile Gly Ala Gly Leu
1               5                   10                  15

Ala Asp Ala Leu Thr Ala Pro Leu Asp His Lys Asp Lys Ser Leu Gln
            20                  25                  30

Ser Leu Thr Leu Asp Gln Ser Val Arg Lys Asn Glu Lys Leu Lys Leu
            35                  40                      45

Ala Ala Gln Gly Ala Glu Lys Thr Tyr Gly Asn Gly Asp Ser Leu Asn
    50                  55                  60

Thr Gly Lys Leu Lys Asn Asp Lys Val Ser Arg Phe Asp Phe Ile Arg
65                  70                  75                  80

Gln Ile Glu Val Asp Gly Gln Leu Ile Thr Leu Glu Ser Gly Glu Phe
                85                  90                  95

Gln Val Tyr Lys Gln Ser His Ser Ala Leu Thr Ala Leu Gln Thr Glu

```
                100             105             110
Gln Val Gln Asp Ser Glu His Ser Gly Lys Met Val Ala Lys Arg Gln
            115                 120                 125
Phe Arg Ile Gly Asp Ile Ala Gly Glu His Thr Ser Phe Asp Lys Leu
            130                 135                 140
Pro Glu Gly Gly Arg Ala Thr Tyr Arg Gly Thr Ala Phe Gly Ser Asp
145                 150                 155                 160
Asp Ala Ser Gly Lys Leu Thr Tyr Thr Ile Asp Phe Ala Ala Lys Gln
                165                 170                 175
Gly His Gly Lys Ile Glu His Leu Lys Ser Pro Glu Leu Asn Val Asp
            180                 185                 190
Leu Ala Ala Ser Asp Ile Lys Pro Asp Lys Lys Arg His Ala Val Ile
            195                 200                 205
Ser Gly Ser Val Leu Tyr Asn Gln Ala Glu Lys Gly Tyr Ser Leu
            210                 215                 220
Gly Ile Phe Gly Gly Gln Ala Gln Glu Val Ala Gly Ser Ala Glu Val
225                 230                 235                 240
Glu Thr Ala Asn Gly Ile Arg His Ile Gly Leu Ala Ala Lys Gln
                245                 250                 255

<210> SEQ ID NO 82
<211> LENGTH: 255
<212> TYPE: PRT
<213> ORGANISM: Neisseria meningitidis

<400> SEQUENCE: 82

Cys Ser Ser Gly Gly Gly Val Ala Ala Asp Ile Gly Ala Gly Leu
1               5                   10                  15
Ala Asp Ala Leu Thr Ala Pro Leu Asp His Lys Asp Lys Gly Leu Gln
            20                  25                  30
Ser Leu Thr Leu Asp Gln Ser Val Arg Lys Asn Glu Lys Leu Lys Leu
            35                  40                  45
Ala Ala Gln Gly Ala Glu Lys Thr Tyr Gly Asn Gly Asp Ser Leu Asn
        50                  55                  60
Thr Gly Lys Leu Lys Asn Asp Lys Val Ser Arg Phe Asp Phe Ile Arg
65                  70                  75                  80
Gln Ile Glu Val Asp Gly Lys Leu Ile Thr Leu Glu Ser Gly Glu Phe
                85                  90                  95
Gln Val Tyr Lys Gln Ser His Ser Ala Leu Thr Ala Leu Gln Thr Glu
            100                 105                 110
Gln Val Gln Asp Ser Glu Asp Ser Gly Lys Met Val Ala Lys Arg Gln
            115                 120                 125
Phe Arg Ile Gly Asp Ile Ala Gly Glu His Thr Ser Phe Asp Lys Leu
            130                 135                 140
Pro Lys Gly Gly Ser Ala Thr Tyr Arg Gly Thr Ala Phe Gly Ser Asp
145                 150                 155                 160
Asp Ala Gly Gly Lys Leu Thr Tyr Thr Ile Asp Phe Ala Ala Lys Gln
                165                 170                 175
Gly His Gly Lys Ile Glu His Leu Lys Ser Pro Glu Leu Asn Val Glu
            180                 185                 190
Leu Ala Thr Ala Tyr Ile Lys Pro Asp Glu Lys Arg His Ala Val Ile
            195                 200                 205
Ser Gly Ser Val Leu Tyr Asn Gln Asp Glu Lys Gly Ser Tyr Ser Leu
            210                 215                 220
```

Gly Ile Phe Gly Gly Gln Ala Gln Glu Val Ala Gly Ser Ala Glu Val
225                 230                 235                 240

Glu Thr Ala Asn Gly Ile His His Ile Gly Leu Ala Ala Lys Gln
                245                 250                 255

<210> SEQ ID NO 83
<211> LENGTH: 255
<212> TYPE: PRT
<213> ORGANISM: Neisseria meningitidis

<400> SEQUENCE: 83

Cys Ser Ser Gly Gly Gly Gly Val Ala Ala Asp Ile Gly Ala Gly Leu
1               5                   10                  15

Ala Asp Ala Leu Thr Ala Pro Leu Asp His Lys Asp Lys Ser Leu Gln
                20                  25                  30

Ser Leu Thr Leu Asp Gln Ser Val Arg Lys Asn Glu Lys Leu Lys Leu
            35                  40                  45

Ala Ala Gln Gly Ala Glu Lys Thr Tyr Gly Asn Gly Asp Ser Leu Asn
        50                  55                  60

Thr Gly Lys Leu Lys Asn Asp Lys Val Ser Arg Phe Asp Phe Ile Arg
65                  70                  75                  80

Gln Ile Glu Val Asp Gly Gln Leu Ile Thr Leu Glu Ser Gly Glu Phe
                85                  90                  95

Gln Val Tyr Lys Gln Ser His Ser Ala Leu Thr Ala Leu Gln Thr Glu
                100                 105                 110

Gln Glu Gln Asp Pro Glu His Ser Gly Lys Met Val Ala Lys Arg Arg
            115                 120                 125

Phe Lys Ile Gly Asp Ile Ala Gly Glu His Thr Ser Phe Asp Lys Leu
130                 135                 140

Pro Lys Asp Val Met Ala Thr Tyr Arg Gly Thr Ala Phe Gly Ser Asp
145                 150                 155                 160

Asp Ala Gly Gly Lys Leu Thr Tyr Thr Ile Asp Phe Ala Ala Lys Gln
                165                 170                 175

Gly His Gly Lys Ile Glu His Leu Lys Ser Pro Glu Leu Asn Val Glu
            180                 185                 190

Leu Ala Thr Ala Tyr Ile Lys Pro Asp Glu Lys His His Ala Val Ile
        195                 200                 205

Ser Gly Ser Val Leu Tyr Asn Gln Asp Glu Lys Gly Ser Tyr Ser Leu
    210                 215                 220

Gly Ile Phe Gly Gly Gln Ala Gln Glu Val Ala Gly Ser Ala Glu Val
225                 230                 235                 240

Glu Thr Ala Asn Gly Ile His His Ile Gly Leu Ala Ala Lys Gln
                245                 250                 255

<210> SEQ ID NO 84
<211> LENGTH: 263
<212> TYPE: PRT
<213> ORGANISM: Neisseria meningitidis

<400> SEQUENCE: 84

Cys Ser Ser Gly Gly Gly Gly Ser Gly Gly Gly Gly Val Ala Ala Asp
1               5                   10                  15

Ile Gly Ala Gly Leu Ala Asp Ala Leu Thr Ala Pro Leu Asp His Lys
                20                  25                  30

Asp Lys Gly Leu Lys Ser Leu Thr Leu Glu Asp Ser Ile Ser Gln Asn
            35                  40                  45

Gly Thr Leu Thr Leu Ser Ala Gln Gly Ala Glu Arg Thr Phe Lys Ala
        50                  55                  60

Gly Asp Lys Asp Asn Ser Leu Asn Thr Gly Lys Leu Lys Asn Asp Lys
65                  70                  75                  80

Ile Ser Arg Phe Asp Phe Ile Arg Gln Ile Glu Val Asp Gly Gln Leu
                    85                  90                  95

Ile Thr Leu Glu Ser Gly Glu Phe Gln Val Tyr Lys Gln Ser His Ser
                100                 105                 110

Ala Leu Thr Ala Leu Gln Thr Glu Gln Val Gln Asp Ser Glu His Ser
            115                 120                 125

Gly Lys Met Val Ala Lys Arg Gln Phe Arg Ile Gly Asp Ile Val Gly
        130                 135                 140

Glu His Thr Ser Phe Gly Lys Leu Pro Lys Asp Val Met Ala Thr Tyr
145                 150                 155                 160

Arg Gly Thr Ala Phe Gly Ser Asp Asp Ala Gly Gly Lys Leu Thr Tyr
                165                 170                 175

Thr Ile Asp Phe Ala Ala Lys Gln Gly His Gly Lys Ile Glu His Leu
                180                 185                 190

Lys Ser Pro Glu Leu Asn Val Asp Leu Ala Ala Ala Asp Ile Lys Pro
            195                 200                 205

Asp Glu Lys His His Ala Val Ile Ser Gly Ser Val Leu Tyr Asn Gln
        210                 215                 220

Ala Glu Lys Gly Ser Tyr Ser Leu Gly Ile Phe Gly Gly Gln Ala Gln
225                 230                 235                 240

Glu Val Ala Gly Ser Ala Glu Val Glu Thr Ala Asn Gly Ile Arg His
                245                 250                 255

Ile Gly Leu Ala Ala Lys Gln
            260

<210> SEQ ID NO 85
<211> LENGTH: 260
<212> TYPE: PRT
<213> ORGANISM: Neisseria meningitidis

<400> SEQUENCE: 85

Cys Ser Ser Gly Gly Gly Ser Gly Gly Gly Val Thr Ala Asp
1               5                   10                  15

Ile Gly Thr Gly Leu Ala Asp Ala Leu Thr Ala Pro Leu Asp His Lys
                20                  25                  30

Asp Lys Gly Leu Lys Ser Leu Thr Leu Glu Asp Ser Ile Ser Gln Asn
            35                  40                  45

Gly Thr Leu Thr Leu Ser Ala Gln Gly Ala Glu Lys Thr Tyr Gly Asn
        50                  55                  60

Gly Asp Ser Leu Asn Thr Gly Lys Leu Lys Asn Asp Lys Val Ser Arg
65                  70                  75                  80

Phe Asp Phe Ile Arg Gln Ile Glu Val Asp Gly Gln Leu Ile Thr Leu
                85                  90                  95

Glu Ser Gly Glu Phe Gln Val Tyr Lys Gln Ser His Ser Ala Leu Thr
                100                 105                 110

Ala Leu Gln Thr Glu Gln Glu Gln Asp Pro Glu His Ser Glu Lys Met
            115                 120                 125

Val Ala Lys Arg Arg Phe Arg Ile Gly Asp Ile Ala Gly Glu His Thr
        130                 135                 140

Ser Phe Asp Lys Leu Pro Lys Asp Val Met Ala Thr Tyr Arg Gly Thr
145                 150                 155                 160

Ala Phe Gly Ser Asp Asp Ala Gly Gly Lys Leu Thr Tyr Thr Ile Asp
                165                 170                 175

Phe Ala Ala Lys Gln Gly His Gly Lys Ile Glu His Leu Lys Ser Pro
            180                 185                 190

Glu Leu Asn Val Asp Leu Ala Val Ala Tyr Ile Lys Pro Asp Glu Lys
            195                 200                 205

His His Ala Val Ile Ser Gly Ser Val Leu Tyr Asn Gln Asp Glu Lys
        210                 215                 220

Gly Ser Tyr Ser Leu Gly Ile Phe Gly Glu Lys Ala Gln Glu Val Ala
225                 230                 235                 240

Gly Ser Ala Glu Val Glu Thr Ala Asn Gly Ile His His Ile Gly Leu
                245                 250                 255

Ala Ala Lys Gln
            260

<210> SEQ ID NO 86
<211> LENGTH: 254
<212> TYPE: PRT
<213> ORGANISM: Neisseria meningitidis

<400> SEQUENCE: 86

Cys Ser Ser Gly Gly Gly Val Ala Ala Asp Ile Gly Ala Gly Leu
1               5                   10                  15

Ala Asp Ala Leu Thr Ala Pro Leu Asp His Lys Asp Lys Ser Leu Gln
            20                  25                  30

Ser Leu Thr Leu Asp Gln Ser Val Arg Lys Asn Glu Lys Leu Lys Leu
        35                  40                  45

Ala Ala Gln Gly Ala Glu Lys Thr Tyr Gly Asn Gly Asp Ser Leu Asn
    50                  55                  60

Thr Gly Lys Leu Lys Asn Asp Lys Val Ser Arg Phe Asp Phe Ile Arg
65                  70                  75                  80

Gln Ile Glu Val Asp Gly Gln Leu Ile Thr Leu Glu Ser Gly Glu Phe
                85                  90                  95

Gln Ile Tyr Lys Gln Asp His Ser Ala Val Val Ala Leu Gln Ile Glu
            100                 105                 110

Lys Ile Asn Asn Pro Asp Lys Ile Asp Ser Leu Ile Asn Gln Arg Ser
        115                 120                 125

Phe Leu Val Ser Gly Leu Gly Gly Glu His Thr Ala Phe Asn Gln Leu
130                 135                 140

Pro Asp Gly Lys Ala Glu Tyr His Gly Lys Ala Phe Ser Ser Asp Asp
145                 150                 155                 160

Ala Gly Gly Lys Leu Thr Tyr Thr Ile Asp Phe Ala Ala Lys Gln Gly
                165                 170                 175

His Gly Lys Ile Glu His Leu Lys Thr Pro Glu Gln Asn Val Glu Leu
            180                 185                 190

Ala Ala Ala Glu Leu Lys Ala Asp Glu Lys Ser His Ala Val Ile Leu
        195                 200                 205

Gly Asp Thr Arg Tyr Gly Ser Glu Glu Lys Gly Thr Tyr His Leu Ala
    210                 215                 220

Leu Phe Gly Asp Arg Ala Gln Glu Ile Ala Gly Ser Ala Thr Val Lys
225                 230                 235                 240

Ile Gly Glu Lys Val His Glu Ile Gly Ile Ala Gly Lys Gln
                245                 250

```
<210> SEQ ID NO 87
<211> LENGTH: 254
<212> TYPE: PRT
<213> ORGANISM: Neisseria meningitidis

<400> SEQUENCE: 87

Cys Ser Ser Gly Gly Gly Gly Val Ala Ala Asp Ile Gly Ala Gly Leu
1               5                   10                  15

Ala Asp Ala Leu Thr Ala Pro Leu Asp His Lys Asp Lys Ser Leu Gln
            20                  25                  30

Ser Leu Thr Leu Asp Gln Ser Val Arg Lys Asn Glu Lys Leu Lys Leu
        35                  40                  45

Ala Ala Gln Gly Ala Glu Lys Thr Tyr Gly Asn Gly Asp Ser Leu Asn
    50                  55                  60

Thr Gly Lys Leu Lys Asn Asp Lys Val Ser Arg Phe Asp Phe Ile Arg
65                  70                  75                  80

Gln Ile Glu Val Asp Gly Gln Leu Ile Thr Leu Glu Ser Gly Glu Phe
                85                  90                  95

Gln Ile Tyr Lys Gln Asp His Ser Ala Val Val Ala Leu Gln Ile Glu
            100                 105                 110

Lys Ile Asn Asn Pro Asp Lys Ile Asp Ser Leu Ile Asn Gln Arg Ser
        115                 120                 125

Phe Leu Val Ser Gly Leu Gly Gly Glu His Thr Ala Phe Asn Gln Leu
    130                 135                 140

Pro Ser Gly Lys Ala Glu Tyr His Gly Lys Ala Phe Ser Ser Asp Asp
145                 150                 155                 160

Ala Gly Gly Lys Leu Thr Tyr Thr Ile Asp Phe Ala Ala Lys Gln Gly
                165                 170                 175

His Gly Lys Ile Glu His Leu Lys Thr Pro Glu Gln Asn Val Glu Leu
            180                 185                 190

Ala Ser Ala Glu Leu Lys Ala Asp Glu Lys Ser His Ala Val Ile Leu
        195                 200                 205

Gly Asp Thr Arg Tyr Gly Gly Glu Lys Gly Thr Tyr His Leu Ala
    210                 215                 220

Leu Phe Gly Asp Arg Ala Gln Glu Ile Ala Gly Ser Ala Thr Val Lys
225                 230                 235                 240

Ile Arg Glu Lys Val His Glu Ile Gly Ile Ala Gly Lys Gln
                245                 250

<210> SEQ ID NO 88
<211> LENGTH: 254
<212> TYPE: PRT
<213> ORGANISM: Neisseria meningitidis

<400> SEQUENCE: 88

Cys Ser Ser Gly Gly Gly Gly Val Ala Ala Asp Ile Gly Ala Gly Leu
1               5                   10                  15

Ala Asp Ala Leu Thr Ala Pro Leu Asp His Lys Asp Lys Ser Leu Gln
            20                  25                  30

Ser Leu Thr Leu Asp Gln Ser Val Arg Lys Asn Glu Lys Leu Lys Leu
        35                  40                  45

Ala Ala Gln Gly Ala Glu Lys Thr Tyr Gly Asn Gly Asp Ser Leu Asn
    50                  55                  60

Thr Gly Lys Leu Lys Asn Asp Lys Val Ser Arg Phe Asp Phe Ile Arg
65                  70                  75                  80

Gln Ile Glu Val Asp Gly Gln Leu Ile Thr Leu Glu Ser Gly Glu Phe
```

```
                     85                  90                  95
Gln Ile Tyr Lys Gln Asp His Ser Ala Val Val Ala Leu Gln Ile Glu
            100                 105                 110
Lys Ile Asn Asn Pro Asp Lys Ile Asp Ser Leu Ile Asn Gln Arg Ser
        115                 120                 125
Phe Leu Val Ser Gly Leu Gly Gly Glu His Thr Ala Phe Asn Gln Leu
    130                 135                 140
Pro Ser Gly Lys Ala Glu Tyr His Gly Lys Ala Phe Ser Ser Asp Asp
145                 150                 155                 160
Pro Asn Gly Arg Leu His Tyr Ser Ile Asp Phe Thr Lys Lys Gln Gly
                165                 170                 175
Tyr Gly Arg Ile Glu His Leu Lys Thr Pro Glu Gln Asn Val Glu Leu
            180                 185                 190
Ala Ser Ala Glu Leu Lys Ala Asp Glu Lys Ser His Ala Val Ile Leu
        195                 200                 205
Gly Asp Thr Arg Tyr Gly Gly Glu Lys Gly Thr Tyr His Leu Ala
    210                 215                 220
Leu Phe Gly Asp Arg Ala Gln Glu Ile Ala Gly Ser Ala Thr Val Lys
225                 230                 235                 240
Ile Arg Glu Lys Val His Glu Ile Gly Ile Ala Gly Lys Gln
                245                 250

<210> SEQ ID NO 89
<211> LENGTH: 254
<212> TYPE: PRT
<213> ORGANISM: Neisseria meningitidis

<400> SEQUENCE: 89

Cys Ser Ser Gly Gly Gly Gly Val Ala Ala Asp Ile Gly Ala Gly Leu
1               5                  10                  15
Ala Asp Ala Leu Thr Thr Pro Leu Asp His Lys Asp Lys Ser Leu Gln
            20                  25                  30
Ser Leu Thr Leu Asp Gln Ser Val Arg Lys Asn Glu Lys Leu Lys Leu
        35                  40                  45
Ala Ala Gln Gly Ala Glu Lys Thr Tyr Gly Asn Gly Asp Ser Leu Asn
    50                  55                  60
Thr Gly Lys Leu Lys Asn Asp Lys Val Ser Arg Phe Asp Phe Ile Arg
65                  70                  75                  80
Gln Ile Glu Val Asp Gly Gln Thr Ile Thr Leu Ala Ser Gly Glu Phe
                85                  90                  95
Gln Ile Tyr Lys Gln Asn His Ser Ala Val Val Ala Leu Gln Ile Glu
            100                 105                 110
Lys Ile Asn Asn Pro Asp Lys Ile Asp Ser Leu Ile Asn Gln Arg Ser
        115                 120                 125
Phe Leu Val Ser Gly Leu Gly Gly Glu His Thr Ala Phe Asn Gln Leu
    130                 135                 140
Pro Asp Gly Lys Ala Glu Tyr His Gly Lys Ala Phe Ser Ser Asp Asp
145                 150                 155                 160
Pro Asn Gly Arg Leu His Tyr Ser Ile Asp Phe Thr Lys Lys Gln Gly
                165                 170                 175
Tyr Gly Arg Ile Glu His Leu Lys Thr Pro Glu Gln Asn Val Glu Leu
            180                 185                 190
Ala Ser Ala Glu Leu Lys Ala Asp Glu Lys Ser His Ala Val Ile Leu
        195                 200                 205
```

```
Gly Asp Thr Arg Tyr Gly Gly Glu Glu Lys Gly Thr Tyr His Leu Ala
            210                 215                 220

Leu Phe Gly Asp Arg Ala Gln Glu Ile Ala Gly Ser Ala Thr Val Lys
225                 230                 235                 240

Ile Arg Glu Lys Val His Glu Ile Gly Ile Ala Gly Lys Gln
                245                 250

<210> SEQ ID NO 90
<211> LENGTH: 261
<212> TYPE: PRT
<213> ORGANISM: Neisseria meningitidis

<400> SEQUENCE: 90

Cys Ser Ser Gly Ser Ser Gly Gly Gly Val Ala Ala Asp Ile
1               5                   10                  15

Gly Thr Gly Leu Ala Asp Ala Leu Thr Ala Pro Leu Asp His Lys Asp
                20                  25                  30

Lys Gly Leu Lys Ser Leu Thr Leu Glu Asp Ser Ile Ser Gln Asn Gly
                35                  40                  45

Thr Leu Thr Leu Ser Ala Gln Gly Ala Glu Lys Thr Phe Lys Val Gly
50                  55                  60

Asp Lys Asp Asn Ser Leu Asn Thr Gly Lys Leu Lys Asn Asp Lys Ile
65                  70                  75                  80

Ser Arg Phe Asp Phe Val Gln Lys Ile Glu Val Asp Gly Gln Thr Ile
                85                  90                  95

Thr Leu Ala Ser Gly Glu Phe Gln Ile Tyr Lys Gln Asp His Ser Ala
                100                 105                 110

Val Val Ala Leu Gln Ile Glu Lys Ile Asn Asn Pro Asp Lys Ile Asp
            115                 120                 125

Ser Leu Ile Asn Gln Arg Ser Phe Leu Val Ser Gly Leu Gly Gly Glu
            130                 135                 140

His Thr Ala Phe Asn Gln Leu Pro Ser Gly Lys Ala Glu Tyr His Gly
145                 150                 155                 160

Lys Ala Phe Ser Ser Asp Asp Ala Gly Gly Lys Leu Thr Tyr Thr Ile
                165                 170                 175

Asp Phe Ala Ala Lys Gln Gly His Gly Lys Ile Glu His Leu Lys Thr
                180                 185                 190

Pro Glu Gln Asn Val Glu Leu Ala Ser Ala Glu Leu Lys Ala Asp Glu
            195                 200                 205

Lys Ser His Ala Val Ile Leu Gly Asp Thr Arg Tyr Gly Ser Glu Glu
210                 215                 220

Lys Gly Thr Tyr His Leu Ala Leu Phe Gly Asp Arg Ala Gln Glu Ile
225                 230                 235                 240

Ala Gly Ser Ala Thr Val Lys Ile Arg Glu Lys Val His Glu Ile Gly
                245                 250                 255

Ile Ala Gly Lys Gln
            260

<210> SEQ ID NO 91
<211> LENGTH: 257
<212> TYPE: PRT
<213> ORGANISM: Neisseria meningitidis

<400> SEQUENCE: 91

Cys Ser Ser Gly Gly Gly Gly Val Ala Ala Asp Ile Gly Ala Gly Leu
1               5                   10                  15
```

Ala Asp Ala Leu Thr Ala Pro Leu Asp His Lys Asp Lys Gly Leu Lys
            20                  25                  30

Ser Leu Thr Leu Glu Asp Ser Ile Ser Gln Asn Gly Thr Leu Thr Leu
        35                  40                  45

Ser Ala Gln Gly Ala Glu Lys Thr Phe Lys Val Gly Asp Lys Asp Asn
 50                  55                  60

Ser Leu Asn Thr Gly Lys Leu Lys Asn Asp Lys Ile Ser Arg Phe Asp
 65                  70                  75                  80

Phe Val Gln Lys Ile Glu Val Asp Gly Gln Thr Ile Thr Leu Ala Ser
                 85                  90                  95

Gly Glu Phe Gln Ile Tyr Lys Gln Asn His Ser Ala Val Val Ala Leu
                100                 105                 110

Gln Ile Glu Lys Ile Asn Asn Pro Asp Lys Ile Asp Ser Leu Ile Asn
            115                 120                 125

Gln Arg Ser Phe Leu Val Ser Gly Leu Gly Gly Glu His Thr Ala Phe
        130                 135                 140

Asn Gln Leu Pro Gly Gly Lys Ala Glu Tyr His Gly Lys Ala Phe Ser
145                 150                 155                 160

Ser Asp Asp Ala Gly Gly Lys Leu Thr Tyr Thr Ile Asp Phe Ala Ala
                165                 170                 175

Lys Gln Gly His Gly Lys Ile Glu His Leu Lys Thr Pro Glu Gln Asn
                180                 185                 190

Val Glu Leu Ala Ala Ala Glu Leu Lys Ala Asp Glu Lys Ser His Ala
            195                 200                 205

Val Ile Leu Gly Asp Thr Arg Tyr Gly Ser Glu Glu Lys Gly Thr Tyr
210                 215                 220

His Leu Ala Leu Phe Gly Asp Arg Ala Gln Glu Ile Ala Gly Ser Ala
225                 230                 235                 240

Thr Val Lys Ile Gly Glu Lys Val His Glu Ile Ser Ile Ala Gly Lys
                245                 250                 255

Gln

<210> SEQ ID NO 92
<211> LENGTH: 268
<212> TYPE: PRT
<213> ORGANISM: Artificial Sequence
<220> FEATURE:
<223> OTHER INFORMATION: Modified polypeptide

<400> SEQUENCE: 92

Cys Ser Ser Gly Gly Gly Gly Val Ala Ala Asp Ile Gly Ala Gly Leu
 1               5                  10                  15

Ala Asp Ala Leu Thr Ala Pro Leu Asp His Lys Asp Lys Gly Leu Gln
            20                  25                  30

Ser Leu Thr Leu Asp Gln Ser Val Arg Lys Asn Glu Lys Leu Lys Leu
        35                  40                  45

Ala Ala Gln Gly Ala Glu Lys Thr Tyr Gly Asn Gly Asp Ser Leu Asn
 50                  55                  60

Thr Gly Lys Leu Lys Asn Asp Lys Val Ser Arg Phe Asp Phe Ile Arg
 65                  70                  75                  80

Gln Ile Glu Val Asp Tyr Tyr Thr Lys Asp Thr Asn Asn Leu Thr
                 85                  90                  95

Leu Val Pro Gln Leu Ile Thr Leu Glu Ser Gly Glu Phe Gln Val Tyr
                100                 105                 110

Lys Gln Ser His Ser Ala Leu Thr Ala Phe Gln Thr Glu Gln Ile Gln

```
                    115                 120                 125
Asp Ser Glu His Ser Gly Lys Met Val Ala Lys Arg Gln Phe Arg Ile
    130                 135                 140

Gly Asp Ile Ala Gly Glu His Thr Ser Phe Asp Lys Leu Pro Glu Gly
145                 150                 155                 160

Gly Arg Ala Thr Tyr Arg Gly Thr Ala Phe Gly Ser Asp Asp Ala Gly
                165                 170                 175

Gly Lys Leu Thr Tyr Thr Ile Asp Phe Ala Ala Lys Gln Gly Asn Gly
            180                 185                 190

Lys Ile Glu His Leu Lys Ser Pro Glu Leu Asn Val Asp Leu Ala Ala
                195                 200                 205

Ala Asp Ile Lys Pro Asp Gly Lys Arg His Ala Val Ile Ser Gly Ser
    210                 215                 220

Val Leu Tyr Asn Gln Ala Glu Lys Gly Ser Tyr Ser Leu Gly Ile Phe
225                 230                 235                 240

Gly Gly Lys Ala Gln Glu Val Ala Gly Ser Ala Glu Val Lys Thr Val
                245                 250                 255

Asn Gly Ile Arg His Ile Gly Leu Ala Ala Lys Gln
            260                 265

<210> SEQ ID NO 93
<211> LENGTH: 274
<212> TYPE: PRT
<213> ORGANISM: Artificial Sequence
<220> FEATURE:
<223> OTHER INFORMATION: Modified polypeptide

<400> SEQUENCE: 93

Cys Ser Ser Gly Ser Gly Ser Gly Gly Gly Val Ala Ala Asp Ile
1               5                   10                  15

Gly Thr Gly Leu Ala Asp Ala Leu Thr Ala Pro Leu Asp His Lys Asp
            20                  25                  30

Lys Gly Leu Lys Ser Leu Thr Leu Glu Asp Ser Ile Ser Gln Asn Gly
        35                  40                  45

Thr Leu Thr Leu Ser Ala Gln Gly Ala Glu Lys Thr Phe Lys Val Gly
    50                  55                  60

Asp Lys Asp Asn Ser Leu Asn Thr Gly Lys Leu Lys Asn Asp Lys Ile
65                  70                  75                  80

Ser Arg Phe Asp Phe Val Gln Lys Ile Glu Val Asp Tyr Tyr Thr Lys
                85                  90                  95

Asp Thr Asn Asn Asn Leu Thr Leu Val Pro Gln Thr Ile Thr Leu Ala
            100                 105                 110

Ser Gly Glu Phe Gln Ile Tyr Lys Gln Asp His Ser Ala Val Val Ala
        115                 120                 125

Leu Gln Ile Glu Lys Ile Asn Asn Pro Asp Lys Ile Asp Ser Leu Ile
    130                 135                 140

Asn Gln Arg Ser Phe Leu Val Ser Gly Leu Gly Gly Glu His Thr Ala
145                 150                 155                 160

Phe Asn Gln Leu Pro Ser Gly Lys Ala Glu Tyr His Gly Lys Ala Phe
                165                 170                 175

Ser Ser Asp Asp Ala Gly Gly Lys Leu Thr Tyr Thr Ile Asp Phe Ala
            180                 185                 190

Ala Lys Gln Gly His Gly Lys Ile Glu His Leu Lys Thr Pro Glu Gln
        195                 200                 205

Asn Val Glu Leu Ala Ser Ala Glu Leu Lys Ala Asp Glu Lys Ser His
```

```
                210                 215                 220
Ala Val Ile Leu Gly Asp Thr Arg Tyr Gly Ser Glu Glu Lys Gly Thr
225                 230                 235                 240

Tyr His Leu Ala Leu Phe Gly Asp Arg Ala Gln Glu Ile Ala Gly Ser
                245                 250                 255

Ala Thr Val Lys Ile Arg Glu Lys Val His Glu Ile Gly Ile Ala Gly
                260                 265                 270

Lys Gln
```

<210> SEQ ID NO 94
<211> LENGTH: 267
<212> TYPE: PRT
<213> ORGANISM: Artificial Sequence
<220> FEATURE:
<223> OTHER INFORMATION: Modified polypeptide

<400> SEQUENCE: 94

```
Cys Ser Ser Gly Gly Gly Gly Val Ala Ala Asp Ile Gly Ala Gly Leu
1                   5                   10                  15

Ala Asp Ala Leu Thr Ala Pro Leu Asp His Lys Asp Lys Ser Leu Gln
                20                  25                  30

Ser Leu Thr Leu Asp Gln Ser Val Arg Lys Asn Glu Lys Leu Lys Leu
            35                  40                  45

Ala Ala Gln Gly Ala Glu Lys Thr Tyr Gly Asn Gly Asp Ser Leu Asn
        50                  55                  60

Thr Gly Lys Leu Lys Asn Asp Lys Val Ser Arg Phe Asp Phe Ile Arg
65                  70                  75                  80

Gln Ile Glu Val Asp Tyr Tyr Thr Lys Asp Thr Asn Asn Asn Leu Thr
                85                  90                  95

Leu Val Pro Gln Leu Ile Thr Leu Glu Ser Gly Glu Phe Gln Ile Tyr
                100                 105                 110

Lys Gln Asp His Ser Ala Val Val Ala Leu Gln Ile Glu Lys Ile Asn
            115                 120                 125

Asn Pro Asp Lys Ile Asp Ser Leu Ile Asn Gln Arg Ser Phe Leu Val
        130                 135                 140

Ser Gly Leu Gly Gly Glu His Thr Ala Phe Asn Gln Leu Pro Ser Gly
145                 150                 155                 160

Lys Ala Glu Tyr His Gly Lys Ala Phe Ser Ser Asp Ala Gly Gly Lys
                165                 170                 175

Lys Leu Thr Tyr Thr Ile Asp Phe Ala Ala Lys Gln Gly His Gly Lys
                180                 185                 190

Ile Glu His Leu Lys Thr Pro Glu Gln Asn Val Glu Leu Ala Ser Ala
            195                 200                 205

Glu Leu Lys Ala Asp Glu Lys Ser His Ala Val Ile Leu Gly Asp Thr
        210                 215                 220

Arg Tyr Gly Gly Glu Lys Gly Thr Tyr His Leu Ala Leu Phe Gly
225                 230                 235                 240

Asp Arg Ala Gln Glu Ile Ala Gly Ser Ala Thr Val Lys Ile Arg Glu
                245                 250                 255

Lys Val His Glu Ile Gly Ile Ala Gly Lys Gln
                260                 265
```

<210> SEQ ID NO 95
<211> LENGTH: 268
<212> TYPE: PRT
<213> ORGANISM: Artificial Sequence
<220> FEATURE:
<223> OTHER INFORMATION: Modified polypeptide

<400> SEQUENCE: 95

Cys Ser Ser Gly Gly Gly Val Ala Ala Asp Ile Gly Ala Gly Leu
1               5                   10                  15

Ala Asp Ala Leu Thr Ala Pro Leu Asp His Lys Asp Lys Gly Leu Gln
            20                  25                  30

Ser Leu Thr Leu Asp Gln Ser Val Arg Lys Asn Glu Lys Leu Lys Leu
        35                  40                  45

Ala Ala Gln Gly Ala Glu Lys Thr Tyr Gly Asn Gly Asp Ser Leu Asn
    50                  55                  60

Thr Gly Lys Leu Lys Asn Asp Lys Val Ser Arg Phe Asp Phe Ile Arg
65                  70                  75                  80

Gln Ile Glu Val Asp Gly Gln Leu Ile Thr Leu Glu Ser Gly Glu Phe
                85                  90                  95

Gln Val Tyr Lys Gln Ser His Ser Ala Leu Thr Ala Phe Gln Thr Glu
            100                 105                 110

Gln Ile Gln Asp Ser Glu His Ser Gly Lys Met Val Ala Lys Arg Gln
        115                 120                 125

Phe Arg Ile Gly Asp Ile Ala Gly Glu His Thr Ser Phe Asp Lys Leu
    130                 135                 140

Pro Glu Gly Gly Arg Ala Thr Tyr Arg Gly Thr Ala Phe Gly Ser Asp
145                 150                 155                 160

Asp Ala Gly Gly Lys Leu Thr Tyr Thr Ile Asp Phe Ala Ala Lys Gln
                165                 170                 175

Gly Asn Gly Lys Ile Glu His Leu Lys Ser Pro Glu Leu Asn Val Asp
            180                 185                 190

Leu Ala Ala Ala Asp Ile Lys Pro Asp Tyr Tyr Thr Lys Asp Thr Asn
        195                 200                 205

Asn Asn Leu Thr Leu Val Pro Lys Arg His Ala Val Ile Ser Gly Ser
    210                 215                 220

Val Leu Tyr Asn Gln Ala Glu Lys Gly Ser Tyr Ser Leu Gly Ile Phe
225                 230                 235                 240

Gly Gly Lys Ala Gln Glu Val Ala Gly Ser Ala Glu Val Lys Thr Val
                245                 250                 255

Asn Gly Ile Arg His Ile Gly Leu Ala Ala Lys Gln
            260                 265

<210> SEQ ID NO 96
<211> LENGTH: 274
<212> TYPE: PRT
<213> ORGANISM: Artificial Sequence
<220> FEATURE:
<223> OTHER INFORMATION: Modified polypeptide

<400> SEQUENCE: 96

Cys Ser Ser Gly Ser Gly Ser Gly Gly Gly Val Ala Ala Asp Ile
1               5                   10                  15

Gly Thr Gly Leu Ala Asp Ala Leu Thr Ala Pro Leu Asp His Lys Asp
            20                  25                  30

Lys Gly Leu Lys Ser Leu Thr Leu Glu Asp Ser Ile Ser Gln Asn Gly
        35                  40                  45

Thr Leu Thr Leu Ser Ala Gln Gly Ala Glu Lys Thr Phe Lys Val Gly
    50                  55                  60

Asp Lys Asp Asn Ser Leu Asn Thr Gly Lys Leu Lys Asn Asp Lys Ile

```
                65                  70                  75                  80
Ser Arg Phe Asp Phe Val Gln Lys Ile Glu Val Asp Gly Gln Thr Ile
                    85                  90                  95

Thr Leu Ala Ser Gly Glu Phe Gln Ile Tyr Lys Gln Asp His Ser Ala
            100                 105                 110

Val Val Ala Leu Gln Ile Glu Lys Ile Asn Asn Pro Asp Lys Ile Asp
            115                 120                 125

Ser Leu Ile Asn Gln Arg Ser Phe Leu Val Ser Gly Leu Gly Gly Glu
            130                 135                 140

His Thr Ala Phe Asn Gln Leu Pro Ser Gly Lys Ala Glu Tyr His Gly
145                 150                 155                 160

Lys Ala Phe Ser Ser Asp Asp Ala Gly Gly Lys Leu Thr Tyr Thr Ile
                165                 170                 175

Asp Phe Ala Ala Lys Gln Gly His Gly Lys Ile Glu His Leu Lys Thr
            180                 185                 190

Pro Glu Gln Asn Val Glu Leu Ala Ser Ala Glu Leu Lys Ala Asp Tyr
            195                 200                 205

Tyr Thr Lys Asp Thr Asn Asn Asn Leu Thr Leu Val Pro Lys Ser His
            210                 215                 220

Ala Val Ile Leu Gly Asp Thr Arg Tyr Gly Ser Glu Glu Lys Gly Thr
225                 230                 235                 240

Tyr His Leu Ala Leu Phe Gly Asp Arg Ala Gln Glu Ile Ala Gly Ser
                245                 250                 255

Ala Thr Val Lys Ile Arg Glu Lys Val His Glu Ile Gly Ile Ala Gly
            260                 265                 270

Lys Gln

<210> SEQ ID NO 97
<211> LENGTH: 267
<212> TYPE: PRT
<213> ORGANISM: Artificial Sequence
<220> FEATURE:
<223> OTHER INFORMATION: Modified polypeptide

<400> SEQUENCE: 97

Cys Ser Ser Gly Gly Gly Val Ala Ala Asp Ile Gly Ala Gly Leu
1               5                   10                  15

Ala Asp Ala Leu Thr Ala Pro Leu Asp His Lys Asp Lys Ser Leu Gln
            20                  25                  30

Ser Leu Thr Leu Asp Gln Ser Val Arg Lys Asn Glu Lys Leu Lys Leu
            35                  40                  45

Ala Ala Gln Gly Ala Glu Lys Thr Tyr Gly Asn Gly Asp Ser Leu Asn
50                  55                  60

Thr Gly Lys Leu Lys Asn Asp Lys Val Ser Arg Phe Asp Phe Ile Arg
65                  70                  75                  80

Gln Ile Glu Val Asp Gly Gln Leu Ile Thr Leu Glu Ser Gly Glu Phe
                85                  90                  95

Gln Ile Tyr Lys Gln Asp His Ser Ala Val Val Ala Leu Gln Ile Glu
            100                 105                 110

Lys Ile Asn Asn Pro Asp Lys Ile Asp Ser Leu Ile Asn Gln Arg Ser
            115                 120                 125

Phe Leu Val Ser Gly Leu Gly Gly Glu His Thr Ala Phe Asn Gln Leu
            130                 135                 140

Pro Ser Gly Lys Ala Glu Tyr His Gly Lys Ala Phe Ser Ser Asp Asp
145                 150                 155                 160
```

Ala Gly Gly Lys Leu Thr Tyr Thr Ile Asp Phe Ala Ala Lys Gln Gly
            165                 170                 175

His Gly Lys Ile Glu His Leu Lys Thr Pro Glu Gln Asn Val Glu Leu
        180                 185                 190

Ala Ser Ala Glu Leu Lys Ala Asp Tyr Tyr Lys Asp Thr Asn Asn
    195                 200                 205

Asn Leu Thr Leu Val Pro Lys Ser His Ala Val Ile Leu Gly Asp Thr
    210                 215                 220

Arg Tyr Gly Gly Glu Glu Lys Gly Thr Tyr His Leu Ala Leu Phe Gly
225                 230                 235                 240

Asp Arg Ala Gln Glu Ile Ala Gly Ser Ala Thr Val Lys Ile Arg Glu
            245                 250                 255

Lys Val His Glu Ile Gly Ile Ala Gly Lys Gln
            260                 265

<210> SEQ ID NO 98
<211> LENGTH: 268
<212> TYPE: PRT
<213> ORGANISM: Artificial Sequence
<220> FEATURE:
<223> OTHER INFORMATION: Modified polypeptide

<400> SEQUENCE: 98

Cys Ser Ser Gly Gly Gly Val Ala Ala Asp Ile Gly Ala Gly Leu
1               5                   10                  15

Ala Asp Ala Leu Thr Ala Pro Leu Asp His Lys Asp Lys Gly Leu Gln
            20                  25                  30

Ser Leu Thr Leu Asp Gln Ser Val Arg Lys Asn Glu Lys Leu Lys Leu
        35                  40                  45

Ala Ala Gln Gly Ala Glu Lys Thr Tyr Gly Asn Gly Asp Ser Leu Asn
    50                  55                  60

Thr Gly Lys Leu Lys Asn Asp Lys Val Ser Arg Phe Asp Phe Ile Arg
65                  70                  75                  80

Gln Ile Glu Val Asp Gly Gln Leu Ile Thr Leu Glu Ser Gly Glu Phe
            85                  90                  95

Gln Val Tyr Lys Gln Ser His Ser Ala Leu Thr Ala Phe Gln Thr Glu
            100                 105                 110

Gln Ile Gln Asp Ser Glu His Ser Gly Lys Met Val Ala Lys Arg Gln
        115                 120                 125

Phe Arg Ile Gly Asp Ile Ala Gly Glu His Thr Ser Phe Asp Lys Leu
130                 135                 140

Pro Glu Gly Gly Arg Ala Thr Tyr Arg Gly Thr Ala Phe Gly Ser Asp
145                 150                 155                 160

Asp Ala Gly Gly Lys Leu Thr Tyr Thr Ile Asp Phe Ala Ala Lys Gln
            165                 170                 175

Gly Asn Gly Lys Ile Glu His Leu Lys Ser Pro Glu Leu Asn Val Asp
        180                 185                 190

Leu Ala Ala Ala Asp Ile Lys Pro Asp Gly Lys Arg His Ala Val Ile
    195                 200                 205

Ser Gly Ser Val Leu Tyr Asn Gln Ala Glu Lys Gly Ser Tyr Ser Leu
    210                 215                 220

Gly Ile Phe Gly Tyr Tyr Thr Lys Asp Thr Asn Asn Asn Leu Thr Leu
225                 230                 235                 240

Val Pro Lys Ala Gln Glu Val Ala Gly Ser Ala Glu Val Lys Thr Val
            245                 250                 255

Asn Gly Ile Arg His Ile Gly Leu Ala Ala Lys Gln
            260                 265

<210> SEQ ID NO 99
<211> LENGTH: 274
<212> TYPE: PRT
<213> ORGANISM: Artificial Sequence
<220> FEATURE:
<223> OTHER INFORMATION: Modified polypeptide

<400> SEQUENCE: 99

Cys Ser Ser Gly Ser Gly Ser Gly Gly Gly Val Ala Ala Asp Ile
1               5                   10                  15

Gly Thr Gly Leu Ala Asp Ala Leu Thr Ala Pro Leu Asp His Lys Asp
                20                  25                  30

Lys Gly Leu Lys Ser Leu Thr Leu Glu Asp Ser Ile Ser Gln Asn Gly
            35                  40                  45

Thr Leu Thr Leu Ser Ala Gln Gly Ala Glu Lys Thr Phe Lys Val Gly
    50                  55                  60

Asp Lys Asp Asn Ser Leu Asn Thr Gly Lys Leu Lys Asn Asp Lys Ile
65                  70                  75                  80

Ser Arg Phe Asp Phe Val Gln Lys Ile Glu Val Asp Gly Gln Thr Ile
                85                  90                  95

Thr Leu Ala Ser Gly Glu Phe Gln Ile Tyr Lys Gln Asp His Ser Ala
            100                 105                 110

Val Val Ala Leu Gln Ile Glu Lys Ile Asn Asn Pro Asp Lys Ile Asp
        115                 120                 125

Ser Leu Ile Asn Gln Arg Ser Phe Leu Val Ser Gly Leu Gly Gly Glu
    130                 135                 140

His Thr Ala Phe Asn Gln Leu Pro Ser Gly Lys Ala Glu Tyr His Gly
145                 150                 155                 160

Lys Ala Phe Ser Ser Asp Asp Ala Gly Gly Lys Leu Thr Tyr Thr Ile
                165                 170                 175

Asp Phe Ala Ala Lys Gln Gly His Gly Lys Ile Glu His Leu Lys Thr
            180                 185                 190

Pro Glu Gln Asn Val Glu Leu Ala Ser Ala Glu Leu Lys Ala Asp Glu
        195                 200                 205

Lys Ser His Ala Val Ile Leu Gly Asp Thr Arg Tyr Gly Ser Glu Glu
    210                 215                 220

Lys Gly Thr Tyr His Leu Ala Leu Phe Gly Tyr Tyr Thr Lys Asp Thr
225                 230                 235                 240

Asn Asn Asn Leu Thr Leu Val Pro Arg Ala Gln Glu Ile Ala Gly Ser
                245                 250                 255

Ala Thr Val Lys Ile Arg Glu Lys Val His Glu Ile Gly Ile Ala Gly
            260                 265                 270

Lys Gln

<210> SEQ ID NO 100
<211> LENGTH: 267
<212> TYPE: PRT
<213> ORGANISM: Artificial Sequence
<220> FEATURE:
<223> OTHER INFORMATION: Modified polypeptide

<400> SEQUENCE: 100

Cys Ser Ser Gly Gly Gly Val Ala Ala Asp Ile Gly Ala Gly Leu
1               5                   10                  15

Ala Asp Ala Leu Thr Ala Pro Leu Asp His Lys Asp Lys Ser Leu Gln
            20                  25                  30

Ser Leu Thr Leu Asp Gln Ser Val Arg Lys Asn Glu Lys Leu Lys Leu
        35                  40                  45

Ala Ala Gln Gly Ala Glu Lys Thr Tyr Gly Asn Gly Asp Ser Leu Asn
    50                  55                  60

Thr Gly Lys Leu Lys Asn Asp Lys Val Ser Arg Phe Asp Phe Ile Arg
65                  70                  75                  80

Gln Ile Glu Val Asp Gly Gln Leu Ile Thr Leu Glu Ser Gly Glu Phe
                85                  90                  95

Gln Ile Tyr Lys Gln Asp His Ser Ala Val Val Ala Leu Gln Ile Glu
            100                 105                 110

Lys Ile Asn Asn Pro Asp Lys Ile Asp Ser Leu Ile Asn Gln Arg Ser
        115                 120                 125

Phe Leu Val Ser Gly Leu Gly Gly Glu His Thr Ala Phe Asn Gln Leu
    130                 135                 140

Pro Ser Gly Lys Ala Glu Tyr His Gly Lys Ala Phe Ser Ser Asp Asp
145                 150                 155                 160

Ala Gly Gly Lys Leu Thr Tyr Thr Ile Asp Phe Ala Ala Lys Gln Gly
                165                 170                 175

His Gly Lys Ile Glu His Leu Lys Thr Pro Glu Gln Asn Val Glu Leu
            180                 185                 190

Ala Ser Ala Glu Leu Lys Ala Asp Glu Lys Ser His Ala Val Ile Leu
        195                 200                 205

Gly Asp Thr Arg Tyr Gly Gly Glu Glu Lys Gly Thr Tyr His Leu Ala
    210                 215                 220

Leu Phe Gly Tyr Tyr Thr Lys Asp Thr Asn Asn Asn Leu Thr Leu Val
225                 230                 235                 240

Pro Arg Ala Gln Glu Ile Ala Gly Ser Ala Thr Val Lys Ile Arg Glu
                245                 250                 255

Lys Val His Glu Ile Gly Ile Ala Gly Lys Gln
            260                 265

<210> SEQ ID NO 101
<211> LENGTH: 268
<212> TYPE: PRT
<213> ORGANISM: Artificial Sequence
<220> FEATURE:
<223> OTHER INFORMATION: Modified polypeptide

<400> SEQUENCE: 101

Cys Ser Ser Gly Gly Gly Gly Val Ala Ala Asp Ile Gly Ala Gly Leu
1               5                   10                  15

Ala Asp Ala Leu Thr Ala Pro Leu Asp His Lys Asp Lys Gly Leu Gln
            20                  25                  30

Ser Leu Thr Leu Asp Gln Ser Val Arg Lys Asn Glu Lys Leu Lys Leu
        35                  40                  45

Ala Ala Gln Tyr Tyr Thr Lys Asp Thr Asn Asn Asn Leu Thr Leu Val
    50                  55                  60

Pro Ala Glu Lys Thr Tyr Gly Asn Gly Asp Ser Leu Asn Thr Gly Lys
65                  70                  75                  80

Leu Lys Asn Asp Lys Val Ser Arg Phe Asp Phe Ile Arg Gln Ile Glu
                85                  90                  95

Val Asp Gly Gln Leu Ile Thr Leu Glu Ser Gly Glu Phe Gln Val Tyr
            100                 105                 110

```
Lys Gln Ser His Ser Ala Leu Thr Ala Phe Gln Thr Glu Gln Ile Gln
            115                 120                 125

Asp Ser Glu His Ser Gly Lys Met Val Ala Lys Arg Gln Phe Arg Ile
        130                 135                 140

Gly Asp Ile Ala Gly Glu His Thr Ser Phe Asp Lys Leu Pro Glu Gly
145                 150                 155                 160

Gly Arg Ala Thr Tyr Arg Gly Thr Ala Phe Gly Ser Asp Asp Ala Gly
                165                 170                 175

Gly Lys Leu Thr Tyr Thr Ile Asp Phe Ala Ala Lys Gln Gly Asn Gly
                180                 185                 190

Lys Ile Glu His Leu Lys Ser Pro Glu Leu Asn Val Asp Leu Ala Ala
            195                 200                 205

Ala Asp Ile Lys Pro Asp Gly Lys Arg His Ala Val Ile Ser Gly Ser
        210                 215                 220

Val Leu Tyr Asn Gln Ala Glu Lys Gly Ser Tyr Ser Leu Gly Ile Phe
225                 230                 235                 240

Gly Gly Lys Ala Gln Glu Val Ala Gly Ser Ala Glu Val Lys Thr Val
                245                 250                 255

Asn Gly Ile Arg His Ile Gly Leu Ala Ala Lys Gln
            260                 265

<210> SEQ ID NO 102
<211> LENGTH: 274
<212> TYPE: PRT
<213> ORGANISM: Artificial Sequence
<220> FEATURE:
<223> OTHER INFORMATION: Modified polypeptide

<400> SEQUENCE: 102

Cys Ser Ser Gly Ser Gly Ser Gly Gly Gly Val Ala Ala Asp Ile
1               5                   10                  15

Gly Thr Gly Leu Ala Asp Ala Leu Thr Ala Pro Leu Asp His Lys Asp
            20                  25                  30

Lys Gly Leu Lys Ser Leu Thr Leu Glu Asp Ser Ile Ser Gln Asn Gly
        35                  40                  45

Thr Leu Thr Leu Ser Ala Gln Tyr Tyr Thr Lys Asp Thr Asn Asn Asn
    50                  55                  60

Leu Thr Leu Val Pro Ala Glu Lys Thr Phe Lys Val Gly Asp Lys Asp
65                  70                  75                  80

Asn Ser Leu Asn Thr Gly Lys Leu Lys Asn Asp Lys Ile Ser Arg Phe
                85                  90                  95

Asp Phe Val Gln Lys Ile Glu Val Asp Gly Gln Thr Ile Thr Leu Ala
            100                 105                 110

Ser Gly Glu Phe Gln Ile Tyr Lys Gln Asp His Ser Ala Val Val Ala
        115                 120                 125

Leu Gln Ile Glu Lys Ile Asn Asn Pro Asp Lys Ile Asp Ser Leu Ile
    130                 135                 140

Asn Gln Arg Ser Phe Leu Val Ser Gly Leu Gly Gly Glu His Thr Ala
145                 150                 155                 160

Phe Asn Gln Leu Pro Ser Gly Lys Ala Glu Tyr His Gly Lys Ala Phe
                165                 170                 175

Ser Ser Asp Asp Ala Gly Gly Lys Leu Thr Tyr Thr Ile Asp Phe Ala
            180                 185                 190

Ala Lys Gln Gly His Gly Lys Ile Glu His Leu Lys Thr Pro Glu Gln
        195                 200                 205
```

Asn Val Glu Leu Ala Ser Ala Glu Leu Lys Ala Asp Glu Lys Ser His
    210                 215                 220

Ala Val Ile Leu Gly Asp Thr Arg Tyr Gly Ser Glu Lys Gly Thr
225                 230                 235                 240

Tyr His Leu Ala Leu Phe Gly Asp Arg Ala Gln Glu Ile Ala Gly Ser
                245                 250                 255

Ala Thr Val Lys Ile Arg Glu Lys Val His Glu Ile Gly Ile Ala Gly
            260                 265                 270

Lys Gln

<210> SEQ ID NO 103
<211> LENGTH: 267
<212> TYPE: PRT
<213> ORGANISM: Artificial Sequence
<220> FEATURE:
<223> OTHER INFORMATION: Modified polypeptide

<400> SEQUENCE: 103

Cys Ser Ser Gly Gly Gly Val Ala Ala Asp Ile Gly Ala Gly Leu
1               5                   10                  15

Ala Asp Ala Leu Thr Ala Pro Leu Asp His Lys Asp Lys Ser Leu Gln
                20                  25                  30

Ser Leu Thr Leu Asp Gln Ser Val Arg Lys Asn Glu Lys Leu Lys Leu
                35                  40                  45

Ala Ala Gln Tyr Tyr Thr Lys Asp Thr Asn Asn Leu Thr Leu Val
        50                  55                  60

Pro Ala Glu Lys Thr Tyr Gly Asn Gly Asp Ser Leu Asn Thr Gly Lys
65                  70                  75                  80

Leu Lys Asn Asp Lys Val Ser Arg Phe Asp Phe Ile Arg Gln Ile Glu
                85                  90                  95

Val Asp Gly Gln Leu Ile Thr Leu Glu Ser Gly Glu Phe Gln Ile Tyr
                100                 105                 110

Lys Gln Asp His Ser Ala Val Val Ala Leu Gln Ile Glu Lys Ile Asn
            115                 120                 125

Asn Pro Asp Lys Ile Asp Ser Leu Ile Asn Gln Arg Ser Phe Leu Val
        130                 135                 140

Ser Gly Leu Gly Gly Glu His Thr Ala Phe Asn Gln Leu Pro Ser Gly
145                 150                 155                 160

Lys Ala Glu Tyr His Gly Lys Ala Phe Ser Ser Asp Ala Gly Gly
                165                 170                 175

Lys Leu Thr Tyr Thr Ile Asp Phe Ala Ala Lys Gln Gly His Gly Lys
            180                 185                 190

Ile Glu His Leu Lys Thr Pro Glu Gln Asn Val Glu Leu Ala Ser Ala
        195                 200                 205

Glu Leu Lys Ala Asp Glu Lys Ser His Ala Val Ile Leu Gly Asp Thr
210                 215                 220

Arg Tyr Gly Gly Glu Lys Gly Thr Tyr His Leu Ala Leu Phe Gly
225                 230                 235                 240

Asp Arg Ala Gln Glu Ile Ala Gly Ser Ala Thr Val Lys Ile Arg Glu
                245                 250                 255

Lys Val His Glu Ile Gly Ile Ala Gly Lys Gln
            260                 265

<210> SEQ ID NO 104
<211> LENGTH: 268

```
<212> TYPE: PRT
<213> ORGANISM: Artificial Sequence
<220> FEATURE:
<223> OTHER INFORMATION: Modified polypeptide

<400> SEQUENCE: 104

Cys Ser Ser Gly Gly Gly Gly Val Ala Ala Asp Ile Gly Ala Gly Leu
1               5                   10                  15

Ala Asp Ala Leu Thr Ala Pro Leu Asp His Lys Asp Lys Gly Leu Gln
            20                  25                  30

Ser Leu Thr Leu Asp Gln Ser Val Arg Lys Asn Glu Lys Leu Lys Leu
        35                  40                  45

Ala Ala Gln Gly Ala Glu Lys Thr Tyr Gly Asn Gly Asp Ser Leu Asn
    50                  55                  60

Thr Gly Lys Leu Lys Asn Asp Lys Val Ser Arg Phe Asp Phe Ile Arg
65                  70                  75                  80

Gln Ile Glu Val Asp Gly Gln Leu Ile Thr Leu Glu Ser Gly Glu Phe
                85                  90                  95

Gln Val Tyr Lys Gln Ser His Ser Ala Leu Thr Ala Phe Gln Thr Glu
            100                 105                 110

Gln Ile Gln Asp Ser Tyr Tyr Thr Lys Asp Thr Asn Asn Asn Leu Thr
        115                 120                 125

Leu Val Pro His Ser Gly Lys Met Val Ala Lys Arg Gln Phe Arg Ile
    130                 135                 140

Gly Asp Ile Ala Gly Glu His Thr Ser Phe Asp Lys Leu Pro Glu Gly
145                 150                 155                 160

Gly Arg Ala Thr Tyr Arg Gly Thr Ala Phe Gly Ser Asp Asp Ala Gly
                165                 170                 175

Gly Lys Leu Thr Tyr Thr Ile Asp Phe Ala Ala Lys Gln Gly Asn Gly
            180                 185                 190

Lys Ile Glu His Leu Lys Ser Pro Glu Leu Asn Val Asp Leu Ala Ala
        195                 200                 205

Ala Asp Ile Lys Pro Asp Gly Lys Arg His Ala Val Ile Ser Gly Ser
    210                 215                 220

Val Leu Tyr Asn Gln Ala Glu Lys Gly Ser Tyr Ser Leu Gly Ile Phe
225                 230                 235                 240

Gly Gly Lys Ala Gln Glu Val Ala Gly Ser Ala Glu Val Lys Thr Val
                245                 250                 255

Asn Gly Ile Arg His Ile Gly Leu Ala Ala Lys Gln
            260                 265

<210> SEQ ID NO 105
<211> LENGTH: 274
<212> TYPE: PRT
<213> ORGANISM: Artificial Sequence
<220> FEATURE:
<223> OTHER INFORMATION: Modified polypeptide

<400> SEQUENCE: 105

Cys Ser Ser Gly Ser Gly Ser Gly Gly Gly Val Ala Ala Asp Ile
1               5                   10                  15

Gly Thr Gly Leu Ala Asp Ala Leu Thr Ala Pro Leu Asp His Lys Asp
            20                  25                  30

Lys Gly Leu Lys Ser Leu Thr Leu Glu Asp Ser Ile Ser Gln Asn Gly
        35                  40                  45

Thr Leu Thr Leu Ser Ala Gln Gly Ala Glu Lys Thr Phe Lys Val Gly
    50                  55                  60
```

```
Asp Lys Asp Asn Ser Leu Asn Thr Gly Lys Leu Lys Asn Asp Lys Ile
 65                  70                  75                  80

Ser Arg Phe Asp Phe Val Gln Lys Ile Glu Val Asp Gly Gln Thr Ile
                 85                  90                  95

Thr Leu Ala Ser Gly Glu Phe Gln Ile Tyr Lys Gln Asp His Ser Ala
            100                 105                 110

Val Val Ala Leu Gln Ile Glu Lys Ile Asn Asn Pro Tyr Tyr Thr Lys
        115                 120                 125

Asp Thr Asn Asn Asn Leu Thr Leu Val Pro Lys Ile Asp Ser Leu Ile
130                 135                 140

Asn Gln Arg Ser Phe Leu Val Ser Gly Leu Gly Gly Glu His Thr Ala
145                 150                 155                 160

Phe Asn Gln Leu Pro Ser Gly Lys Ala Glu Tyr His Gly Lys Ala Phe
                165                 170                 175

Ser Ser Asp Asp Ala Gly Gly Lys Leu Thr Tyr Thr Ile Asp Phe Ala
            180                 185                 190

Ala Lys Gln Gly His Gly Lys Ile Glu His Leu Lys Thr Pro Glu Gln
        195                 200                 205

Asn Val Glu Leu Ala Ser Ala Glu Leu Lys Ala Asp Glu Lys Ser His
    210                 215                 220

Ala Val Ile Leu Gly Asp Thr Arg Tyr Gly Ser Glu Glu Lys Gly Thr
225                 230                 235                 240

Tyr His Leu Ala Leu Phe Gly Asp Arg Ala Gln Glu Ile Ala Gly Ser
                245                 250                 255

Ala Thr Val Lys Ile Arg Glu Lys Val His Glu Ile Gly Ile Ala Gly
            260                 265                 270

Lys Gln

<210> SEQ ID NO 106
<211> LENGTH: 267
<212> TYPE: PRT
<213> ORGANISM: Artificial Sequence
<220> FEATURE:
<223> OTHER INFORMATION: Modified polypeptide

<400> SEQUENCE: 106

Cys Ser Ser Gly Gly Gly Gly Val Ala Ala Asp Ile Gly Ala Gly Leu
  1               5                  10                  15

Ala Asp Ala Leu Thr Ala Pro Leu Asp His Lys Asp Lys Ser Leu Gln
             20                  25                  30

Ser Leu Thr Leu Asp Gln Ser Val Arg Lys Asn Glu Lys Leu Lys Leu
         35                  40                  45

Ala Ala Gln Gly Ala Glu Lys Thr Tyr Gly Asn Gly Asp Ser Leu Asn
     50                  55                  60

Thr Gly Lys Leu Lys Asn Asp Lys Val Ser Arg Phe Asp Phe Ile Arg
 65                  70                  75                  80

Gln Ile Glu Val Asp Gly Gln Leu Ile Thr Leu Glu Ser Gly Glu Phe
                 85                  90                  95

Gln Ile Tyr Lys Gln Asp His Ser Ala Val Val Ala Leu Gln Ile Glu
            100                 105                 110

Lys Ile Asn Asn Pro Tyr Tyr Thr Lys Asp Thr Asn Asn Asn Leu Thr
        115                 120                 125

Leu Val Pro Lys Ile Asp Ser Leu Ile Asn Gln Arg Ser Phe Leu Val
130                 135                 140
```

Ser Gly Leu Gly Gly Glu His Thr Ala Phe Asn Gln Leu Pro Ser Gly
145                 150                 155                 160

Lys Ala Glu Tyr His Gly Lys Ala Phe Ser Asp Asp Ala Gly Gly
                165                 170                 175

Lys Leu Thr Tyr Thr Ile Asp Phe Ala Ala Lys Gln Gly His Gly Lys
                180                 185                 190

Ile Glu His Leu Lys Thr Pro Glu Gln Asn Val Glu Leu Ala Ser Ala
                195                 200                 205

Glu Leu Lys Ala Asp Glu Lys Ser His Ala Val Ile Leu Gly Asp Thr
                210                 215                 220

Arg Tyr Gly Gly Glu Lys Gly Thr Tyr His Leu Ala Leu Phe Gly
225                 230                 235                 240

Asp Arg Ala Gln Glu Ile Ala Gly Ser Ala Thr Val Lys Ile Arg Glu
                245                 250                 255

Lys Val His Glu Ile Gly Ile Ala Gly Lys Gln
                260                 265

<210> SEQ ID NO 107
<211> LENGTH: 268
<212> TYPE: PRT
<213> ORGANISM: Artificial Sequence
<220> FEATURE:
<223> OTHER INFORMATION: Modified polypeptide

<400> SEQUENCE: 107

Cys Ser Ser Gly Gly Gly Val Ala Ala Asp Ile Gly Ala Gly Leu
1               5                   10                  15

Ala Asp Ala Leu Thr Ala Pro Leu Asp His Lys Asp Lys Gly Leu Gln
                20                  25                  30

Ser Leu Thr Leu Asp Gln Ser Val Arg Lys Asn Glu Lys Leu Lys Leu
                35                  40                  45

Ala Ala Gln Gly Ala Glu Lys Thr Tyr Gly Asn Gly Asp Ser Leu Asn
                50                  55                  60

Thr Gly Lys Leu Lys Asn Asp Lys Val Ser Arg Phe Asp Phe Ile Arg
65                  70                  75                  80

Gln Ile Glu Val Asp Gly Gln Leu Ile Thr Leu Glu Ser Gly Glu Phe
                85                  90                  95

Gln Val Tyr Lys Gln Ser His Ser Ala Leu Thr Ala Phe Gln Thr Glu
                100                 105                 110

Gln Ile Gln Asp Ser Glu His Ser Gly Lys Met Val Ala Lys Arg Gln
                115                 120                 125

Phe Arg Ile Gly Asp Ile Ala Gly Glu His Thr Ser Phe Asp Lys Leu
                130                 135                 140

Pro Glu Gly Gly Arg Ala Thr Tyr Arg Gly Thr Ala Phe Gly Ser Asp
145                 150                 155                 160

Asp Ala Gly Gly Lys Leu Thr Tyr Thr Ile Asp Phe Ala Ala Lys Gln
                165                 170                 175

Gly Asn Gly Lys Ile Glu His Leu Lys Ser Pro Glu Leu Asn Val Asp
                180                 185                 190

Leu Ala Ala Ala Asp Ile Lys Pro Asp Gly Lys Arg His Ala Val Ile
                195                 200                 205

Ser Gly Ser Val Leu Tyr Asn Gln Ala Glu Lys Gly Ser Tyr Ser Leu
                210                 215                 220

Gly Ile Phe Gly Gly Lys Ala Gln Glu Val Ala Gly Ser Ala Glu Val
225                 230                 235                 240

```
Lys Thr Val Tyr Tyr Thr Lys Asp Thr Asn Asn Leu Thr Leu Val
            245                 250                 255

Pro Gly Ile Arg His Ile Gly Leu Ala Ala Lys Gln
            260                 265

<210> SEQ ID NO 108
<211> LENGTH: 274
<212> TYPE: PRT
<213> ORGANISM: Artificial Sequence
<220> FEATURE:
<223> OTHER INFORMATION: Modified polypeptide

<400> SEQUENCE: 108

Cys Ser Ser Gly Ser Gly Ser Gly Gly Gly Val Ala Ala Asp Ile
1               5                   10                  15

Gly Thr Gly Leu Ala Asp Ala Leu Thr Ala Pro Leu Asp His Lys Asp
            20                  25                  30

Lys Gly Leu Lys Ser Leu Thr Leu Glu Asp Ser Ile Ser Gln Asn Gly
            35                  40                  45

Thr Leu Thr Leu Ser Ala Gln Gly Ala Glu Lys Thr Phe Lys Val Gly
        50                  55                  60

Asp Lys Asp Asn Ser Leu Asn Thr Gly Lys Leu Lys Asn Asp Lys Ile
65                  70                  75                  80

Ser Arg Phe Asp Phe Val Gln Lys Ile Glu Val Asp Gly Gln Thr Ile
                85                  90                  95

Thr Leu Ala Ser Gly Glu Phe Gln Ile Tyr Lys Gln Asp His Ser Ala
            100                 105                 110

Val Val Ala Leu Gln Ile Glu Lys Ile Asn Asn Pro Asp Lys Ile Asp
            115                 120                 125

Ser Leu Ile Asn Gln Arg Ser Phe Leu Val Ser Gly Leu Gly Gly Glu
        130                 135                 140

His Thr Ala Phe Asn Gln Leu Pro Ser Gly Lys Ala Glu Tyr His Gly
145                 150                 155                 160

Lys Ala Phe Ser Ser Asp Ala Gly Gly Lys Leu Thr Tyr Thr Ile
                165                 170                 175

Asp Phe Ala Ala Lys Gln Gly His Gly Lys Ile Glu His Leu Lys Thr
            180                 185                 190

Pro Glu Gln Asn Val Glu Leu Ala Ser Ala Glu Leu Lys Ala Asp Glu
        195                 200                 205

Lys Ser His Ala Val Ile Leu Gly Asp Thr Arg Tyr Gly Ser Glu Glu
    210                 215                 220

Lys Gly Thr Tyr His Leu Ala Leu Phe Gly Asp Arg Ala Gln Glu Ile
225                 230                 235                 240

Ala Gly Ser Ala Thr Val Lys Ile Arg Tyr Tyr Thr Lys Asp Thr Asn
                245                 250                 255

Asn Asn Leu Thr Leu Val Pro Lys Val His Glu Ile Gly Ile Ala Gly
            260                 265                 270

Lys Gln

<210> SEQ ID NO 109
<211> LENGTH: 267
<212> TYPE: PRT
<213> ORGANISM: Artificial Sequence
<220> FEATURE:
<223> OTHER INFORMATION: Modified polypeptide

<400> SEQUENCE: 109
```

-continued

```
Cys Ser Ser Gly Gly Gly Val Ala Ala Asp Ile Gly Ala Gly Leu
1               5                   10                  15

Ala Asp Ala Leu Thr Ala Pro Leu Asp His Lys Asp Lys Ser Leu Gln
            20                  25                  30

Ser Leu Thr Leu Asp Gln Ser Val Arg Lys Asn Glu Lys Leu Lys Leu
            35                  40                  45

Ala Ala Gln Gly Ala Glu Lys Thr Tyr Gly Asn Gly Asp Ser Leu Asn
    50                  55                  60

Thr Gly Lys Leu Lys Asn Asp Lys Val Ser Arg Phe Asp Phe Ile Arg
65                  70                  75                  80

Gln Ile Glu Val Asp Gly Gln Leu Ile Thr Leu Glu Ser Gly Glu Phe
                85                  90                  95

Gln Ile Tyr Lys Gln Asp His Ser Ala Val Val Ala Leu Gln Ile Glu
            100                 105                 110

Lys Ile Asn Asn Pro Asp Lys Ile Asp Ser Leu Ile Asn Gln Arg Ser
            115                 120                 125

Phe Leu Val Ser Gly Leu Gly Gly Glu His Thr Ala Phe Asn Gln Leu
    130                 135                 140

Pro Ser Gly Lys Ala Glu Tyr His Gly Lys Ala Phe Ser Ser Asp Asp
145                 150                 155                 160

Ala Gly Gly Lys Leu Thr Tyr Thr Ile Asp Phe Ala Ala Lys Gln Gly
            165                 170                 175

His Gly Lys Ile Glu His Leu Lys Thr Pro Glu Gln Asn Val Glu Leu
            180                 185                 190

Ala Ser Ala Glu Leu Lys Ala Asp Glu Lys Ser His Ala Val Ile Leu
    195                 200                 205

Gly Asp Thr Arg Tyr Gly Gly Glu Glu Lys Gly Thr Tyr His Leu Ala
    210                 215                 220

Leu Phe Gly Asp Arg Ala Gln Glu Ile Ala Gly Ser Ala Thr Val Lys
225                 230                 235                 240

Ile Arg Tyr Tyr Thr Lys Asp Thr Asn Asn Asn Leu Thr Leu Val Pro
            245                 250                 255

Lys Val His Glu Ile Gly Ile Ala Gly Lys Gln
            260                 265
```

The invention claimed is:

1. A modified factor H binding protein (fHbp), comprising wild-type fHbp or the wild-type gonococcal orthologue of fHbp (Ghfp) having at least 95% identity with any of the sequences of SEQ ID NOs: 1-13, which is further modified with the addition of at least one PorA loop comprising a sequence according to any of SEQ ID NOs: 45 to 79, or variant thereof having no more than 5 amino acid additions, deletions or substitutions, wherein the PorA loop is between 8 and 20 amino acids in length and wherein the PorA loop is inserted at an amino acid position that is corresponding to any one of the amino acid residue numbers 49-54, 83-88, 114-124, 199-206, 227-233, and 240-246 of SEQ ID NO: 1, or equivalent residues in any of SEQ ID NOs: 2 to 13.

2. The modified factor H binding protein according to claim 1, wherein the modified fHbp is modified such that it is not capable of binding factor H, or at least has reduced factor H binding activity.

3. The modified factor H binding protein according to claim 1, wherein the PorA loop is 16 amino acids in length.

4. The modified factor H binding protein according to claim 1, wherein the modified fHbp comprises two or more PorA loops.

5. The modified factor H binding protein according to claim 1, wherein the modified fHbp comprises between 1 and 7 PorA loops.

6. The modified factor H binding protein according to claim 1, wherein the modified fHbp, or variant thereof, is modified with an PorA loop in at least two positions.

* * * * *